(12) United States Patent
Kitazawa et al.

(10) Patent No.: US 6,940,542 B2
(45) Date of Patent: Sep. 6, 2005

(54) IMAGING APPARATUS, AND METHOD AND DEVICE FOR SHAKE CORRECTION IN IMAGING APPARATUS

(75) Inventors: Tomofumi Kitazawa, Kanagawa (JP); Takashi Kitaguchi, Kanagawa (JP); Hiromasa Shimizu, Tokyo (JP); Masayoshi Katoh, Kanagawa (JP); Yasuhiro Sato, Kanagawa (JP); Saburoh Sasaki, Tokyo (JP); Akihiro Etoh, Kanagawa (JP)

(73) Assignee: Ricoh Company, LTD, Tokyo (JP)

( * ) Notice: Subject to any disclaimer, the term of this patent is extended or adjusted under 35 U.S.C. 154(b) by 377 days.

(21) Appl. No.: 09/901,098

(22) Filed: Jul. 10, 2001

(65) Prior Publication Data

US 2002/0163581 A1 Nov. 7, 2002

(Under 37 CFR 1.47)

(30) Foreign Application Priority Data

| Jul. 10, 2000 | (JP) | ........................................ | 2000-208663 |
| Jul. 13, 2000 | (JP) | ........................................ | 2000-212194 |
| Aug. 8, 2000 | (JP) | ........................................ | 2000-240411 |
| Sep. 13, 2000 | (JP) | ........................................ | 2000-277525 |
| May 22, 2001 | (JP) | ........................................ | 2001-152958 |

(51) Int. Cl.$^7$ ........................ H04N 5/228; H04N 5/232; G03B 17/00
(52) U.S. Cl. .................... 348/208.99; 348/351; 396/52; 396/55
(58) Field of Search ............................... 348/208, 351; 396/52–55

(56) References Cited

U.S. PATENT DOCUMENTS

| 4,734,726 A | | 3/1988 | Takahashi et al. | |
| 5,727,234 A | * | 3/1998 | Sakagami et al. | ............ 396/52 |
| 5,918,077 A | * | 6/1999 | Wakabayashi et al. | ........ 396/55 |
| 5,930,530 A | * | 7/1999 | Hirano et al. | ................. 396/52 |
| 5,973,319 A | * | 10/1999 | Washisu | ................. 348/208.11 |
| 6,332,060 B1 | * | 12/2001 | Miyamoto et al. | ............ 396/55 |
| 6,344,876 B2 | * | 2/2002 | Shiomi | .................... 348/208.1 |

FOREIGN PATENT DOCUMENTS

| JP | 59-22485 | 2/1984 |
| JP | 64-60072 | 3/1989 |
| JP | 2-45874 | 10/1990 |
| JP | 4-70275 | 3/1992 |
| JP | 4-357789 | 12/1992 |
| JP | 5-72592 | 3/1993 |
| JP | 5-72593 | 3/1993 |
| JP | 5-207358 | 8/1993 |
| JP | 6-46322 | 2/1994 |
| JP | 6-67246 | 3/1994 |
| JP | 7-46613 | 2/1995 |
| JP | 7-32472 | 4/1995 |
| JP | 7-98468 | 4/1995 |
| JP | 7-240932 | 9/1995 |
| JP | 7-287268 | 10/1995 |
| JP | 2579035 | 11/1996 |
| JP | 9-219867 | 8/1997 |
| JP | 2752073 | 2/1998 |
| JP | 10-145663 | 5/1998 |
| JP | 10-191147 | 7/1998 |
| JP | 11-187309 | 7/1999 |
| JP | 2000-13670 | 1/2000 |

* cited by examiner

*Primary Examiner*—James J. Groody
*Assistant Examiner*—Nhan Tran
(74) *Attorney, Agent, or Firm*—Oblon, Spivak, McClelland, Maier & Neustadt, P.C.

(57) ABSTRACT

Detection information for shake is detected by a shake detection unit, predictive shake information is calculated based on the shake detection information, a start position (center) of a correcting operation on an imaging surface of a shake correction unit is determined, and driving of the shake correction unit at the correcting-operation start position is controlled. Accordingly, it is possible to make effective use of a movable range of the shake correction unit for actual hand shake or the like. Thus, a high degree of correction effect can be obtained, so that imaging failures due to hand shake or the like can be remarkably reduced.

14 Claims, 43 Drawing Sheets

IMAGING APPARATUS, AND METHOD AND DEVICE FOR SHAKE CORRECTION IN IMAGING APPARATUS

FIELD OF THE INVENTION

The present invention relates to an imaging apparatus, and method and device for shake correction in the imaging apparatus including cameras in general such as silver salt cameras, digital cameras, digital video movies, and video cameras each with a still image mode.

BACKGROUND OF THE INVENTION

As the imaging apparatus, the shake correction method, and the shake correction device, there are those disclosed in the publications as follows.

Japanese Patent Application Laid-Open (JP-A) No. 5-72592, JP-A 5-72593, JP-A 5-207358, JP-A 6-67246, JP-A 7-98468, JP-A 7-240932, JP-A 7-287268, JP-A 10-191147, JP-A 11-187309, JP-A 2000-13670, Japanese Patent No. 2579035, and Japanese Patent No. 2752073.

This invention has been achieved by improving the image pickup devices, the shake correction methods, and the shake correction devices described in the publications.

SUMMARY OF THE INVENTION

It is an object of this invention to provide an imaging apparatus, a shake correction method, and a shake correction device with which imaging failures due to hand shake or the like can be reduced by correcting shake of the imaging apparatus quickly and reliably.

The imaging apparatus according to one aspect of this invention calculates predictive shake information based on information for shake detection detected by a shake detection unit, determines a position as a start position of a correcting operation of the shake correction unit and at which predictive shake is canceled out, and controls driving of the shake correction unit at the correcting-operation start position to correct shake. Accordingly, this invention can correct shake of the imaging apparatus quickly and accurately, and reduce imaging failures due to hand shake or the like. That is, in this invention, by controlling the driving of the shake correction unit at the correcting-operation start position, a movable range of the shake correction unit for actual hand shake can be made effective use of. Thus, a high degree of correction effect can be obtained, so that imaging failures due to hand shake or the like can be remarkably reduce.

Further, a storage unit updates and stores, on a time basis, shake detection information and information for imaging conditions for a predetermined time interval detected by the shake detection unit. Accordingly, this invention can effectively correct hand shake even when imaging conditions such as an exposure condition vary.

Further, shake can be corrected by detecting a pre-imaging operation, driving the shake correction unit to a start position of correcting operation, and detecting an imaging starting operation. Accordingly, this invention can further reduce imaging failures due to hand shake.

Further, the shake correction unit can be driven between the time when the pre-imaging operation is detected and the time when the imaging starting operation is detected. Accordingly, this invention can correct the shake more effectively.

Further, when actual imaging is started, processing of calculating predictive shake information or the like can be stopped. Accordingly, this invention can suppress wasteful power consumption due to unnecessary computing operation.

Further, when a control unit is to control driving of the shake correction unit, it is possible to reduce the time required for controlling the driving of the shake correction unit to a correcting-operation start position by treating the correcting-operation start position as an area. That is, the time required for starting imaging can be reduced. In this invention, by treating the correcting-operation start position as area information, the shake can be effectively corrected while suppressing the amount of travel of the shake correction unit. In addition, even if the correcting-operation start position is slightly displaced due to degradation in predictive precision, it is possible to suppress probability of exceeding a range where the shake correction unit performs a correcting operation, and reduce imaging failures due to hand shake as low as possible.

Further, this invention retrieves a correlation between the predictive shake information previously stored in a correlation storage unit and the correcting-operation start positions based on the predictive shake information, and determines a correcting-operation start position of the shake correction unit. Accordingly, it is possible to provide the imaging apparatus that can quickly determine the correcting-operation start position and reduce the time from instruction of an imaging operation until starting of an actual imaging operation, and has a less time lag.

Further, when a shake quantity of the shake detection information is beyond the range previously stored in a correction range storage unit, a warning unit issues a warning. Accordingly, in this invention, even if a blurred image due to hand shake is imaged, more specifically, the blurred image is produced when the shake correction unit can not correct hand shake because the hand shake is larger than its prediction or is inaccurately predicted, the following measures can be taken. That is, it is possible to allow an operator to stop imaging, or to image an object image again. If the imaging apparatus is any device that stores image information in an erasable recording medium, writing of the information into the recording medium can be cancelled before recording it. Thus, this invention can acquire the image information intended by the operator.

Further, it is possible to avoid unnecessary imaging and suppress power consumption due to unnecessary correcting operations.

In the shake correction method according to another aspect of this invention, the shake of an imaging apparatus can be corrected quickly and accurately, so that imaging failures due to hand shake can be reduced. That is, in this invention, by controlling the driving of the shake correction unit at a correcting-operation start position, a movable range of the shake correction unit for actual hand shake can be made effective use of. Thus, a high degree of correction effect can be obtained, so that imaging failures due to hand shake or the like can be remarkably reduce.

Further, shake detection information and information for imaging conditions for a predetermined time interval detected by the shake detection unit are updated and stored on a time basis. Accordingly, this invention can effectively correct hand shake even when imaging conditions such as an exposure condition vary.

Further, shake can be corrected by detecting a pre-imaging operation, driving the shake correction unit to a start position of a correcting operation, and detecting an imaging starting operation. Accordingly, this invention can further reduce imaging failures due to hand shake.

The shake correction device according to still another aspect of this invention has a displacement enlarging mechanism that enlarges the displacement of an electromechanical transducer, so that a sufficiently large displacement can be quickly obtained. Accordingly, in this invention, an imaging optical system (which is synonymous with the image pickup optical system, e.g., an image pickup lens) or an image pickup surface (which is synonymous with the image pickup unit, e.g., a film) can be moved sufficiently widely and quickly in a direction substantially perpendicular to the optical axis. Resultantly, it is possible to provide an excellent camera-shake correction mechanism that has achieved a movable range wide enough for and a quick response to camera shake.

In this invention, imaging is performed plural times by moving an incident position of an incident light to the image pickup surface by a specified quantity and in the specific direction between exposures, so that it is possible to facilitate imaging based on pixel shifting such that the plurality of imaged image data is used to increase an apparent number of pixels. Accordingly, this invention can obtain a high-resolution image even if the image pickup unit itself has only a small number of pixels.

In this invention, it becomes easy to slightly change an incident position of an incident light to the image pickup surface by moving the imaging optical system or the image pickup surface by a specified slight amount during the exposing time. Accordingly, in this invention, even if an image pickup signal has a high frequency component higher than one half of a sampling frequency of the image pickup unit, the high frequency component of the image pickup signal is removed, so that occurrence of pseudo colors or moiré caused by foldover distortion of the high frequency component can be prevented.

In order to remove the high frequency component of the image pickup signal that becomes a cause of occurrence of the pseudo colors or moiré, a crystal plate is generally disposed in a light path to remove the high frequency component based on a dot-image separation due to birefringence of this crystal plate. However, it has been known that the same effect can be obtained by slightly shifting the object image during the exposing time without using a birefringent plate like the crystal plate.

In this invention, a width between opposed surfaces curving inwardly of the two elastic plates is enlarged or reduced according to the displacement of the electromechanical transducer. These two elastic plates are fixed to both sides of the electromechanical transducer so as to be opposite to each other in a direction perpendicular to its displacement direction. Accordingly, in this invention, the displacement of the electromechanical transducer is enlarged by the displacement enlarging mechanism in a direction perpendicular to its displacement direction, so that the imaging optical system or the image pickup surface is moved in this direction. Thus, this invention is excellent in space efficiency when an actuator composed of the electromechanical transducer and the displacement enlarging mechanism is used.

The two elastic plates fixed to both sides of the electromechanical transducer opposite to each other are curved so as to be recessed inwardly. Conversely, there is a case where the plates curved so as to be expanded outwardly are fixed. Comparison is then made between these two cases. As a result, this invention can avoid a risk that the two elastic plates are curved inwardly when a large force is applied and will not recover to their original state, and realize stable enlargement.

This invention has the displacement enlarging mechanism that enlarges the displacement of the electromechanical transducer. Accordingly, in this invention, a sufficiently large quantity of displacement can be obtained even if low power is supplied to the electromechanical transducer, thus being advantageous for designing a power source.

In this invention, the imaging optical system or the image pickup surface is fixed to the elastic plates of the displacement enlarging mechanism. Accordingly, in this invention, any particular mechanism for holding the imaging optical system or the image pickup surface is not required even if camera shake is not corrected (when the imaging optical system or the image pickup surface is not moved) Therefore, the shake correction device can be minimized and simplified.

In this invention, the displacement enlarging mechanism that enlarges the displacement of the electromechanical transducer can be commonly used as a function of camera-shake correction, an imaging function based on pixel shifting, and a function of removing a high frequency component of an image pickup signal. Accordingly, in this invention, the plural functions can be achieved at once, thus largely improving the image quality. In addition, in this invention, there is no need to provide plural displacement enlarging mechanisms discretely for each function, thus minimizing a camera and reducing its cost.

The shake correction device according to still another aspect of this invention has a displacement enlarging mechanism that enlarges displacement of an electromechanical transducer. Accordingly, higher space efficiency can be obtained as compared to a case where a moving coil is used, and the device can be driven more quickly as compared to a case where a motor is used. Thus, in this invention, an apex angle of a variable apex angle prism required for camera-shake correction can be varied sufficiently largely and quickly by arranging the enlargement direction due to the displacement enlarging mechanism so as to be parallel to the optical axis of the variable apex angle prism. Resultantly, in this invention, the degree of flexibility in designing can be enlarged, and a movable range wide enough for and a quick response to camera shake can be achieved. Thus, it is possible to provide such an excellent camera-shake correction mechanism.

In this invention, imaging based on pixel shifting can be facilitated. Accordingly, it is possible to obtain a high-resolution image even if the image pickup unit itself has only a small number of pixels.

In this invention, it becomes easy to slightly change an incident position of an incident light to the image pickup surface by moving the apex angle of the variable apex angle prism by a specified slight amount during the exposing time. Accordingly, in this invention, a high frequency component higher than one half of a sampling frequency of the image pickup unit is removed, so that occurrence of pseudo colors or moiré caused by foldover distortion of the high frequency component can be prevented.

In this invention, excellent space efficiency can be realized, therefore, it is advantageous for designing a power source. In addition, any particular mechanism for holding the variable apex angle prism is not required. Therefore, the shake correction device can be minimized and simplified. In this invention, the displacement enlarging mechanism that enlarges the displacement of the electromechanical transducer can be commonly used as a function of camera-shake correction, an imaging function based on pixel shifting, and a function of removing a high frequency component of an image pickup signal. Accordingly, this invention can largely improve the image quality, minimize the camera, and reduce its cost.

Further, a biasing unit provides a biasing force, in a reverse direction to the enlargement due to the displacement enlarging mechanism, to the image pickup optical system, the image pickup surface, or the variable apex angle prism. Accordingly, in this invention, the image pickup optical system, the image pickup surface, or the variable apex angle prism each fixed to the elastic plates of the displacement enlarging mechanism can be maintained stably in a specific direction. Resultantly, in this invention, the image pickup optical system or the image pickup surface can be moved easily, reliably and accurately according to enlargement due to the displacement enlarging mechanism while keeping its surface perpendicular to the optical axis. In this invention, the apex angle of the variable apex angle prism can also be varied easily, reliably and accurately.

It is assumed here that the biasing unit is not provided. Based on this assumption, if an actuator composed of the electromechanical transducer and the displacement enlarging mechanism is used to pull the image pickup optical system, the image pickup surface, or the variable apex angle prism in the horizontal direction, the pulling force becomes only the force of the elastic plates to return to the original place where the elastic plates are fixed to both sides of the electromechanical transducer opposite to each other. Therefore, it is difficult to securely fix the image pickup optical system, the image pickup surface, or the variable apex angle prism to the elastic plates.

In order to firmly fix the image pickup optical system, the image pickup surface, or the variable apex angle prism to the elastic plates, it is conceivable to fasten these two with screws. However, screwing requires a space to accommodate a head of the screw between the electromechanical transducer and the elastic plate. Resultantly, the screwing requires a larger space between the electromechanical transducer and the elastic plate, which may cause displacement of the electromechanical transducer not to be enlarged stably. In addition, the screwing depends on its working, so that its capability may not be reliable. As explained above, this invention can solve the problems by providing the biasing unit.

Further, the image pickup optical system or the image pickup surface can be smoothly moved by a substantially cylindrical member in the horizontal direction and the vertical direction respectively by using a plurality of actuators each composed of the electromechanical transducer and the displacement enlarging mechanism. In this invention, the image pickup optical system or the image pickup surface can be moved in a specific direction, the horizontal direction and the vertical direction, in its stable state.

It is assumed here that the substantially cylindrical member is not disposed between one of the elastic plates and the image pickup optical system or the image pickup surface and there is a case that the image pickup optical system or the image pickup surface is two-dimensionally moved in the horizontal direction and the vertical direction using a plurality of actuators. In this case, the image pickup optical system or the image pickup surface, which is fixed horizontally and vertically to the curved elastic plates of a plurality of displacement enlarging mechanisms, simultaneously receives the force from the plurality of curved elastic plates. Accordingly, it is difficult to move the image pickup optical system or the image pickup surface in a specific direction in its stable state because the image pickup optical system or the image pickup surface is inclined or the position in contact with the elastic plate is displaced due to a conflict between forces from the plural directions. As explained above, this invention can solve the problems by disposing the substantially cylindrical member between the two.

Further, a pressing unit, as the biasing unit, which presses the imaging optical system or the image pickup surface in a specific direction is disposed fixedly and independently from the imaging optical system or the image pickup surface. In this invention, there is a case that the image pickup optical system or the image pickup surface is two-dimensionally moved in the horizontal direction and the vertical direction using a plurality of actuators. In this case, when the image pickup optical system or the image pickup surface is moved in a vertical direction, the pressing unit presses the image pickup optical system or the image pickup surface against the elastic plate in the horizontal direction. Accordingly, in this invention, friction produces at a contact part between the image pickup optical system or the image pickup surface and the pressing unit, so that the balance can be achieved between this friction and friction at a contact part between the image pickup optical system or the image pickup surface and the elastic plate or the substantially cylindrical member. Resultantly, this invention can move the image pickup optical system or the image pickup surface in a specific direction, the horizontal direction and the vertical direction, in its stable state.

It is assumed here that the pressing unit is not used as the biasing unit and there is a case that the image pickup optical system or the image pickup surface is two-dimensionally moved in the horizontal direction and the vertical direction using a plurality of actuators. In this case, when the image pickup optical system or the image pickup surface is moved in the vertical direction, friction produces at a contact part between the image pickup optical system or the image pickup surface and the elastic plate or the substantially cylindrical member. Accordingly, the balance between the frictions is lost, so that the turning effect is added to the image pickup optical system or the image pickup surface, which causes the image pickup optical system or the image pickup surface to be inclined or the position in contact with the elastic plate to be displaced. Resultantly, it is difficult to move the image pickup optical system or the image pickup surface in a specific direction in a stable state. As explained above, this invention can solve the problems by providing the pressing unit as the biasing unit discretely from the image pickup optical system or the image pickup surface.

Further, even if enlargement due to the displacement enlarging mechanism increases in association with increase in displacement of the electromechanical transducer and a biasing force against the enlargement increases, the increase in this biasing force is suppressed to a predetermined range. Accordingly, in this invention, the elastic plates of the displacement enlarging mechanism can be prevented from being crushed due to increase in the biasing force, and the loss of enlargement due to the displacement enlarging mechanism can be suppressed to a predetermined range, so that a desired displacement can be obtained.

In the shake correction device according to still another aspect of this invention, vibration of the imaging apparatus can be cancelled out, that is, the shake can be corrected by vibrating the image pickup unit by the shake-correction use driving unit through the shake-correction use supporting unit. Pixel shifting is performed by moving the image pickup unit integral with the shake-correction use supporting unit and the shake-correction use driving unit by the pixel-shifting use driving unit. More specifically, this movement is performed in a pixel shifting direction by a specified quantity by the pixel-shifting use driving unit through the pixel-shifting use supporting unit. As explained above, the shake correcting function and the pixel shifting function can be acted reliably and inexpensively as a parallel function by the supporting unit and driving unit for shake correction and the supporting unit and driving unit for pixel shifting each as a discrete unit.

Further, a multilayer piezoelectric element is used as a driving unit. Accordingly, this invention can minimize the imaging apparatus, obtain a large driving force with low power, improve responsivity, and deal with a heavy load.

Further, the multilayer piezoelectric elements are disposed in the positions on the substantially same plane opposite to the imaging optical system of the image pickup unit (opposite to the image forming surface of the image pickup unit). This invention can minimize the space surrounding the image pickup unit, and also minimize the space on the opposite side to the imaging optical system of the image pickup unit (the rear side of the image pickup unit).

Further, the pixel-shifting use support unit is disposed in the shake-correction use supporting unit on the opposite side to the imaging optical system of the image pickup unit in the direction of the optical axis. Accordingly, this invention can minimize the space surrounding the image pickup unit, and also minimize the space on the opposite side to the imaging optical system of the image pickup unit.

Further, the multilayer piezoelectric elements are used as the driving units, and these multilayer piezoelectric elements and the shake-correction use driving unit are disposed in the positions on the substantially same plane of the fixed base opposite to the imaging optical system of the image pickup unit. Accordingly, this invention can minimize the space surrounding the image pickup unit, and also minimize the space on the opposite side to the imaging optical system of the image pickup unit.

In the shake correction device according to still another aspect of this invention, an image pickup unit is disposed in a shake-correction use supporting unit composed of a first flat spring body, a second flat spring body, a first support plate, a second support plate, and a third support plate. Accordingly, this invention can minimize the shake-correction use supporting unit and also minimize the shake correction device in the image pickup apparatus.

Further, a link is formed with four flat springs and the first support plate, the second support plate and the third support plate, which makes it possible to reduce the load applied to one of the flat springs.

Further, two flat springs are formed with a piece of flat spring, thus reducing the number of components.

Further, folded ends of both ends of the first flat spring body and the second flat spring body are used as positioning and fixing parts for fixing the bodies to the first support plate, the second support plate, and the third support plate. Accordingly, it is possible to reduce the number of components. In this invention, the folded ends of both ends of the first flat spring body and the second flat spring body are folded into the side of the optical axis, that is, inwardly, so that the shake correction device in the imaging apparatus can be minimized.

In the shake correction device according to still another aspect of this invention, an enlargement direction of a displacement part which vibrates an image pickup unit and a displacement direction of a multilayer piezoelectric element are orthogonal to each other. Therefore, in this invention, multilayer piezoelectric elements each with an enlarging mechanism can be disposed in a state where the displacement directions of the multilayer piezoelectric elements, that is, each longitudinal direction of the multilayer piezoelectric elements is orthogonal to a vibrating direction of the image pickup unit. Accordingly, this invention can minimize the shake-correction use driving unit and also minimize the shake correction device in the imaging apparatus as compared to the shake correction device in which the multilayer piezoelectric elements are disposed in a state where each longitudinal direction of the multilayer piezoelectric elements coincides with a vibrating direction of the image pickup unit.

Further, the multilayer piezoelectric element with an X-direction enlarging mechanism and the multilayer piezoelectric element with a Y-direction enlarging mechanism are disposed in positions on the substantially same plane opposite to the imaging optical system of the image pickup unit. Accordingly, this invention can minimize the space surrounding the image pickup unit and also minimize the space on the opposite side to the imaging optical system of the image pickup unit.

Further, an X-direction biasing spring and a Y-direction biasing spring are disposed between a movable-side support part and a fixed-side support part. Accordingly, in this invention, the movable-side support part and the fixed-side support part are in contact with the displacement parts of the multilayer piezoelectric element with the X-direction enlarging mechanism and the multilayer piezoelectric element with the Y-direction enlarging mechanism. The movable-side support part vibrates in the X direction and the Y direction with respect to the fixed-side support part in their contact state. Therefore, in this invention, loss of the biasing force of the biasing springs is reduced, and hysteresis of the biasing springs may be hard to occur. As a result, the biasing force of the biasing springs is stabilized, and positional precision is also stabilized.

In this invention, the X-direction biasing spring and the Y-direction biasing spring are formed with a single biasing spring. Therefore, it is possible to reduce the number of components and minimize the imaging apparatus. In addition, in this invention, the movable-side support part and the fixed-side support part are in contact with the displacement parts of the multilayer piezoelectric element with the X-direction enlarging mechanism and the multilayer piezoelectric element with the Y-direction enlarging mechanism without any component therebetween. Accordingly, there is a merit such that the positional precision does not depend on the precision of the components.

Further, an X-direction roller and a Y-direction roller can reduce frictional resistance produced when the movable-side support part vibrates in the X direction and the Y direction with respect to the fixed-side support part. Accordingly, this invention can improve the precision of the shake correction device in the imaging apparatus and reduce the load to the driving force.

Further, it is possible to adjust initial positions of the image pickup unit in the X direction and the Y direction through the movable-side support part by an X-direction adjustment screw and a Y-direction adjustment screw.

Further, it is possible to reduce the rigidity of a flexible wiring part by slits without any influence to the wiring. Accordingly, this invention can reduce operational errors due to its rigidity during driving, improve positional precision, and reduce the load to the driving force. In this invention, the flexible wiring part has a band-like shape, so that it is possible to slim a wiring member and minimize the shake correction device.

In the imaging apparatus according to still another aspect of this invention, a shake correction control unit and a pixel shifting control unit can automatically control shake correction and pixel shifting, respectively.

In the imaging apparatus according to still another aspect of this invention, a shake correction control unit can automatically control shake correction.

Further, it is possible to reduce the rigidity of the flexible wiring part by slits without any influence to the wiring. Accordingly, this invention can reduce operational errors due to its rigidity during driving, improve positional precision, and reduce the load to the driving force. In this invention, the flexible wiring part has the band-like shape, so that it is possible to slim the wiring member and minimize the imaging apparatus.

Other objects and features of this invention will become apparent from the following description with reference to the accompanying drawings.

BRIEF DESCRIPTION OF THE DRAWINGS

FIG. 2A is a graph showing an example of rotational displacement with respect to a camera axis, and FIG. 2B is a graph showing the result of converting the rotational displacement to displacement on the image forming surface;

FIG. 26A is a schematic cress-sectional view showing a state in which a mobile unit is pressed against the actuator and a biasing force acting in the direction against the enlargement is given, and FIG. 26B is a graph showing a relation between an applied voltage V to the multilayer piezoelectric element of the actuator and an enlargement Δw in the actuator;

DETAILED DESCRIPTION OF THE PREFERRED EMBODIMENTS

Preferred embodiments of the imaging apparatus, the shake correction method in the imaging apparatus, and the shake correction device in the imaging apparatus according to this invention will be explained below with reference to the attached drawings. In these embodiments, examples used in the imaging apparatus such as a digital camera will be explained. It should be noted that this invention is not limited by these embodiments.

Figure 1:
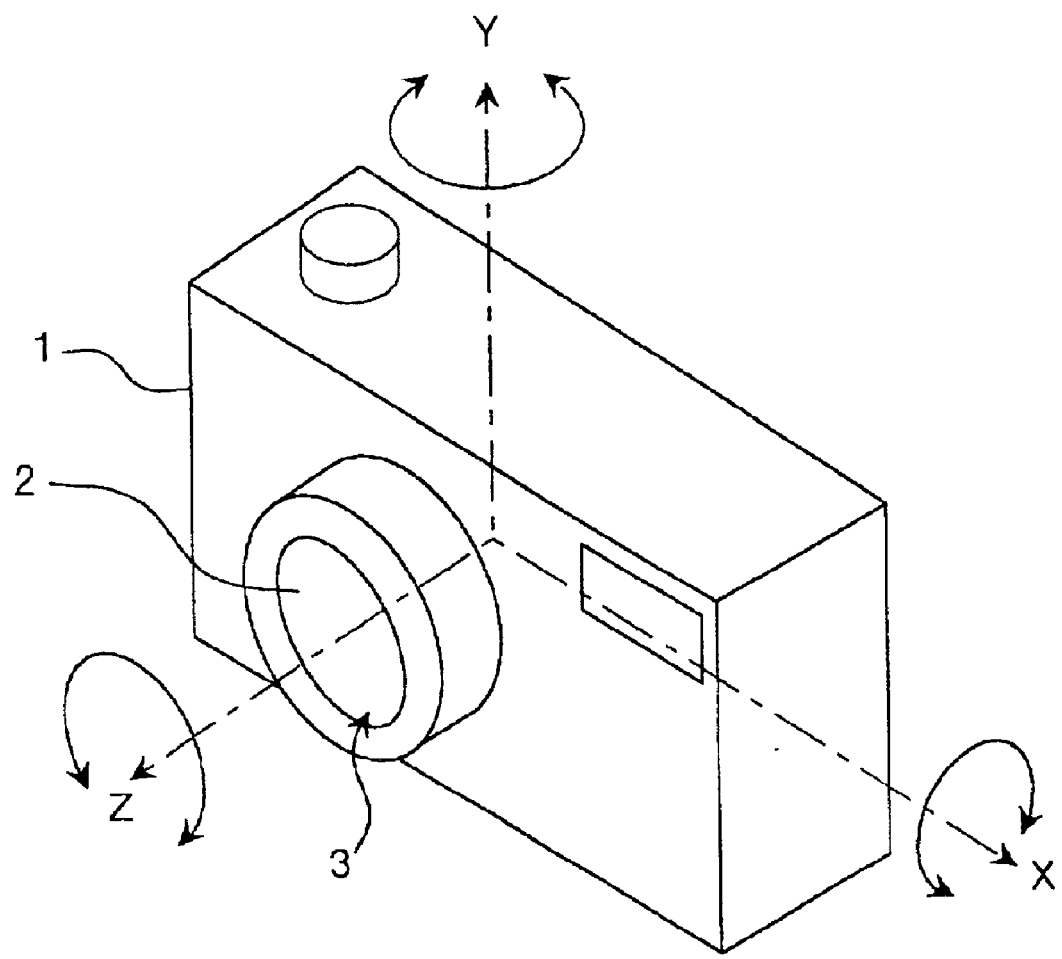
FIG. 1 is a schematic perspective view of the camera indicating a first embodiment of this invention.

FIG. 1 to FIG. 6 show a first embodiment of this invention. In FIG. 1, legend 1 represents a camera as the imaging apparatus. Assuming that XYZ axes in the camera 1 are taken as shown in FIG. 1, rotation about the X axis (horizontal axis) is defined as rotation in a pitch direction, rotation about the Y axis (vertical axis) is defined as rotation in a yaw direction, and rotation about the Z axis (optical axis) is defined as rotation in a roll direction. In FIG. 1, legend 2 represents an imaging lens, and legend 3 represents the imaging optical system formed with the imaging lens 2 or the like.

The camera 1 is provided with the shake detection unit that detects shake of the camera 1. The shake detection unit uses an angular velocity detection element (not shown) that is a gyrosensor as a sensor. The characteristics in examples of data for hand shake measured by the shake detection unit will be explained below with reference to FIG. 2.

Figure 2A:
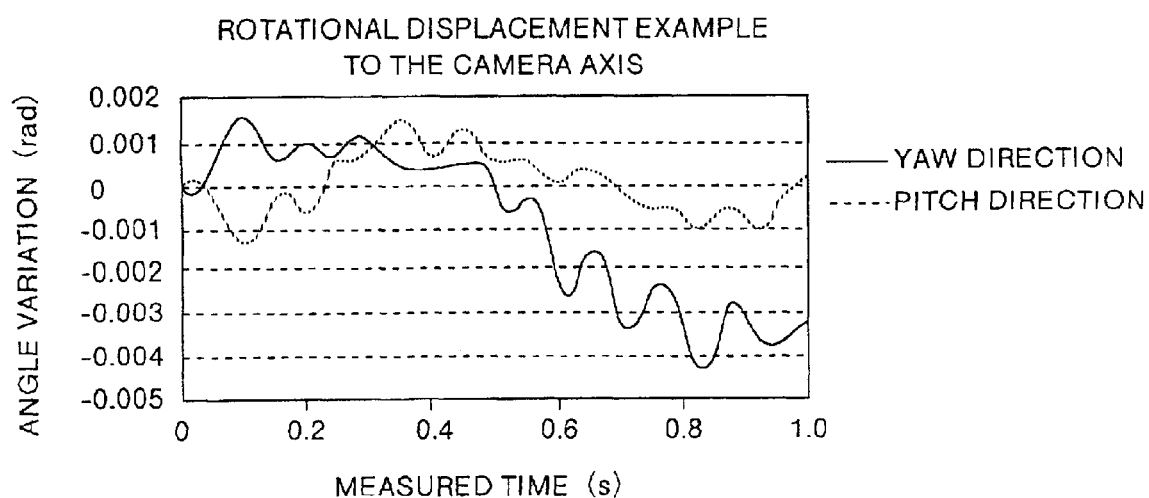
FIG. 2A and FIG. 2B show examples of measured data for the first embodiment.

FIG. 2A shows a typical example of measured angle variation in the yaw direction and the pitch direction of the camera 1 due to hand shake. The quantity of displacement (shake quantity) of an object image on an image forming surface of the camera 1 due to the angle variation shown in FIG. 2A is determined by the amount of tangent (tan θ) obtained through multiplication of a focal length by a rotational displacement angle (see FIG. 2A).

Figure 2B:
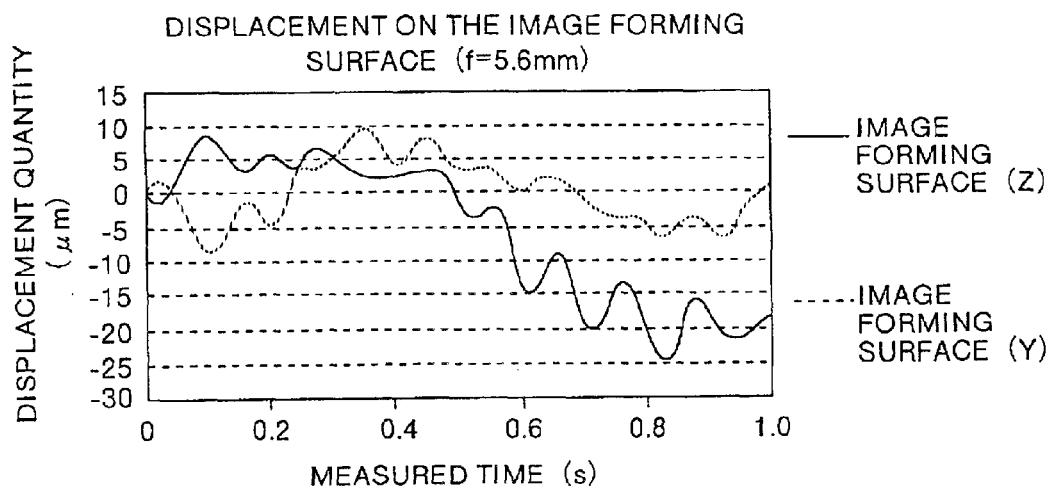

FIG. 2B is a graph showing the shake quantity on the image forming surface converted from the amount of rotation shown in FIG. 2A when the focal length of the imaging lens 2 for the camera 1 is 5.6 mm. As is clear from the result of conversion, the shake quantity in substantially proportion to, that is, corresponding to the rotational displacement quantity appears on the image forming surface because of the small quantity of rotational displacement. The shake quantity also increases in proportion to the focal length of the imaging lens 2, so that the shake quantity is more increased when a higher-powered lens is used.

Even in either of the cases, the hand shake does not always vary with a certain central axis, but generally, variation biased to a particular direction occurs.

Figure 3:
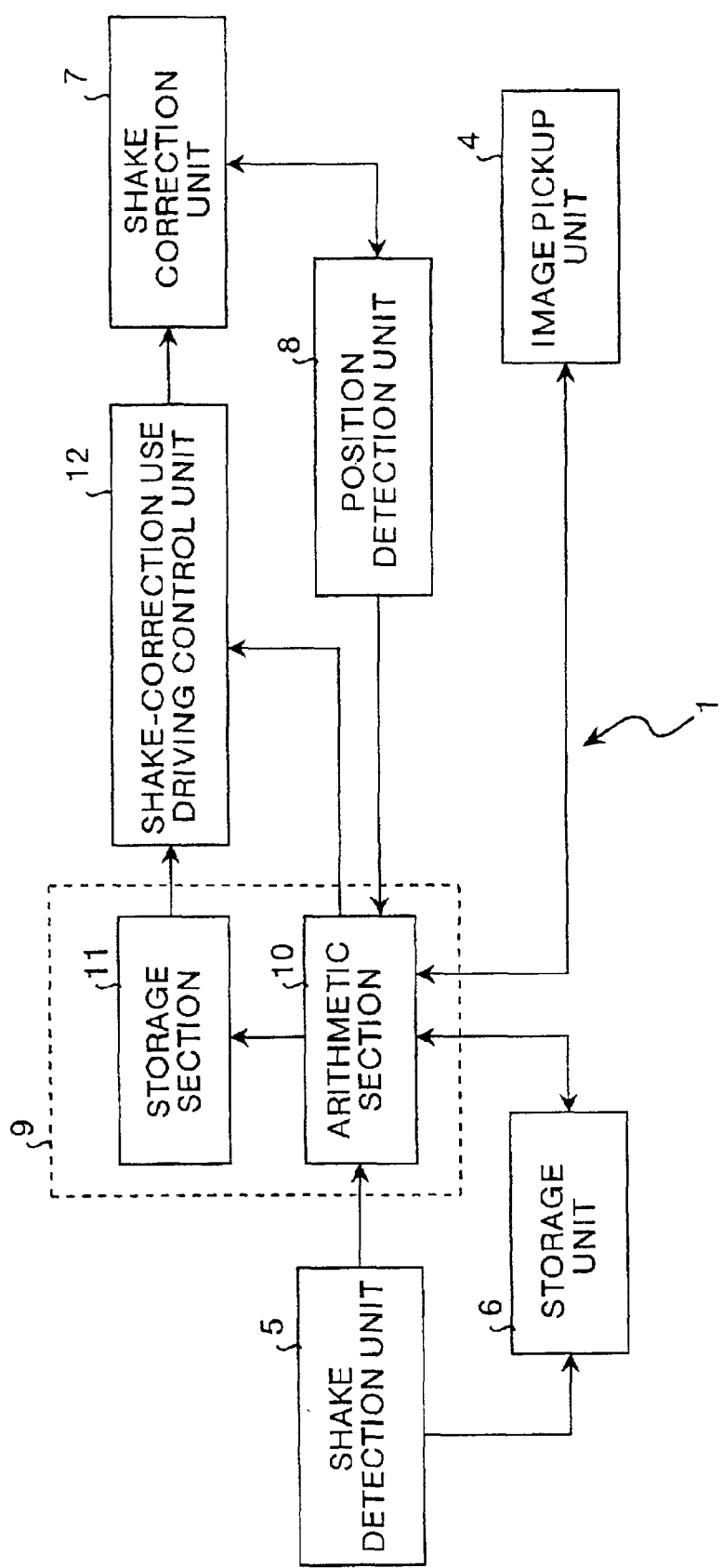
FIG. 3 is a block diagram showing an example of functional structure of the first embodiment.

The block diagram in FIG. 3 shows an example of functional structure of the first embodiment. The camera 1 has the image pickup unit (image pickup device) 4 that receives an object image passing through the imaging optical system 3 and converts it to image information. The image pickup unit 4 comprises a solid image pickup unit such as a film or a CCD and a control circuit for this unit.

The camera 1, as explained above, is provided with the shake detection unit 5 that detects shake of the camera 1. The shake detection unit 5 comprises a physical quantity sensor such as the gyrosensor and peripheral circuits.

The storage unit 6 (memory), that updates and stores a specified amount of detected shake detection information, is connected to the shake detection unit 5. The storage unit 6 updates the successively detected shake detection information in order from the oldest one to store a specified amount of the latest information.

The camera 1 has a shake correction unit 7. The shake correction unit 7 swings and displaces a part of the image pickup unit 4 or a part of the lenses of the imaging optical system 3 based on the shake detection information detected by the shake detection unit 5. As a result, the shake correction unit 7 can correct image blurring on the formed image in the image pickup unit 4.

The shake correction unit 7 is connected with a position detection unit 8. The position detection unit 8 is used for monitoring swinging of the shake correction unit 7 in its correcting operation according to the correction quantity to the object to be corrected.

A central processing unit 9 is connected to the image pickup unit 4, the shake detection unit 5, the storage unit 6, the shake correction unit 7, and the position detection unit 8. The central processing unit 9 is composed of a microcomputer such as a CPU. The central processing unit 9 contains an arithmetic section 10 and a storage section 11. The arithmetic section 10 is a predictive operation unit that performs predictive operations based on respective information of the image pickup unit 4, the shake detection unit 5, the storage unit 6, and the position detection unit 8. The storage section 11 temporarily stores the result of operation (predictive shake information) in the arithmetic section 10 in a work area such as RAM.

A shake-correction use driving control unit 12 as a control unit is connected in between the shake correction unit 7 and the central processing unit 9.

The arithmetic section 10 performs arithmetic operation for predictive shake information from a predetermined arithmetic expression based on at least one shake detection information from the shake detection unit 5. The arithmetic section 10 calculates and determines the position which is a correcting-operation start position of the shake correction unit 7 and at which the predictive shake is cancelled out based on the predictive shake information when the central processing unit 9 receives a signal indicating an instruction to image.

The shake-correction use driving control unit 12 controls driving of the shake correction unit 7 to the correcting-operation start position. The shake-correction use driving control unit 12 controls driving of the shake correction unit 7 at the correcting-operation start position based on the shake detection information and the information for focal lengths of the imaging optical system 3, and corrects image blurring.

As a result, the apparatus according to the first embodiment calculates the predictive shake information based on the shake detection information detected by the shake detection unit 5 to determine the position which is the correcting-operation start position of the shake correction unit 7 and at which the predictive shake is cancelled out. Further, the apparatus controls driving of the shake correction unit 7 at the correcting-operation start position to correct the shake. Therefore, in the first embodiment, the shake of the camera 1 can be corrected quickly and reliably, thus reducing imaging failures due to hand shake or the like. That is, in the first embodiment, by controlling driving of the shake correction unit 7 at the correcting-operation start position, a movable range of the shake correction unit 7 with respect to an actual hand shake or the like can be effectively utilized. Thus, excellent correction effect can be obtained, so that imaging failures due to hand shake or the like can be remarkably reduced.

Figure 4:
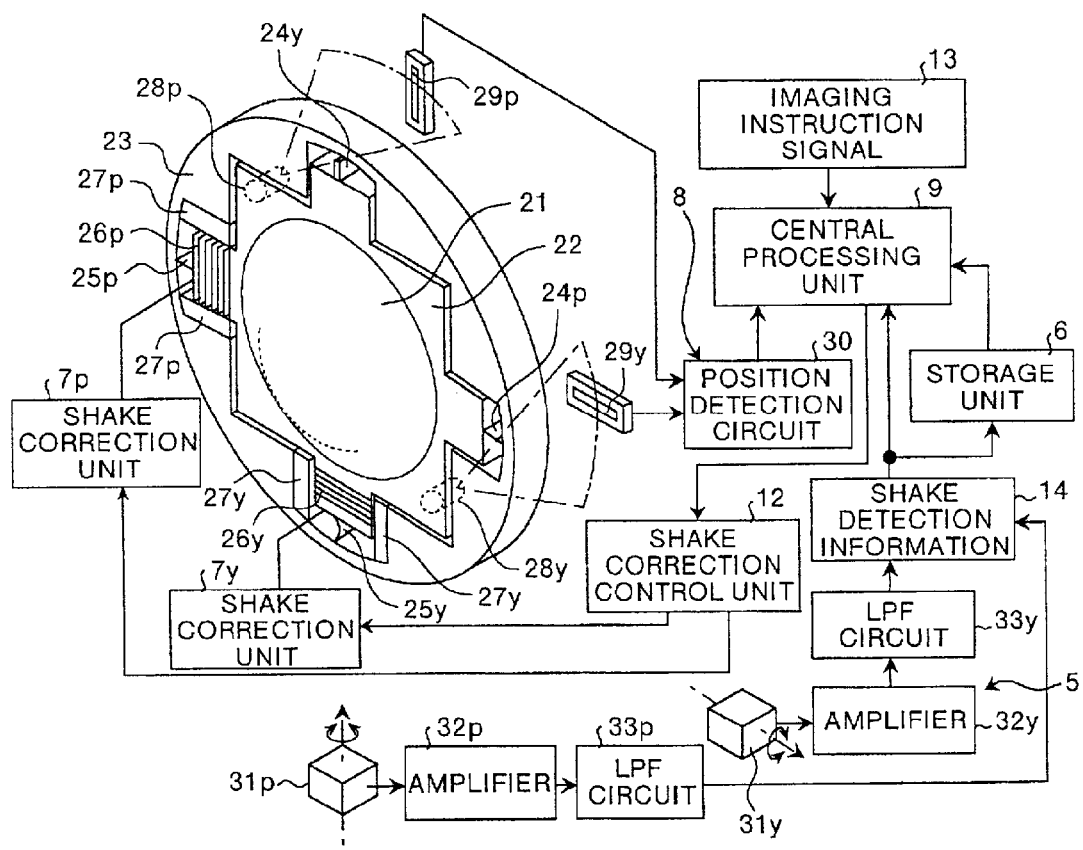
FIG. 4 is a perspective view including a control system showing an example of the configuration of the first embodiment.

The block diagram in FIG. 4 shows a specific configuration of the first embodiment. In FIG. 4, legend 13 represents a signal indicating an instruction to image. The imaging instruction signal 13 is generated when an operator operates an imaging-start instruction unit such as a release button of the camera 1. Legend 4 represents shake detection information detected by the shake detection unit 5.

The shake correction unit 7 displaces a correcting lens 21 as a part of the lens included in the imaging optical system 3 in the yaw direction and the pitch direction by a specified quantity. The shake correction unit 7 is composed of a yaw-direction shake correction unit 7y and a pitch-direction shake correction unit 7p.

The correcting lens 21 is fixed to a lens frame 22. The lens frame 22 is mounted on a lens holder 23 movably in the yaw direction and the pitch direction orthogonal to the optical axis of the imaging optical system 3 through elastic bodies 24y, 24p, 25y, and 25p.

A yaw-direction driving section and a pitch-direction driving section are mounted between the lens frame 22 and the lens holder 23, respectively. The yaw-direction driving section and the pitch-direction driving section are composed of coils 26y and 26p and magnets 27y and 27p. The yaw-direction driving section and the pitch-direction driving section obtain driving force by utilizing electromagnetic induction based on the coils 26y and 26p and the magnets 27y and 27p.

The coils 26y and 26p are wound around two parts in the elastic bodies 25y and 25p of the lens frame 22. The magnets 27y are disposed on both sides of the coil 26y of the lens holder 23, and the magnets 27p are also disposed on both sides of the coil 26p. The correcting lens 21 can be displaced a specified quantity in the yaw direction and the pitch direction by controlling electricity to the coils 26y and 26p by the shake correction units 7y and 7p.

The position detection unit 8 is composed of two light sources 28y and 28p, two position detection sensors 29y and 29p, and a position detection circuit 30. The two light sources 28y and 28p are fixed to the lens frame 22 and emit slit-like light. The two position detection sensors 29y and 29p are primary line sensors and disposed so that the slit-like lights emitted from the two light sources 28y and 28p become substantially perpendicular to the direction of each sensor line. The position detection circuit 30 inputs the detected output from the two position detection sensors 29y and 29p. The two position detection sensors 29y and 29p are disposed so that coordinates to be read are orthogonal to each other in the yaw direction and the pitch direction. As a result, the position detection unit 8 can always detect the positions of the correcting lens 21 in the yaw direction and the pitch direction.

The shake detection unit 5 is composed of physical quantity sensors 31y and 31p, amplifiers 32y and 32p, and LPF (low-pass filter) circuits 33y and 33p. The physical quantity sensors 31y and 31p are formed with gyros and acceleration sensors, which are provided in the yaw direction and the pitch direction, respectively, and each of which detects shake based on an angular velocity and an angular acceleration about a specified axis. The amplifiers 32y and 32p amplify detected output of the physical quantity sensors 31y and 31p. The LPF (low-pass filter) circuits 33y and 33p subject the input to filtering in order to remove unnecessary signal components after amplification.

Figure 5:
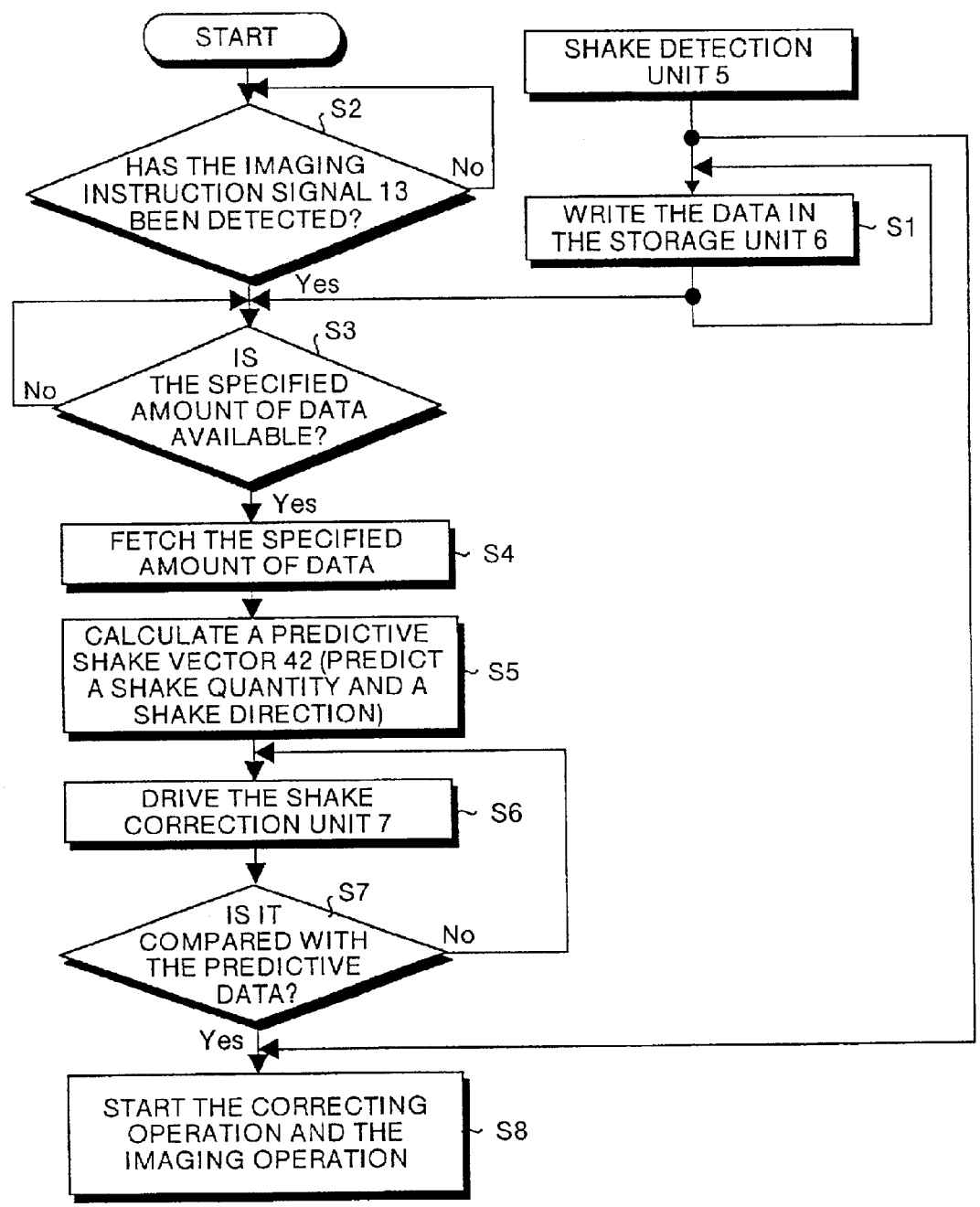
FIG. 5 is a flow chart showing an example of controlling an imaging procedure of the first embodiment.

The flow chart in FIG. 5 shows an imaging procedure executed under the control by the central processing unit 9 in the first embodiment configured as explained above.

The shake detection unit 5 detects how the camera 1 shakes at any time. The shake detection information 14 detected by the shake detection unit 5 is written in the storage unit 6 to be updated and stored (S1). Accordingly, the storage unit 6 stores the updated shake detection information 14 for a specified time.

The camera 1 always checks whether the imaging instruction signal 13 is generated (S2). When the imaging instruction signal 13 has been detected (S2, Yes), it is confirmed whether the data for the shake detection information 14 is stored in the storage unit 6 by a sufficient amount required for enabling prediction of a shake quantity (S3).

When it is confirmed that the specified amount of data for the shake detection information 14 has been stored (S3, Yes), the specified amount of data for the shake detection information 14 is fetched from the storage unit 6 into the arithmetic section 10. The arithmetic section 10 performs arithmetic operations as follows. For example, the arithmetic section 10 makes approximations of the data for the shake detection information 14 based on the least square method or calculation of a multiple regression line. Subsequently, the arithmetic section 10 calculates a differential coefficient of an approximated curve from angular displacements in the yaw direction and the pitch direction in the latest data. The arithmetic section 10 estimates angular displacements of estimated shake (predictive shake information) in the yaw direction and the pitch direction using the differential coefficient (S4).

A predictive shake vector 42 (predictive data) on the image forming surface is calculated from the predictive shake information and the focal length information for the imaging lens 2 (S5). A shake quantity and a shake direction are predicted based on the processing at step S5. Further, a position, which is a correcting-operation start position of the shake correction unit 7 (correcting lens 21) and at which the predicted shake is cancelled out, is determined based on the predictive shake information.

Figure 6:
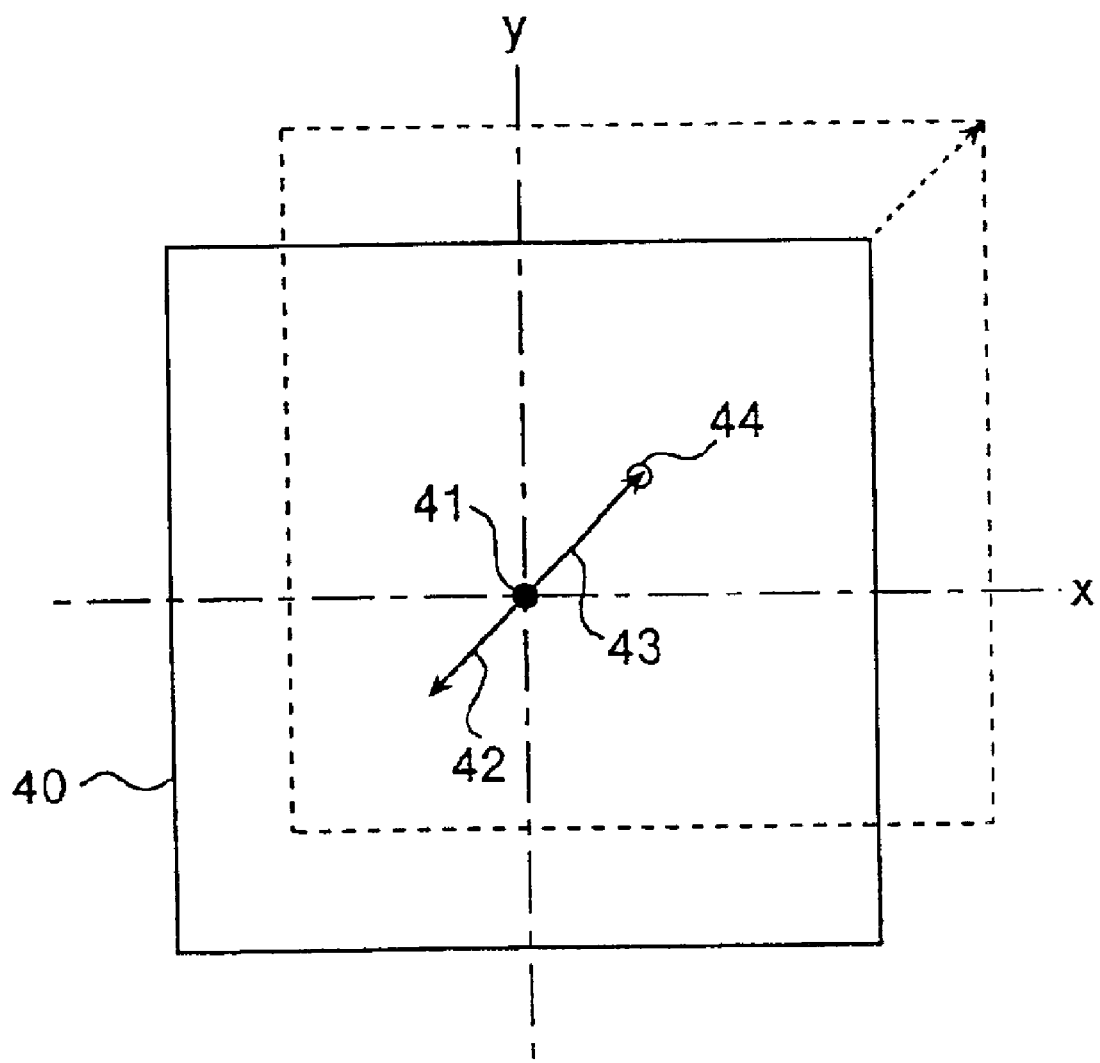
FIG. 6 shows control for driving the device of the first embodiment to a correcting-operation start position.

As shown in FIG. 6, the shake-correction use driving control unit 12 moves the correcting lens 21 to the correcting-operation start position through driving of the shake correction unit 7 (S6). That is, as shown in FIG. 6, the correcting lens 21 is moved so that the center 44 of an imaging surface 40 is placed on a point-symmetrical position (position of a correction vector 43 (quantity of predictive correction)) to an intersection 41 of the imaging optical axis and the imaging surface 40 with reference to the predictive shake vector 42 (predictive shake quantity).

When it is detected that the correcting lens 21 has moved to the correcting-operation start position based on the comparison between the detected output of the position detection unit 8 and the predictive shake vector 42 (S7, Yes), the correcting operation and the imaging operation are started (S8).

That is, when exposure is instructed by the central processing unit 9, the shake-correction use driving control unit 12 controls driving of the yaw-direction shake correction unit 7y and the pitch-direction shake correction unit 7p based on the shake detection information 14 and the focal length information for the imaging lens 2. Accordingly, electricity for the coils 26y and 26p in the yaw direction and the pitch direction is controlled, and the correcting lens 21 moves in the yaw direction and the pitch direction about the correcting-operation start position (center 44) as a movement center. As a result, the shake is corrected.

Figure 7:
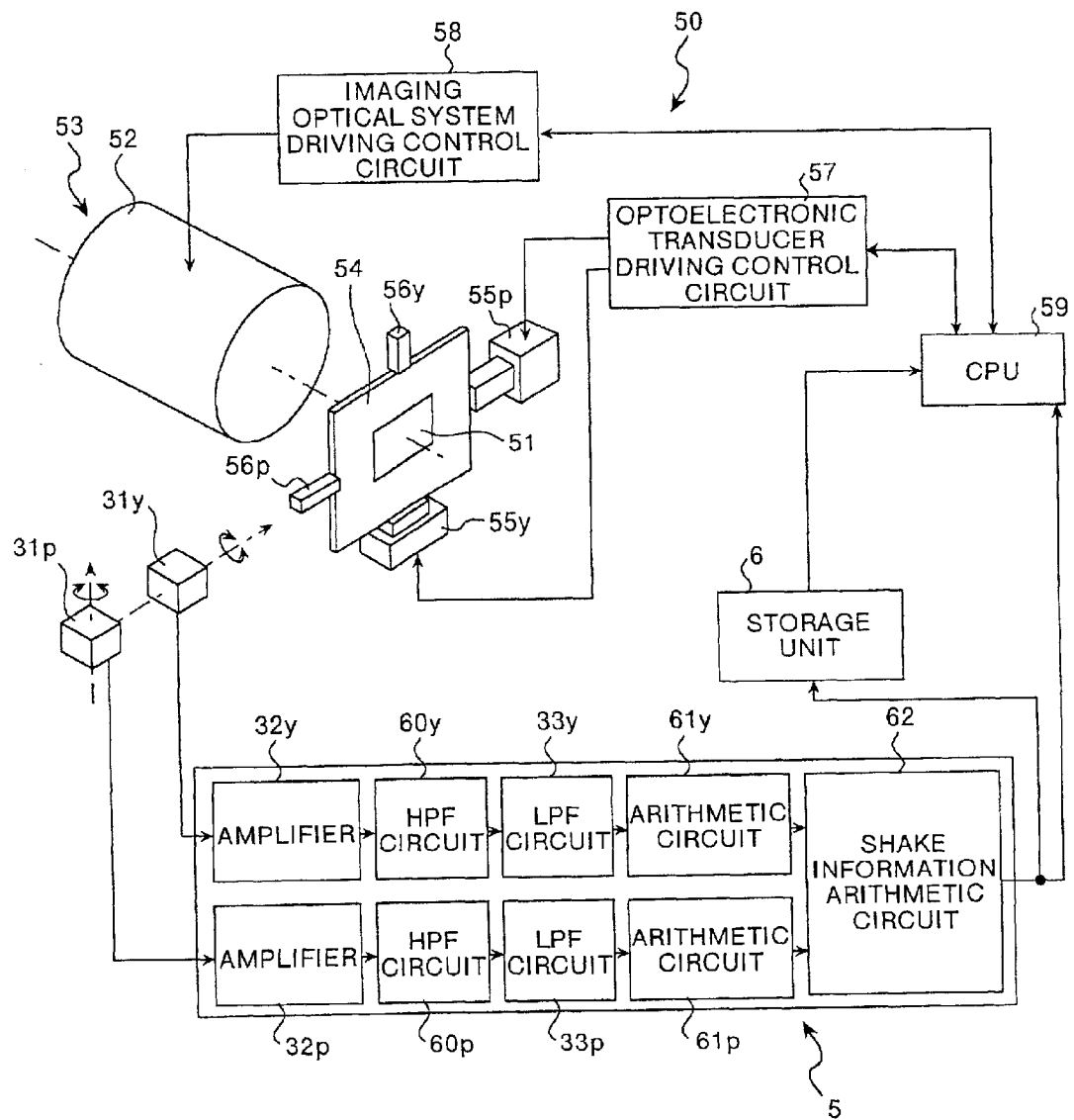
FIG. 7 is a perspective view including a control system showing an example of the structure of a second embodiment of this invention.
Figure 8:
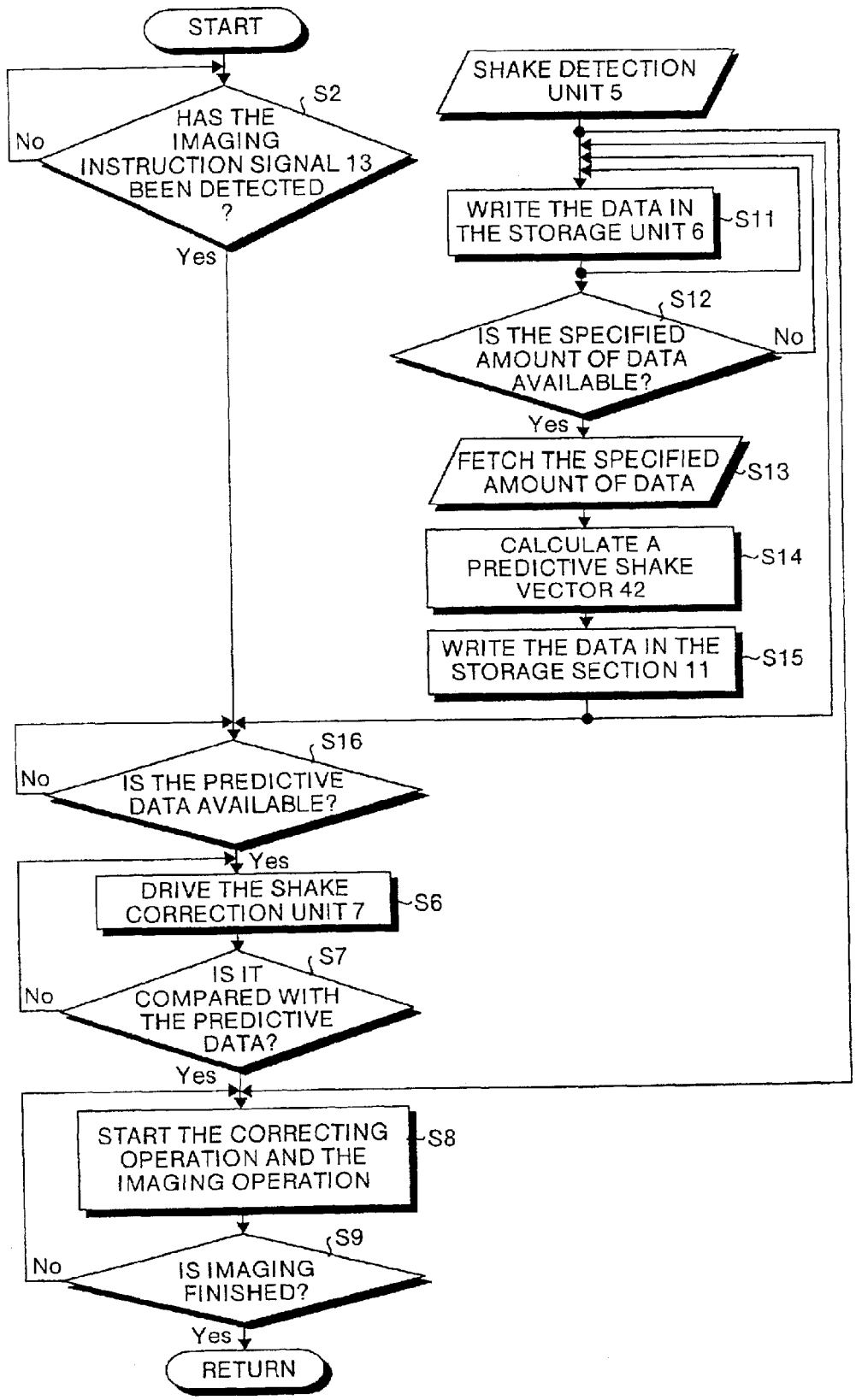
FIG. 8 is a flowchart showing an example of controlling an imaging procedure of the second embodiment.

FIG. 7 and FIG. 8 show a second embodiment of this invention. In the figures, the same legends as these in FIG. 1 to FIG. 6 represent the same components.

The second embodiment presents an example applicable to an imaging apparatus such as a digital camera 50, which uses a two-dimensional solid image pickup device 51 such as a CCD as the image pickup unit 4.

In the second embodiment, apart of the imaging optical system 53 such as an imaging lens 52 is not moved, but a board 54 with the two-dimensional solid image pickup device 51 mounted is moved in the yaw direction and the pitch direction. The board 54 moves directly in the yaw direction and the pitch direction by shake correction units 55y, 55p, and elastic bodies 56y, 56p, and then corrects the shake. Each of the shake correction units 55y and 55p is formed with a piezoelectric element and a mechanical displacement enlarging mechanism applying the action of a lever.

The shake correction units 55y and 55p are controlled by an optoelectronic transducer driving control circuit 57 as a control unit. The optoelectronic transducer driving control circuit 57 and an imaging optical system driving control circuit 58 for the imaging optical system 53 are controlled by a CPU 59. The CPU 59 includes a function corresponding to the arithmetic section 10 (prediction arithmetic unit). The shake detection unit 5 and the storage unit 6 are the same as these in FIG. 3 and FIG. 4 of the first embodiment. In FIG. 7, the shake detection unit 5 includes HPF (high-pass filter) circuits 60y and 60p used for filtering, arithmetic circuits 61y and 61p, and a shake information arithmetic circuit 62.

In the second embodiment, in the same manner as that of the first embodiment, by utilizing linearity of an applied voltage to the shake correction units 55y and 55p and the displacement quantity of the two-dimensional solid image pickup device 51, a displacement quantity of the two-dimensional solid image pickup device 51 can be estimated from the applied voltage. Therefore, in the second embodiment, an encoder to detect a position of the shake correction unit 7 (shake correction units 55y and 55p) can be omitted.

FIG. 8 is a flow chart showing the imaging procedure of the second embodiment. In the imaging procedure of the second embodiment, a specified amount of data for the shake detection information is fetched at the steps (S11, and S12, Yes) at which the specified amount of shake detection information from the shake detection unit 5 is stored in the storage unit 6 regardless of presence or absence of the imaging instruction signal 13 (S13).

The arithmetic section 10 performs arithmetic operation for the predictive shake vector 42 at any time (S14), the storage unit 6 overwrites the latest result (S15), and the predictive shake vector 42 (predictive data) is referred to (S16, Yes) in response to generation of the imaging instruction signal 13 (S2, Yes). Accordingly, the shake correction unit 7 can quickly be driven (S6).

Figure 9:
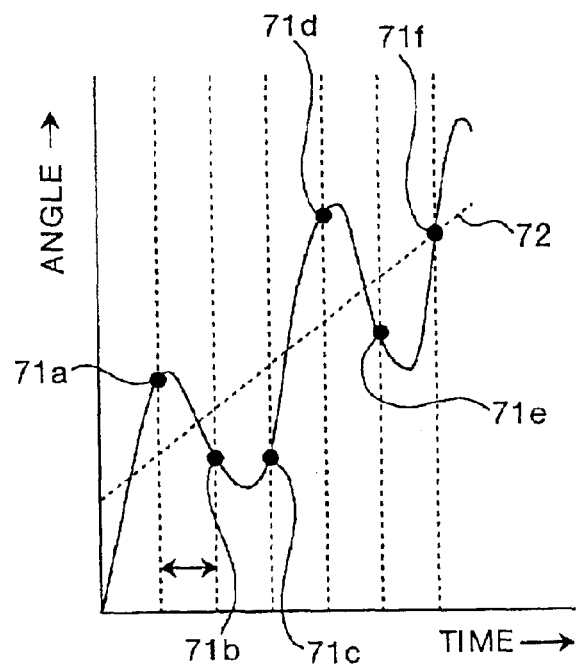
FIG. 9 is a graph showing an example of data processing in a third embodiment of this invention.

FIG. 9 shows a third embodiment. The third embodiment relates to arithmetic operation for predictive shake information (predictive shake vector 42 and predictive data) by the arithmetic section 10.

In the third embodiment, the shake detection information 14 detected by the shake detection unit 5 is not used as it is at the time of operating the predictive shake information. In the third embodiment, of the shake detection information 14 stored in the storage unit 6, shake detection information (71a to 71f) as a part of the shake detection information 14 for a predetermined time interval (e.g., a time interval longer than a sampling time interval for A/D conversion) is used. In the third embodiment, a primary regression line 72 is computed from the partial shake detection information (71a to 71f), and each inclination in the yaw direction and the pitch direction is determined as an angular displacement of predictive shake (predictive shake information).

According to the third embodiment, when a shake component is biased to a particular direction due to hand shake or the like shown in FIG. 1, a correcting-operation start position, which is the correcting-operation start position effective to perform shake correction by efficiently using a movable range of the shake correction unit 7, can be calculated.

Figure 10:
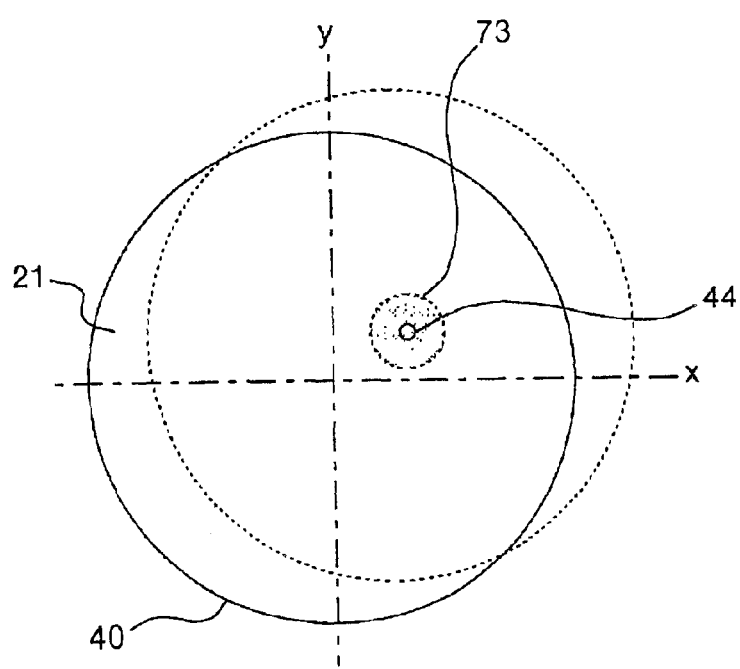
FIG. 10 shows a fourth embodiment of this invention.

FIG. 10 shows a fourth embodiment. In the figure, the same legends as these in FIG. 1 to FIG. 9 represent the same components.

In the fourth embodiment, when the shake-correction use driving control unit 12 moves the center 44 of the correcting lens 21 to a correcting-operation start position through driving of the shake correction unit 7, the correcting-operation start position is not treated as a point but is given as information for an area 73 having a certain range.

In the fourth embodiment, the area 73 having a predetermined radius about the computed and determined correcting-operation start position of the area is determined as an area of a correction start position. As a result, in the fourth embodiment, actual imaging and shake correction can be started at the point in time when it is detected that the center 44 of the imaging surface 40 of the correcting lens 21 has reached the edge of the area 73, thus reducing the time for starting imaging.

Figure 11:
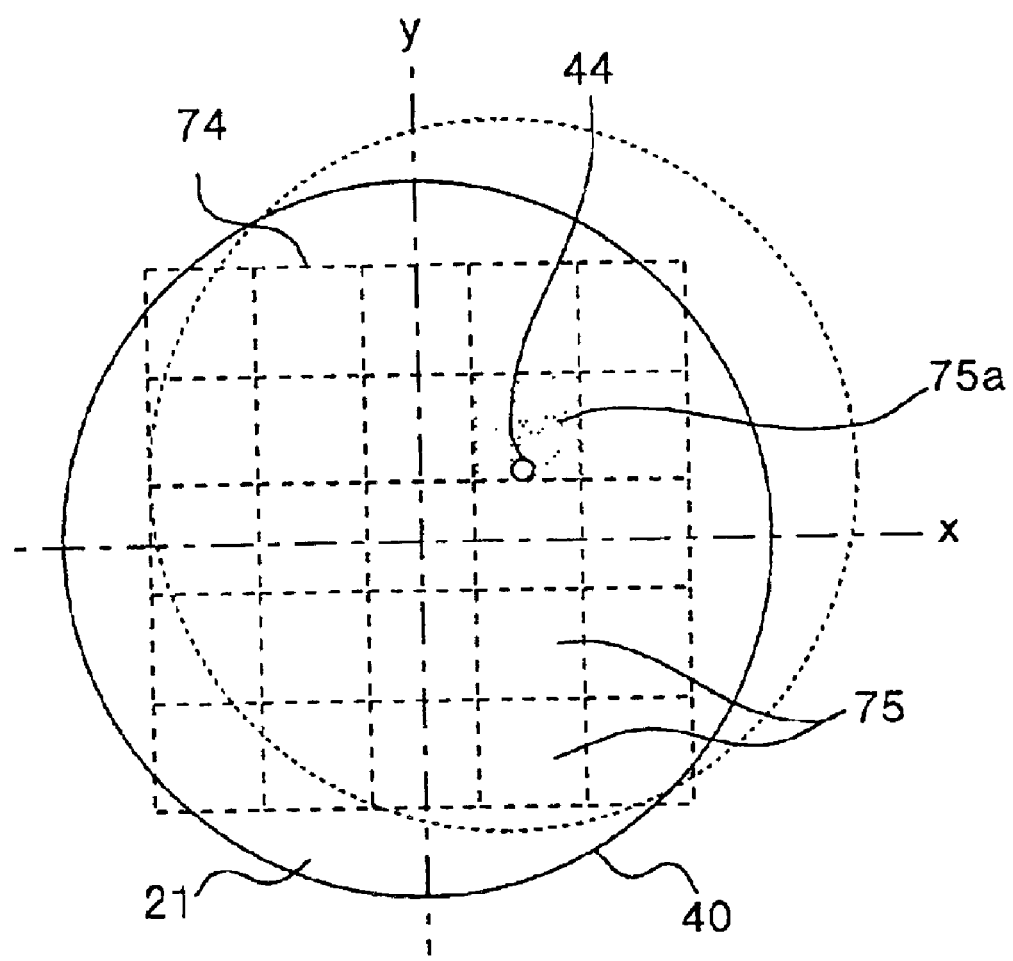
FIG. 11 shows a fifth embodiment of this invention.
Figure 12:
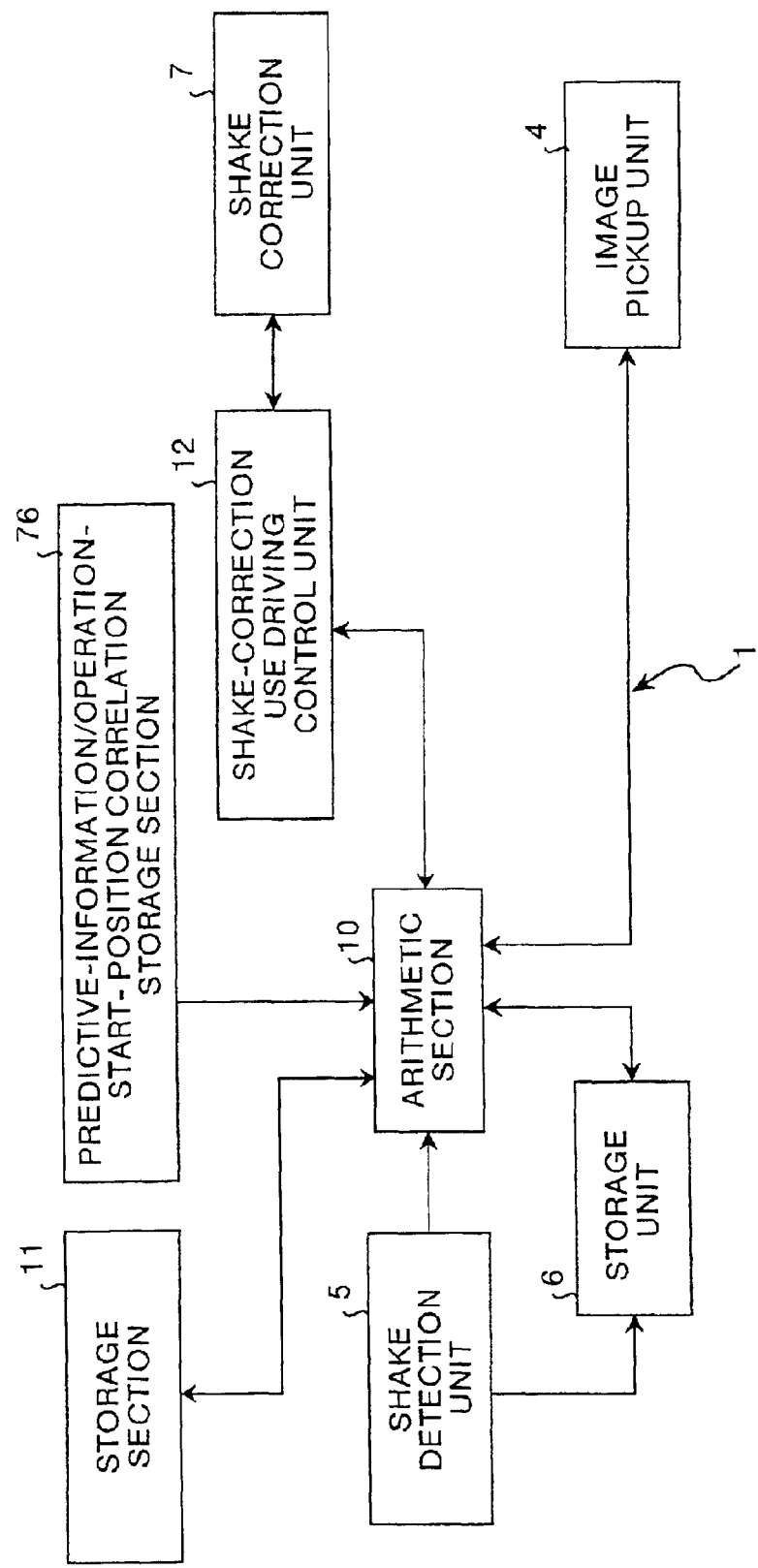
FIG. 12 is a block diagram showing an example of the functional structure of the fifth embodiment.

FIG. 11 and FIG. 12 show a fifth embodiment. In the figures, the same legends as these in FIG. 1 to FIG. 10 represent the same components.

In the fifth embodiment, a range 74, where the correcting lens 21 can be moved through driving of the shake correction unit 7, is divided into plural areas, in this example, 5×5=25 areas as shown by broken lines in FIG. 11. Each of the 25-divided areas is determined as an area 75 of the correcting-operation start position. The predictive-shake angular displacement (predictive shake information), the focal length information, and 25 areas 75 of the correcting-operation start position are correlated to each other respectively and previously stored in a predictive-information/operation-start-position correlation storage section (correlation storage unit) 76 as a correlation table (corresponding relation).

The arithmetic section 10 has a correcting-operation start position determination unit (not shown). When imaging is to be performed, the correcting-operation start position determination unit determines an area 75a as a correcting-operation start position of the shake correction unit 7. More specifically, the area 75a is determined from the predictive-shake angular displacement (predictive shake information) and the focal length information for the imaging lens 2 by referring to the correlation table stored in the predictive-information/operation-start-position correlation storage section (correlation storage unit) 76.

According to the fifth embodiment, the arithmetic operation process to calculate the predictive shake vector 42 can be omitted, so that imaging with fewer time lags becomes possible.

Figure 13:
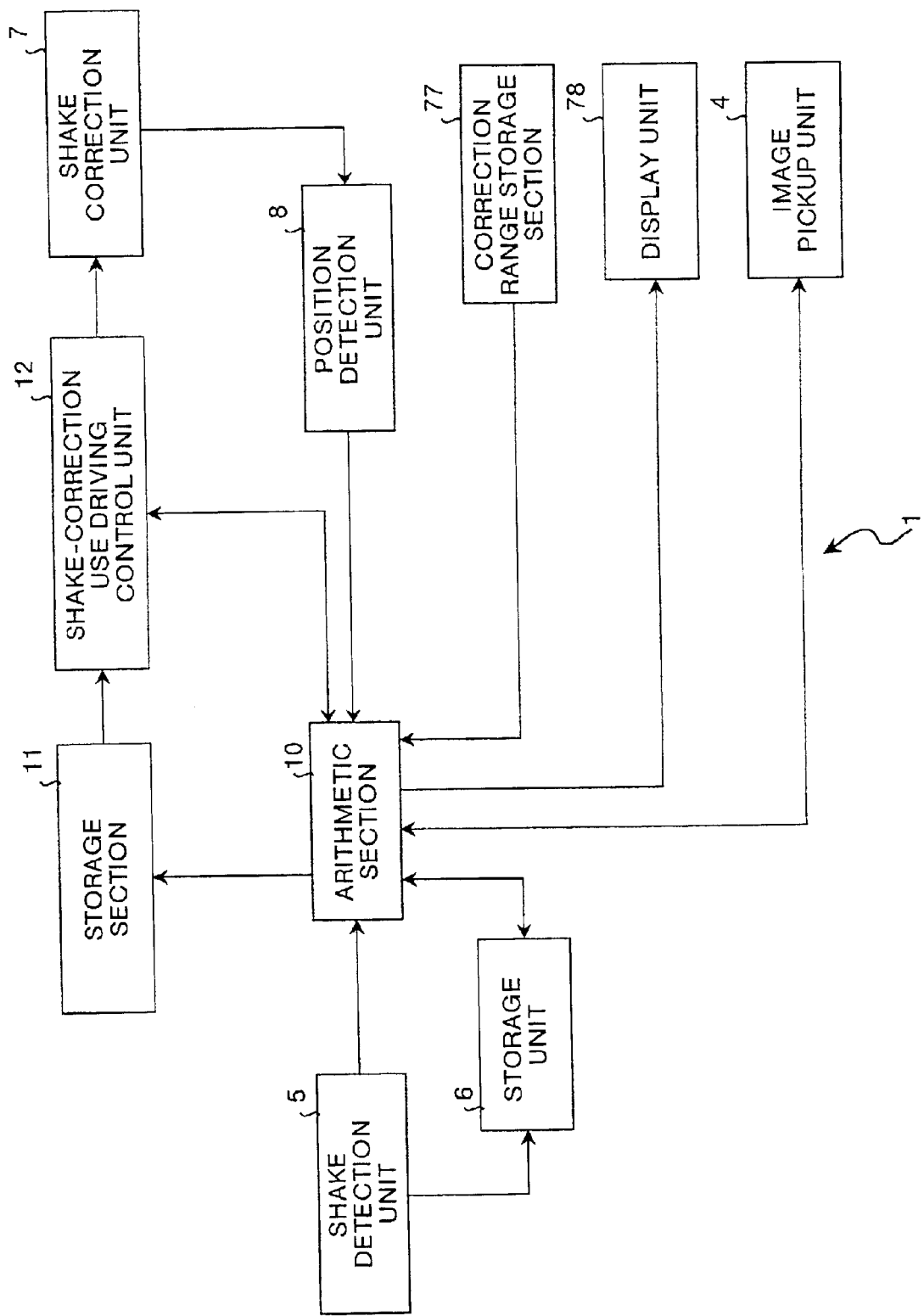
FIG. 13 is a block diagram showing an example of the functional structure of a sixth and a ninth embodiments of this invention.

FIG. 13 shows a sixth embodiment. In the figure, the same legends as these in FIG. 1 to FIG. 12 represent the same components.

In the sixth embodiment, a range where driving of the shake correction unit 7 can be controlled, that is, the range, where the correcting lens 21 can be moved through driving of the shake correction unit 7 (hereafter, called a correction range), is previously stored in a correction range storage section 77.

The arithmetic section 10 has a detection unit (not shown). The detection unit detects at any time whether a shake quantity defined by the shake detection information 14 and the focal length information exceeds the correction range previously stored in the correction range storage section 77.

The arithmetic section 10 has a display unit 78 as a warning unit. The display unit 78 gives a warning to the operator when the detection unit detects that the shake quantity has exceeded the correction range during control for the driving of the shake correction unit 7.

For example, the camera 1 with a finder gives a warning through lighting on an LED. The digital camera or the video camera having a liquid crystal display monitor or a liquid crystal finder displays a warning with text information or the like on its liquid crystal screen.

As explained above, in the sixth embodiment, a warning, that the hand-shake correction has been unsuccessful or a message to urge the operator to image again because of the unsuccessful correction, can be displayed. Accordingly, the sixth embodiment has an effect of helping collect image information intended by the operator.

In the sixth embodiment, by detecting the shake that exceeds the correction range, it is possible to display a message to urge the operator to stop imaging, stop capturing imaged image information into an erasable recording medium such as a digital camera, or provide an inquiry whether imaging is stopped to the operator. Thus, in the sixth embodiment, a waste of battery or memory storage capacity can be prevented.

Figure 14:
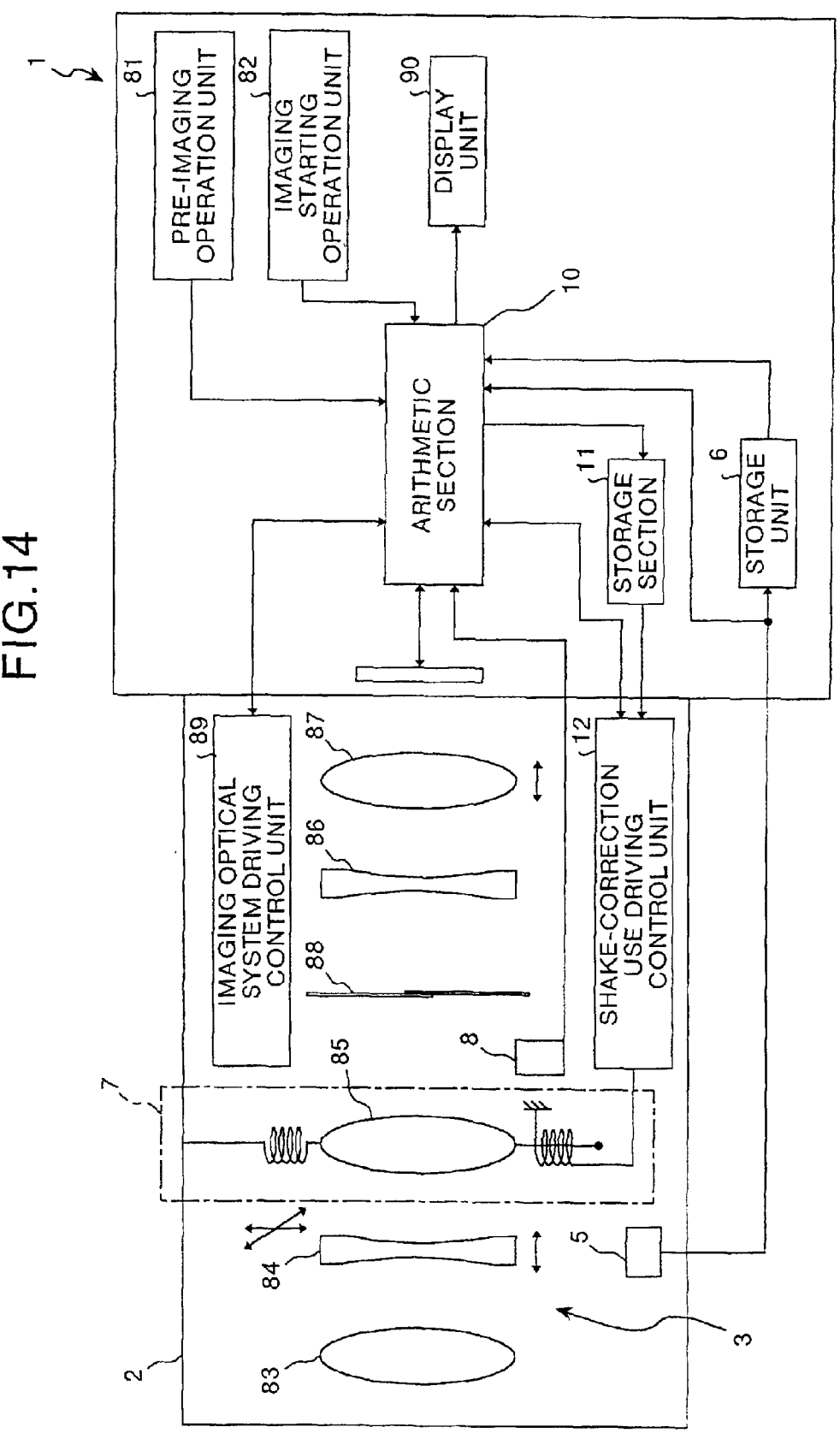
FIG. 14 is a block diagram showing both examples of the functional and specific structures of a seventh embodiment of this invention.
Figure 15:
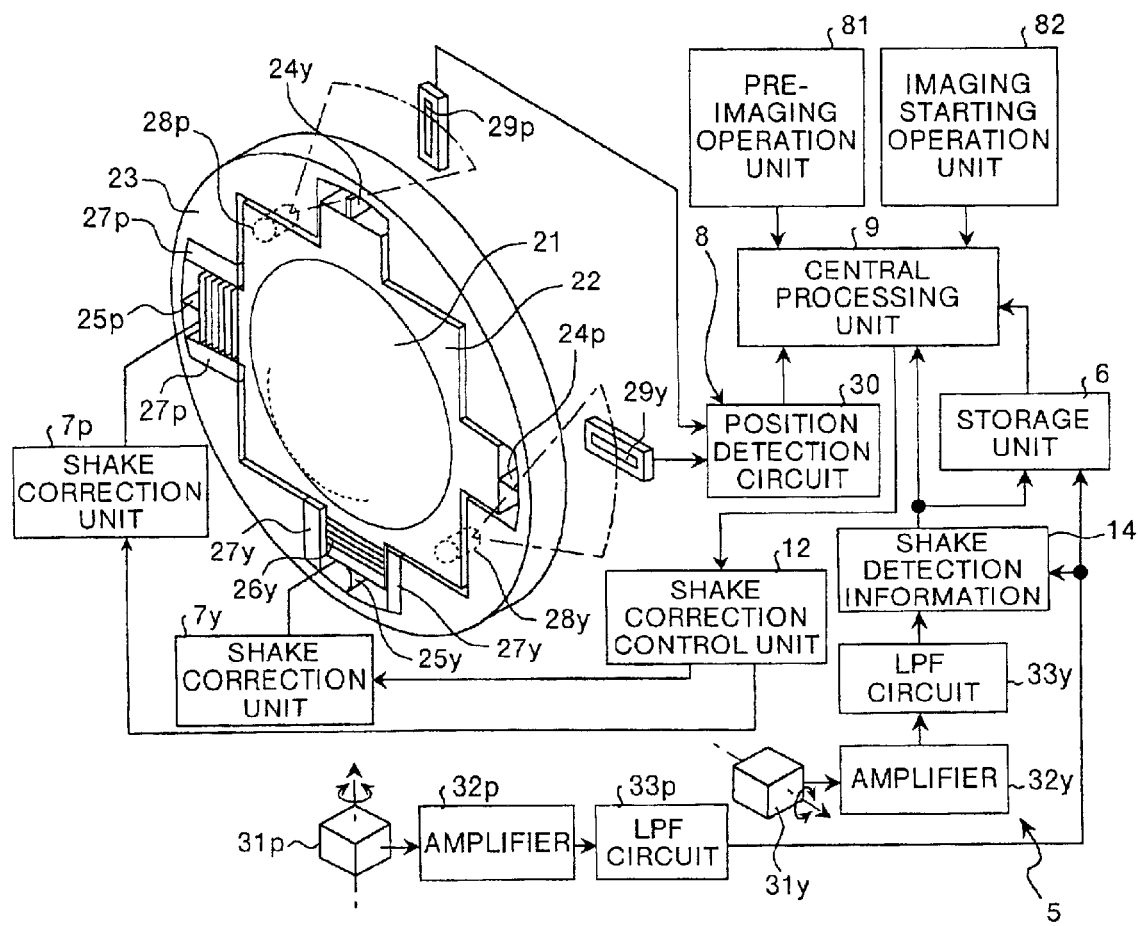
FIG. 15 is a perspective view including a control system showing an example of the configuration of the seventh embodiment.
Figure 16:
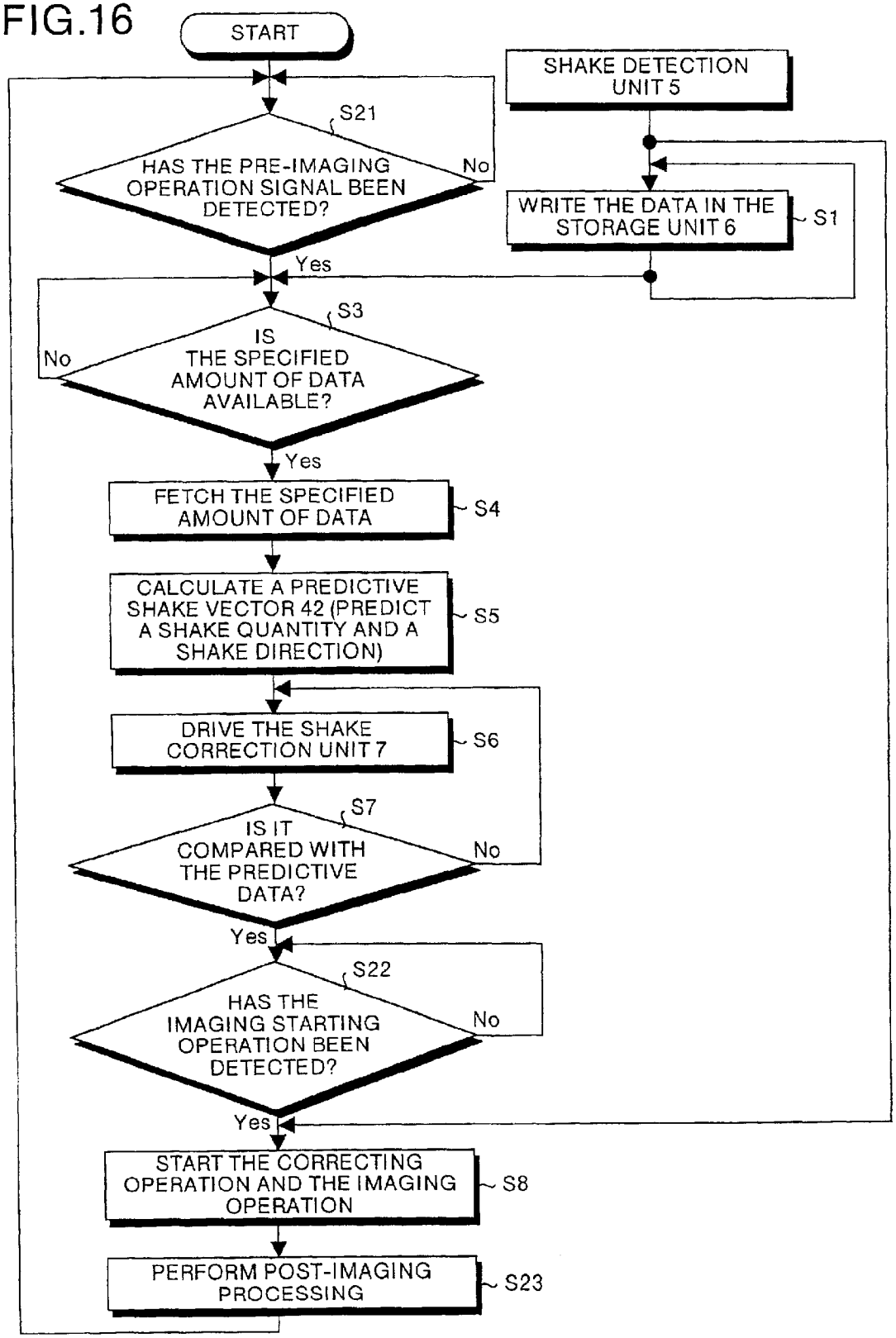
FIG. 16 is a flow chart showing an example of controlling an imaging procedure of the seventh embodiment.

FIG. 14 to FIG. 16 show a seventh embodiment. In the figures, the same legends as these in FIG. 1 to FIG. 13 represent the same components. In the seventh embodiment, a pre-imaging operation unit 81 and an imaging starting operation unit 82 are provided.

The pre-imaging operation unit 81 detects a pre-imaging operation of the camera 1, for example, ON of a half-press switch of a release button, and outputs a signal indicating a pre-imaging operation to the arithmetic section 10.

The imaging starting operation unit 82 detects the imaging starting operation of the camera 1, for example, ON of the switch by further pressing the release button after the pre-imaging operation signal is output from the pre-imaging operation unit 81, and outputs a signal indicating an imaging starting operation to the arithmetic section 10.

The shake-correction use driving control unit 12 connected to the arithmetic section 10 has a function as a control unit. The shake-correction use driving control unit 12 controls driving of the shake correction unit 7 to a correcting-operation start position based on the output of the pre-imaging operation signal. Further, the shake-correction use driving control unit 12 controls driving of the shake correction unit 7 based on the output of the imaging starting operation signal, and corrects image blurring.

The imaging optical system 3 is composed of plural lenses 83 to 87 and a shutter 88 and controlled by an imaging optical system driving control unit 89. The lens 85 of the plural lenses 83 to 87 is a correcting lens to correct a blur of a formed image. The shake correction unit 7 is driven to move the lens 85 under the control of the shake-correction use driving control unit 12. Accordingly, the blur of the formed image on the image pickup unit 4 can be corrected. In FIG. 14, legend 90 represents a display unit provided in the camera 1.

The effect due to the seventh embodiment will be explained below. Predictive shake information is calculated based on at least one of the shake detection information 14 from the shake detection unit 5, and the computed information is temporarily stored in the storage section 11.

Subsequently, the pre-imaging operation unit 81 detects a pre-imaging operation of the camera 1, for example, ON of the half-press switch of the release button, and outputs the pre-imaging operation signal to the arithmetic section 10.

The arithmetic section 10 then determines a position which is a correcting-operation start position of the shake correction unit 7 based on the predictive shake information from the storage section 11 and at which the predictive shake is cancelled out. The shake-correction use driving control unit 12 drives the shake correction unit 7 to the correcting-operation start position.

The imaging starting operation unit 82 detects the imaging starting operation of the camera 1, for example, ON of the switch by further pressing the release button, and outputs the imaging starting operation signal to the arithmetic section 10.

The driving of the shake correction unit 7 is controlled based on the shake detection information 14 from the shake detection unit 5 and the focal length information for the imaging optical system 3 or the like, and imaging operations (a releasing operation and an exposing operation) are performed to record an image.

As a result, in the seventh embodiment, the shake can be corrected by detecting the pre-imaging operation to drive the shake correction unit to the correcting-operation start position and then detecting the imaging starting operation. Accordingly, in the seventh embodiment, imaging failures due to hand shake can further be reduced.

The flow chart in FIG. 16 shows an imaging procedure performed under the control of the central processing unit 9 in the seventh embodiment configured as explained above.

The shake detection unit 5 detects at any time how the camera 1 shakes. The shake detection information 14 detected by the shake detection unit 5 is written in the storage unit 6 to be updated and stored (S1). Accordingly, the storage unit 6 updates and stores the latest shake detection information 14 for the specified time.

The camera 1 checks whether the pre-imaging operation signal is issued from the pre-imaging operation unit 81 (S21) When the pre-imaging operation signal is detected (S21, Yes), it is confirmed whether the data for the shake detection information 14 is stored in the storage unit 6 by a sufficient amount required for enabling prediction of a shake quantity (S3).

When it is confirmed that the specified amount of data for the shake detection information 14 has been stored (S3, Yes), the specified amount of data for the shake detection information 14 is fetched from the storage unit 6 into the arithmetic section 10. The arithmetic section 10 performs arithmetic operation as follows. For example, the arithmetic section 10 makes approximations of the data for the shake detection information 14 based on the least square method or calculation of a multiple regression line. Subsequently, the arithmetic section 10 calculates a differential coefficient of an approximated curve from angular displacements in the yaw direction and the pitch direction in the latest data. The arithmetic section 10 estimates angular displacements of estimated shake (predictive shake information) in the yaw direction and the pitch direction using the differential coefficient (S4).

A predictive shake vector 42 (predictive data) on the image forming surface is calculated from the predictive shake information and the focal length information for the imaging lens 2 (S5). A shake quantity and a shake direction are predicted based on the processing at step S5. Further, a position, which is a correcting-operation start position of the shake correction unit 7 (correcting lens 21) and at which the predicted shake will be cancelled out, is determined based on the predictive shake information.

As shown in FIG. 6, the shake-correction use driving control unit 12 moves the correcting lens 21 to the correcting-operation start position through driving of the shake correction unit 7 (S6). That is, as shown in FIG. 6, the correcting lens 21 is moved so that the center 44 of the imaging surface 40 is placed on a point-symmetrical position (position of the correction vector 43) to the intersection 41 of the imaging optical axis and the imaging surface 40 with reference to the predictive shake vector 42.

When it is detected that the correcting lens 21 has moved to the correcting-operation start position based on the comparison between the detected output of the position detection unit 8 and the predictive shake vector 42 (S7, Yes), it is checked whether the imaging starting operation has been performed (S22). That is, it is checked whether the imaging starting operation signal has been issued from the imaging starting operation unit 82. When the imaging starting operation signal is detected (S22, Yes), the correcting operation and the imaging operation are started (S8).

That is, when exposure is instructed by the central processing unit 9, the shake-correction use driving control unit 12 controls driving of the yaw-direction shake correction unit 7y and the pitch-direction shake correction unit 7p based on the shake detection information 14 and the focal length information for the imaging lens 2. Accordingly, electricity for the coils 26y and 26p in the yaw direction and the pitch direction is controlled, and the correcting lens 21 is moved in the yaw direction and the pitch direction about the correcting-operation start position (center 44) for movement. As a result, the shake is corrected. Subsequently, post-imaging processing is performed (S23), and the processing enters again into a standby status for checking presence or absence of the pre-imaging operation signal (S21).

Figure 17:
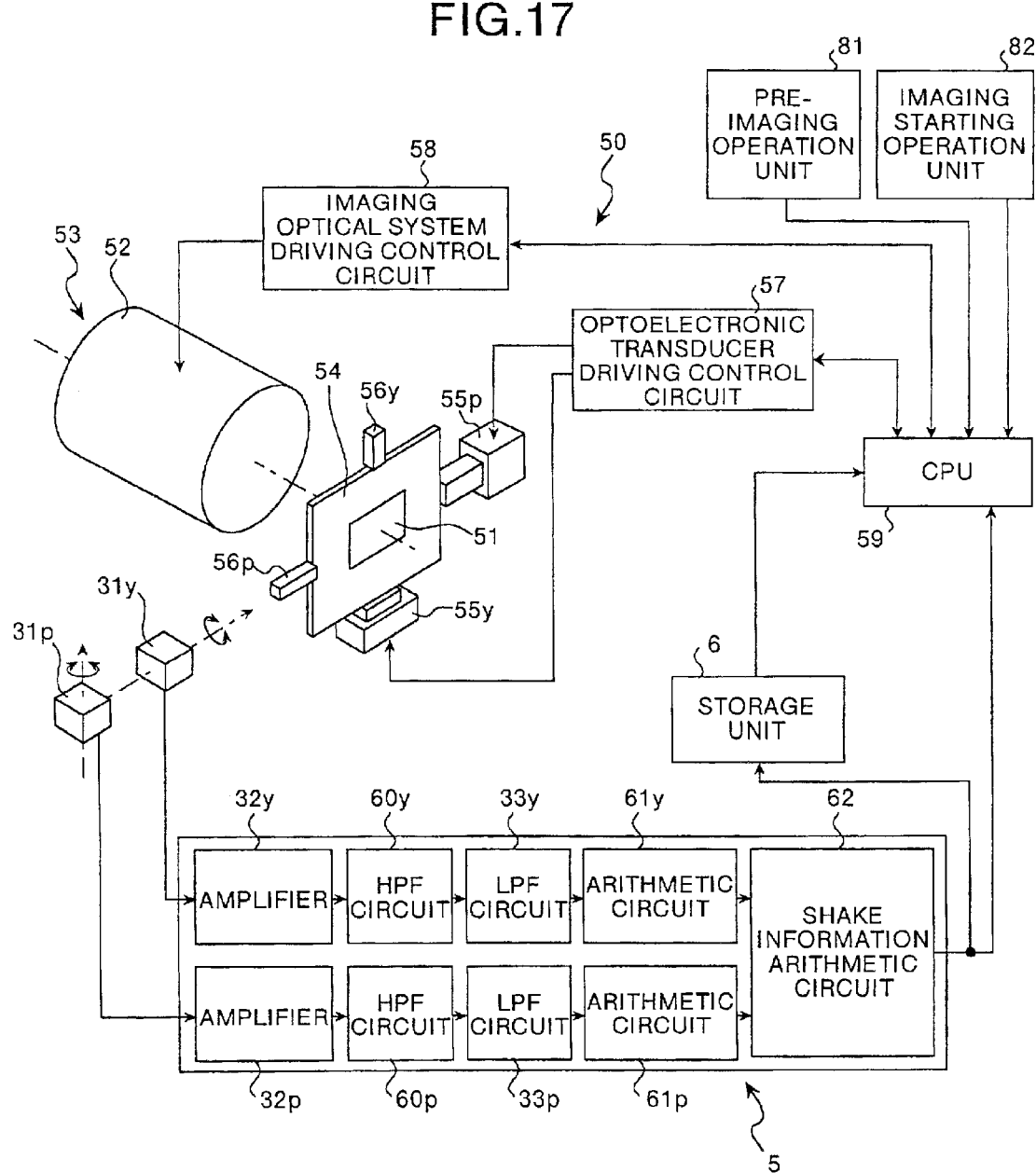
FIG. 17 is a perspective view including a control system showing an example of the structure of an eighth embodiment of this invention.
Figure 18:
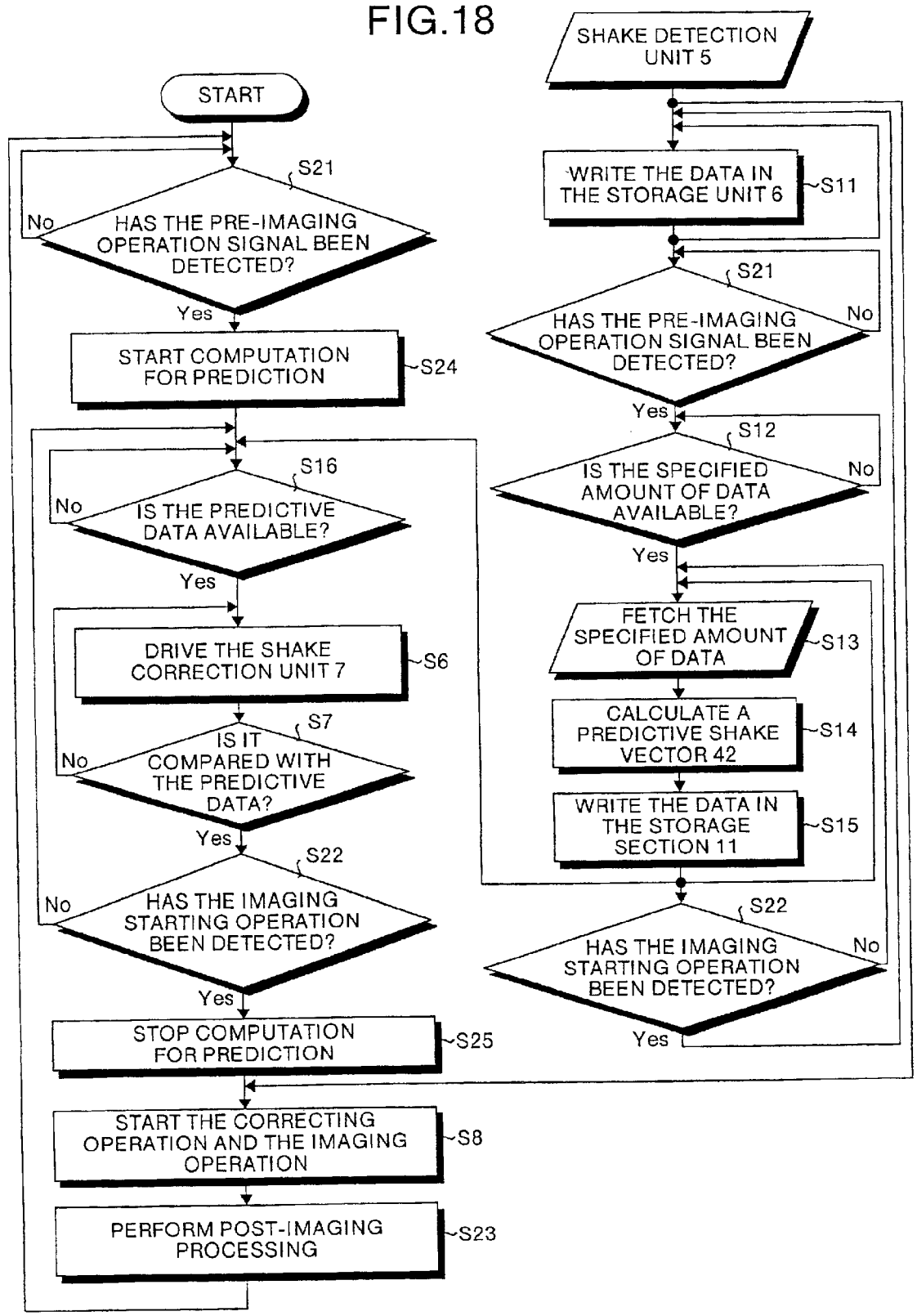
FIG. 18 is a flow chart showing an example of controlling an imaging procedure of the eighth embodiment.

FIG. 17 and FIG. 18 show an eighth embodiment. In the figures, the same legends as these in FIG. 1 to FIG. 16 represent the same components. The eighth embodiment provides, like the seventh embodiment, the pre-imaging operation unit 81 and the imaging starting operation unit 82.

The flow chart in FIG. 18 shows the imaging procedure performed under the control by the central processing unit 9 in the eighth embodiment.

The shake correction unit 7 is driven to a correcting-operation start position calculated from the predictive shake information for a predetermined time interval between the time when the pre-imaging operation signal is detected (S21, Yes) and the time when the imaging starting operation signal is detected (S22, Yes) (S6). The driving of the shake correction unit 7 is controlled after the imaging starting operation signal is detected (S22), and the shake is corrected (S23).

Accordingly, more reliable shake correction can be performed according to the imaging conditions through the operation of the release button.

After the pre-imaging operation signal is detected (S21, Yes), the processing for calculation of the predictive shake information and determination of the correcting-operation start position is performed based on the shake detection information 14. However, after the imaging starting operation signal is detected (S22, Yes), the processing (predictive operation) for calculation of the predictive shake information and determination of the correcting-operation start position is stopped (S25). Accordingly, wasteful calculation during actual imaging can be eliminated, thus realizing low-power consumption.

In the seventh and eight embodiments, that is, the imaging apparatus provided with the pre-imaging operation unit 81 and the imaging starting operation unit 82, it is possible to utilize the arithmetic operation system for the predictive shake information according to the third embodiment as shown in FIG. 9. Further, in the seventh and eighth embodiments, it is possible to utilize the system in which the correcting-operation start position is not treated as a point but is given as information for the area 73 having a certain range according to the fourth embodiment as shown in FIG. 10.

In a ninth embodiment, as shown in FIG. 13, a correction range of the shake correction unit 7, that is, a range where the driving of the shake correction unit 7 can be controlled is previously stored in the correction range storage section (correction range storage unit) 77.

The arithmetic section 10 has a function as a prediction unit. The prediction unit computes a predictive shake quantity from the predictive shake information, computes a predictive correction quantity for the predictive shake quantity, and predicts whether the predictive correction quantity exceeds the range previously stored in the correction range storage section 77. Alternatively, the prediction unit computes a correction quantity to the maximum predictive shake from the predictive shake quantity and the focal length information, and the imaging conditions such as an exposure time. Further, the prediction unit compares the correction quantity to the maximum predictive shake with the range stored in the correction range storage section 77, and detects and predicts at any time whether the correction quantity to the maximum predictive shake exceeds the range.

The ninth embodiment has at least one of treating units as follows, which take measures to treat the case where the prediction unit predicts that a predictive correction quantity will exceed the range. That is, a treating unit which displays a warning, a treating unit which stops the operation for controlling the driving of the shake correction unit 7 to the correcting-operation start position and invalidates the imaging starting operation, and a treating unit which stops the operation for controlling the driving of the shake correction unit 7 to correct the image blurring and validates the imaging starting operation.

That is, in the ninth embodiment, when it is predicted that a correction quantity is required higher than the operational ability of the shake correction unit 7, at least one of the treating units as follows operates. That is, the treating unit that displays a warning through the display unit 78 to the operator, for example, by switching a lighting mode of a lamp such as an LED, lighting on a dedicated LED, or displaying text or a symbol on a monitor if the apparatus has it. The treating unit that prohibits movement of the shake correction unit 7 to the correcting-operation start position or interrupts imaging by invalidating the imaging starting operation. The treating unit that stops the correcting operation and switches to an imaging mode, or may be switch to a strobe mode to perform imaging.

As a result, the ninth embodiment can suppress power consumption through avoidance of unnecessary imaging or unnecessary correcting operation.

There are variations other than the first to ninth embodiments. For example, a dedicated operation element may be separately provided for controlling shake correction, or a digital filter may be used to calculate predictive shake information. Further, the driving method of the shake correction unit 7 includes various types of method using a mechanism such as a rotary-rectilinear motion direction switching mechanism with a linear motor, a rotary motor, and a gear.

Regarding the imaging procedure, a predictive shake vector may be computed, at any time, at a stage at which a specified amount of shake information from the shake detection unit 5 is stored independently of the pre-imaging operation and the imaging starting operation, and the latest result may be overwritten in the storage unit as necessary. In this case, when the pre-imaging operation is performed, it may be possible to quickly drive the shake correction unit 7 by referring to the predictive information.

Further, only the processing for calculation of the predictive shake information and determination of a correcting-operation start position may be executed for a predetermined time interval between the time when the time since the pre-imaging operation signal is detected and the time when the imaging starting operation signal is detected. The actual driving may be executed after the imaging starting operation is performed. In this case, further power consumption can be achieved.

Figure 19:
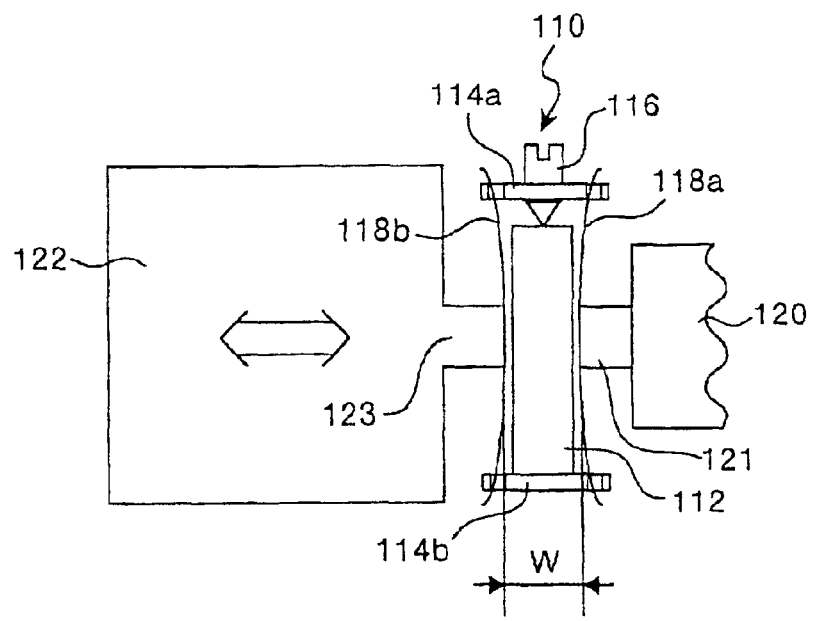
FIG. 19 is a schematic cress-sectional view showing a shake correction device in a tenth embodiment of this invention.
Figure 20:
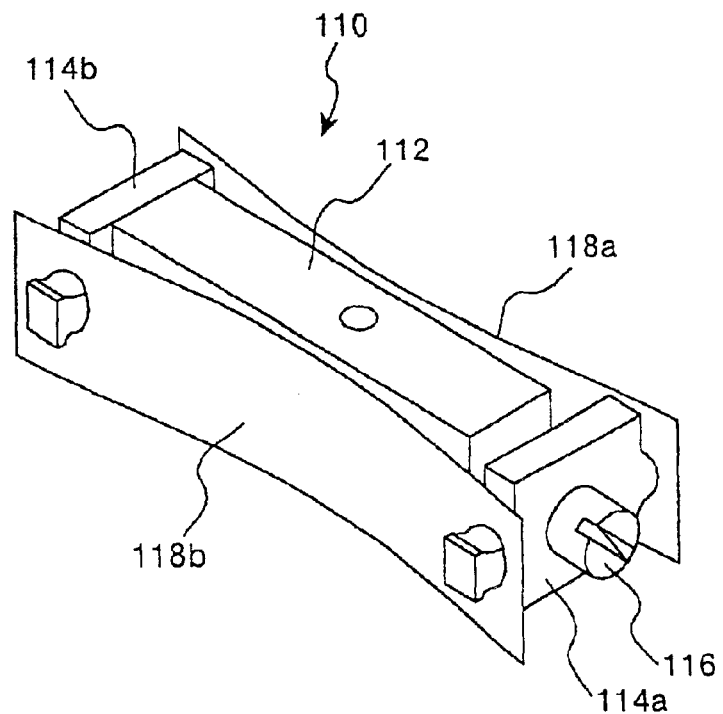
FIG. 20 is a schematic cress-sectional view showing an actuator used in the tenth embodiment.
Figure 21:
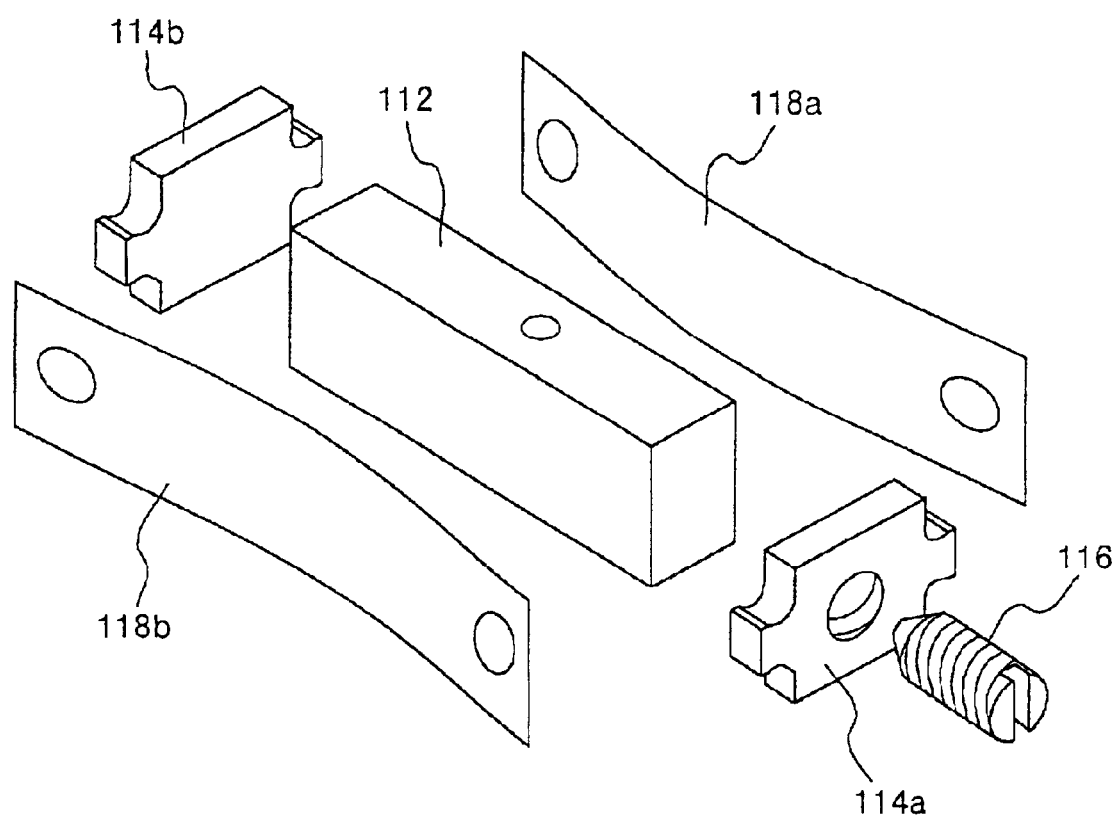
FIG. 21 is a schematic perspective view showing a disassembled state of components for the actuator used in the tenth embodiment.

FIG. 19 to FIG. 21 show a tenth embodiment. As shown in FIG. 19, this tenth embodiment uses an actuator 110 that generates displacement by electric signals and enlarges the displacement.

As shown in FIG. 20 and FIG. 21, the actuator 110 is composed of a multilayer piezoelectric element 112, a pair of fixing members 114a and 114b, an adjustment screw 116, and two elastic plates 118a and 118b.

The multilayer piezoelectric element 112 is an electromechanical transducer that generates displacement by electric singles. The pair of fixing members 114a and 114b are fixed to both ends of the multilayer piezoelectric element 112 in its displacement direction. The adjustment screw 116, that adjusts a space between the fixing members 114a and 114b, is screwed into the fixing member 114a. Both ends of the two elastic plates 118a and 118b are hooked and fixed to the fixing members 114a and 114b, respectively. The two elastic plates 118a and 118b are disposed along both side faces of the multilayer piezoelectric element 112 perpendicular to its displacement direction. Further, the opposed surfaces of the two elastic plates 118a and 118b are curved inwardly so as to be recessed.

The space between the fixing members 114a and 114b is enlarged or reduced by tightening or loosening the adjustment screw 116. Accordingly, the tension (spring force) of the two elastic plates 118a and 118b are controlled so as to be a specified displacement characteristic. The tip of the adjustment screw 116 is sharpened. Accordingly, the sharpened tip of the adjustment screw 116 is put into contact with a specified point of the end facet of the multilayer piezoelectric element 112. Therefore, the tension of the two elastic plates 118a and 118b can be controlled easily and accurately.

The opposite surfaces of the two elastic plates 118a and 118b are curved so as to be recessed inwardly. This is because a stable displacement characteristic can be realized by avoiding a case where the surfaces curved outwardly may be recessed inwardly when a large force is applied and may not be recovered to their original state.

A protruding part 121 of a fixed member 120 is fixed to the central part of the elastic plate 118a for the actuator 110. A protruding part 123 of the imaging lenses or a member holding these lenses (hereafter, the image pickup optical system of these components are generically called "mobile unit") 122 is fixed to the central part of the other elastic plate 118b. As a method for fixing the two elastic plates 118a and 118b to the protruding part 121 of the fixed member 120 and the protruding part 123 of the mobile unit 122, any of a screwing method or a method using an adhesive material or the like may be used.

The operation of the tenth embodiment will be explained below. A specified voltage is applied to the multilayer piezoelectric element 112 of the actuator 110. Based on this application, the multilayer piezoelectric element 112 extends in its multilayered direction, the space between the fixing members 114a and 114b is enlarged, the two elastic plates 118a and 118b are pulled so that the width W between the two elastic plates 118a and 118b at their central parts is widened, and the mobile unit 122 is pressed by the elastic plate 118b to move in the direction to which the mobile unit 122 separates from the fixed member 120.

The applied voltage to the multilayer piezoelectric element 112 of the actuator 110 is discharged. Accordingly, the multilayer piezoelectric element 112 shrinks in its multilayered direction. Therefore, conversely to the above-mentioned case, the width W between the two elastic plates 118a and 118b at their central parts is reduced, and the mobile unit 122 is pulled to the elastic plate 118b to move in the direction to which the mobile unit 122 approaches the fixed member 120.

In the actuator 110, the multilayer piezoelectric element 112 functions as a displacement producing mechanism, and the two elastic plates 118a and 118b function as a displacement enlarging mechanism that enlarges the displacement of the multilayer piezoelectric element 112 in a direction perpendicular to its displacement direction. When the optical axis of the mobile unit 122 fixed to the elastic plate 118b is positioned in a direction substantially perpendicular to the displacement direction of the elastic plate 118b, that is, the enlargement direction due to the actuator 110, the mobile unit 122 moves almost vertically with respect to the optical axis.

As explained above, the tenth embodiment has the two elastic plates 118a and 118b as the displacement enlarging mechanism that enlarges the displacement of the multilayer piezoelectric element 112 in a direction perpendicular to its displacement direction. Accordingly, in the tenth embodiment, a sufficiently large quantity of displacement can quickly be obtained even if a large amount of power is not fed to the multilayer piezoelectric element 112. Therefore, in the tenth embodiment, when the image pickup optical system such as the imaging lens is an object to be moved as the mobile unit 122, the image pickup optical system required for correcting camera shake can be moved almost vertically to its optical axis sufficiently largely and quickly. Accordingly, the tenth embodiment can realize efficient camera-shake correction by achieving a movable range wide enough for and a quick response to camera shake.

The tenth embodiment can facilitate imaging based pixel shifting. More specifically, this imaging is based on the idea that imaging is performed plural times by moving an incident position of an incident light to the image pickup surface by a specified amount and in a specific direction between exposures, so that an apparent number of pixels is increased by using a plurality of imaged image data. Accordingly, the tenth embodiment can obtain a high-resolution image even if the image pickup unit itself has only a small number of pixels.

In the tenth embodiment, it becomes easy to slightly change an incident position of an incident light to the image pickup surface by moving the image pickup optical system as the mobile unit 122 by a specified slight amount during the exposing time. Therefore, the tenth embodiment can prevent occurrence of pseudo colors or moiré caused by foldover distortion of a high frequency component by removing the high frequency component of the image pickup signal even if the image pickup signal has the high frequency component higher than one half of a sampling frequency of the image pickup unit.

In the tenth embodiment, the two elastic plates 118a and 118b enlarge the displacement of the multilayer piezoelectric element 112 in a direction perpendicular to its displacement direction to move the image pickup optical system such as the imaging lens as the mobile unit 122 in the enlarged direction. Accordingly, the tenth embodiment can realize excellent space efficiency as an image shifting device.

The tenth embodiment is advantageous for designing a power source because a sufficiently large quantity of displacement can be obtained even if low power is supplied to the multilayer piezoelectric element 112. Further, in the tenth embodiment, the image pickup optical system as the mobile unit 122 is fixed to the elastic plate 118b as the displacement enlarging mechanism. Accordingly, the tenth embodiment does not require any particular mechanism for holding the image pickup optical system even if movement corresponding to camera-shake correction is not performed. Therefore, the apparatus can be minimized and simplified.

Figure 22:
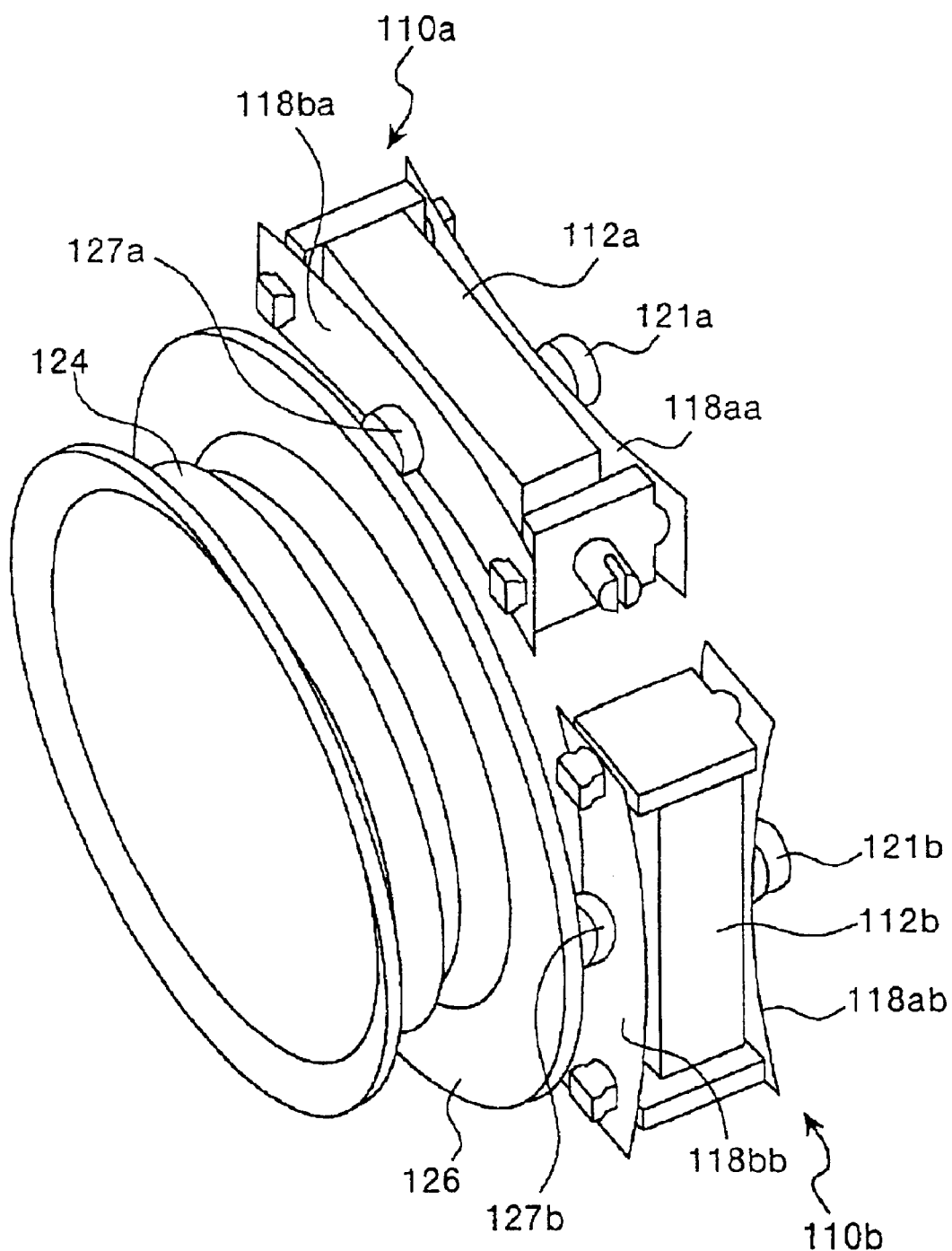
FIG. 22 is a schematic cress-sectional view showing a shake correction device in an eleventh embodiment of this invention.

FIG. 22 shows an eleventh embodiment. In the figure, the same legends as these in FIG. 19 to FIG. 21 represent the same components.

Instead of the mobile unit 122 of the tenth embodiment, a variable apex angle prism 124 is an object to be moved. Two actuators 110a and 110b each having the same structure as that of the actuator 110 of the tenth embodiment are disposed on the same plane in directions orthogonal to each other.

A protruding part 121a of a fixed member (not shown) is fixed to one elastic plate 118aa of the actuator 110a at its central part, and a protruding part 121b is also fixed to one elastic plate 118ab of the actuator 110b at its central part. Further, protruding parts 127a and 127b underside of a flange 126 as a moving part of the variable apex angle prism 124 are fixed to the other elastic plates 118ba and 118bb at their central parts, respectively. The variable apex angle prism 124 is disposed so that its optical axis is substantially parallel to the displacement direction of the elastic plates 118ba and 118bb, that is, the displacement direction of the two actuators 110a and 110b.

The operation of the eleventh embodiment will be explained below. Different specified voltages are applied to multilayer piezoelectric elements 112a and 112b of the two actuators 110a and 110b. Therefore, the two multilayer piezoelectric elements 112a and 112b extend in their multilayered direction, but each degree of the extension is different from each other. Accordingly, the degree of extension of the width between the two elastic plates 118aa and 118ba of the actuator 110a is different from the degree of extension of the width between the two elastic plates 118ab and 118bb of the actuator 110b. Accordingly, the apex angle of the variable apex angle prism 124 varies, so that the incident light entering the variable apex angle prism 124 changes its light path to go into the image pickup surface. That is, the incident position of the incident light moves.

The similar operation can be realized even through a specified voltage is applied to either one of the two multilayer piezoelectric elements 112a and 112b while an applied voltage to the other element is discharged, instead of application of the different specified voltages to the multilayer piezoelectric elements 112a and 112b of the two actuators 110a and 110b,.

As explained above, in the eleventh embodiment, the two actuators 110a and 110b are disposed in the directions orthogonal to each other on the same plane. More specifically, each of the actuators 110a and 110b is provided with the two elastic plates as the displacement enlarging mechanism that enlarges the displacement of each of the two multilayer piezoelectric elements 112a and 112b in a direction perpendicular to its displacement direction. Accordingly, in the eleventh embodiment, a sufficiently large quantity of displacement can be simultaneously obtained at the two points even if high power is not supplied to the two multilayer piezoelectric elements 112a and 112b. Accordingly, the eleventh embodiment can very the apex angle of the variable apex angle prism 124 sufficiently largely and quickly, and perform efficient camera-shake correction by achieving displacement large enough for and a quick response to camera shake.

The eleventh embodiment can facilitate imaging based pixel shifting in the same manner as that of the tenth embodiment. More specifically, this imaging is based on the idea that imaging is performed plural times by moving an incident position of an incident light to the imaging surface by a specified amount and in the specific direction between exposures, and an apparent number of pixels is increased by using the plurality of imaging image data. Accordingly, the eleventh embodiment can obtain a high-resolution image like the tenth embodiment. Further, this embodiment makes it easy to slightly change the light incident position on the imaging surface by moving the apex angle of the variable apex angle prism 124 by a specified slight amount during the exposing time. Therefore, the eleventh embodiment can prevent occurrence of pseudo colors or moiré caused by foldover distortion of the high frequency component by removing a high frequency component higher than one half of a sampling frequency of the image pickup unit in the same manner as that of the tenth embodiment.

The eleventh embodiment can realize excellent space efficiency as an image shifting device like the tenth embodiment, thus being advantageous for designing a power source. Further, the eleventh embodiment does not require any particular mechanism for holding the variable apex angle prism 124 even if a change of the apex angle according to camera-shake correction is not performed. Because the variable apex angle prism 124 is fixed to the elastic plates 118ba and 118bb as the displacement enlarging mechanism like in the tenth embodiment. Thus, the eleventh embodiment can minimize and simplify the apparatus like in the tenth embodiment.

Figure 23:
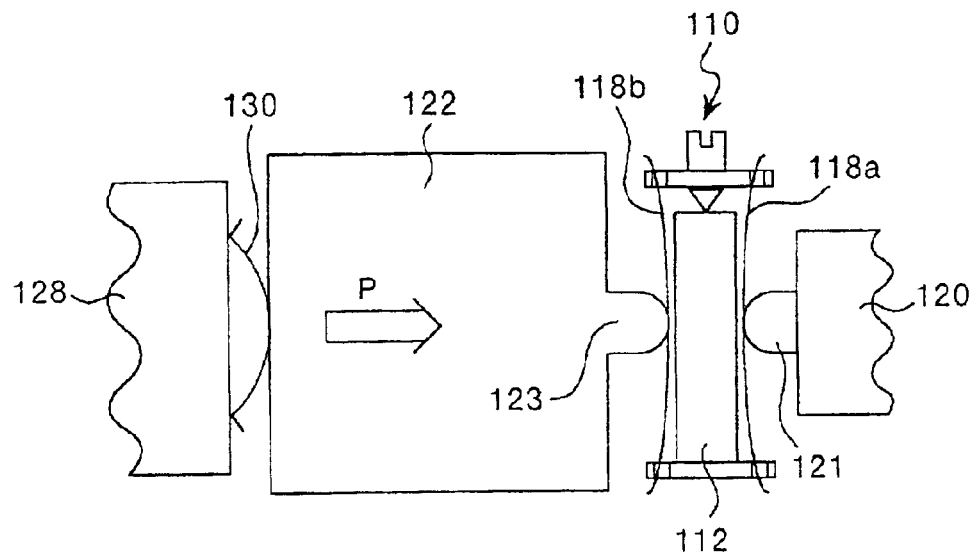
FIG. 23 is a schematic cress-sectional view showing a shake correction device in a twelfth embodiment of this invention.

FIG. 23 shows a twelfth embodiment. In the figure, the same legends as these in FIG. 19 to FIG. 22 represent the same components.

The twelfth embodiment has a biasing unit that provides a biasing force P to the mobile unit 122. An arch-shaped flat spring 130 fixed to a fixed member 128 is disposed on the opposite side of the mobile unit 122 to its actuator 110 side. The biasing force P pressing the protruding part 123 of the mobile unit 122 against the actuator 110 is obtained. That is, the biasing force P acting in the direction against enlargement due to the actuator 110 is obtained.

The operation of the twelfth embodiment will be explained below. A specified voltage is applied to the multilayer piezoelectric element 112 of the actuator 110. Accordingly, the multilayer piezoelectric element 112 extends in its multilayered direction, and the width between the two elastic plates 118a and 118b at their central parts is enlarged. As a result, the mobile unit 122 separates from the fixed member 120 opposing the biasing force P due to the flat spring 130 while being pressed by the elastic plate 118b, and moves in the direction to which the mobile unit 122 approaches the fixed member 128.

The applied voltage to the multilayer piezoelectric element 112 of the actuator 110 is discharged. Accordingly, the multilayer piezoelectric element 112 shrinks in its multilayered direction. Therefore, conversely to the above-mentioned case, the width between the two elastic plates 118a and 118b at their central parts is reduced. As a result, the mobile unit 122 is pressed by the biasing force P due to the flat spring 130 while being pulled to the elastic plate 118b, and moves in the direction to which the mobile unit 122 approaches the fixed member 120 and separates from the fixed member 128.

When the optical axis of the mobile unit 122 is substantially perpendicular to the displacement direction of the elastic plate 118b, that is, the enlargement direction due to the actuator 110, the mobile unit 122 moves substantially vertically to the optical axis. Since the biasing force P due to the flat spring 130 is always applied to the mobile unit 122 during travel of the mobile unit 122, the mobile unit 122 is fixed stably to the elastic plate 118b. As a result, the mobile unit 122 can keep its surface perpendicular to the optical axis in a stable state.

As explained above, in the twelfth embodiment, the arch-shaped flat spring 130 is provided as the biasing unit that gives the biasing force P for pressing the mobile unit 122 against the actuator 110. Accordingly, in the twelfth embodiment, the mobile unit 122 is fixed to the elastic plate 118b in a stable state during travel of the mobile unit 122 almost vertical to its optical axis. Thus, the mobile unit 122 can keep its surface perpendicular to its optical axis in a stable state.

Figure 24:
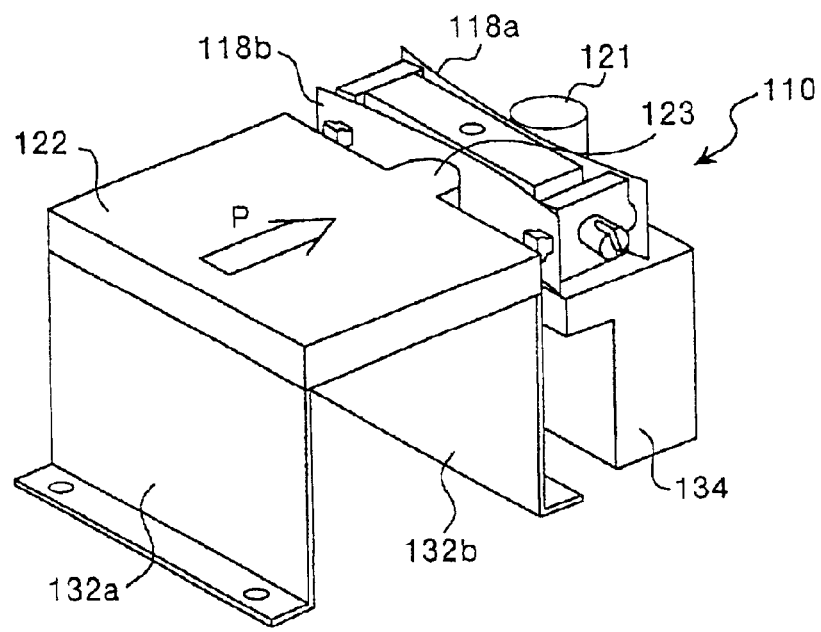
FIG. 24 is a schematic cress-sectional view showing a shake correction device in a thirteenth embodiment of this invention.

FIG. 24 shows a thirteenth embodiment. In the figure, the same legends as these in FIG. 19 to FIG. 23 represent the same components.

The thirteenth embodiment has another type of biasing unit instead of the arch-shaped flat spring 130 of the twelfth embodiment. Two identically-shaped flat springs 132a and 132b that hold the mobile unit 122 are disposed in parallel with each other on a fixed member (not shown). The two flat springs 132a and 132b provide biasing force P to press the mobile unit 122 against the actuator 110 mounted on a support base 134.

The operation of the thirteenth embodiment is almost the same as that of the twelfth embodiment. This thirteenth embodiment uses the two identically-shaped flat springs 132a and 132b that hold the mobile unit 122 as the biasing unit that provides the biasing force P to press the mobile unit 122 against the actuator 110. As a result, the thirteenth embodiment can achieve the same effect as that of the twelfth embodiment. Further, the two flat springs 132a and 132b are formed with thin plates, so that a displacement angle is a micro angle, and space is saved.

Particularly, in the thirteenth embodiment, when the apparatus operates, the length of the two flat springs 132a and 132b in the direction of the optical axis is made sufficiently long in the same manner as that of a parallel crank mechanism. As a result, the amount of travel that the mobile unit 122 moves in the direction of the optical axis is decreased to the extent that an object will not fall out of focus.

Figure 25:
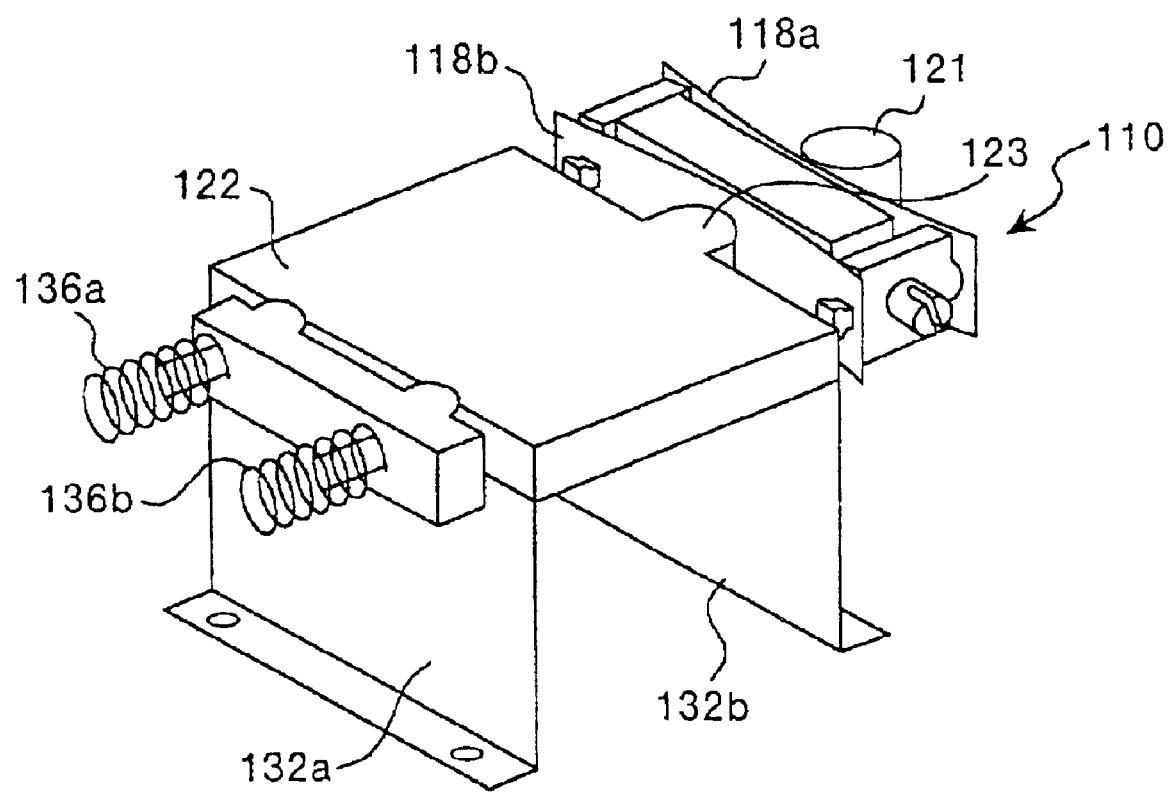
FIG. 25 is a schematic cress-sectional view showing a shake correction device in a fourteenth embodiment of this invention.

FIG. 25 shows a fourteenth embodiment. In the figure, the same legends as these in FIG. 19 to FIG. 24 represent the same components.

In the fourteenth embodiment, a combination of the two flat springs 132a and 132b and two coil springs 136a and 136b is used as the biasing unit instead of the two flat springs 132a and 132b as the biasing unit of the thirteenth embodiment.

The two identically-shaped flat springs 132a and 132b holding the mobile unit 122 are placed in parallel with each other on the fixed member (not shown). The two flat springs 132a and 132b are used as a guide to change the position of the mobile unit 122 while keeping its surface perpendicular to the optical axis by making the spring force as weak as possible.

The fixed member (not shown) has the two coil springs 136a and 136b each having a small spring constant. The two coil springs 136a and 136b provide biasing force P to press the mobile unit 122 against the actuator 110. These two coil springs 136a and 136b function as original biasing units. Although cylindrical coil springs are used for the two coil springs 136a and 136b in this example, torsion coil springs may be used other than the cylindrical coil springs.

The operation of the fourteenth embodiment will be explained below. The operation of the fourteenth embodiment is almost the same as that of the thirteenth embodiment. In this fourteenth embodiment, the two coil springs 136a and 136b each having a small spring constant are largely changed and fixed in this state. For example, when the coil springs are allowed to act as compression springs, the springs shorter in length as compared to the length at no load are fixed. When the springs are allowed to act as tension springs, the springs with sufficient length are fixed. By using coil springs with a small spring constant, the change in the biasing force P in association with enlargement due to the actuator 110 can be decreased as compared to the case where coil springs with a large spring constant are used.

As explained above, the fourteenth embodiment uses the two coil springs 136a and 136b having a small spring constant as the biasing unit that provide the biasing force P to press the mobile unit 122 against the elastic plate 118b of the actuator 110. As a result, the fourteenth embodiment can control the movement of the mobile unit 122 with high precision.

In the twelfth to fourteenth embodiments, the arch-shaped flat spring 130, the two identically-shaped flat springs 132a and 132b holding the mobile unit 122, and the two coil springs 136a and 136b are used as the biasing unit that provides the biasing force P to the mobile unit 122.

The characteristics required for the biasing force P due to the biasing units 130, 132a, 132b, 136a, and 136b will be explained below with reference to FIGS. 26A and 26B, and FIG. 27.

Figure 26A:
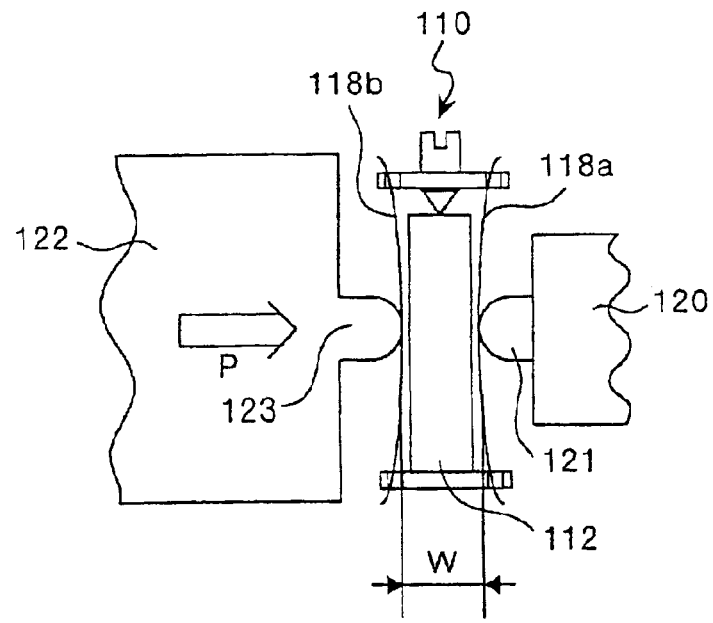
FIG. 26A and FIG. 26B show characteristics required for a biasing force P.
Figure 27:
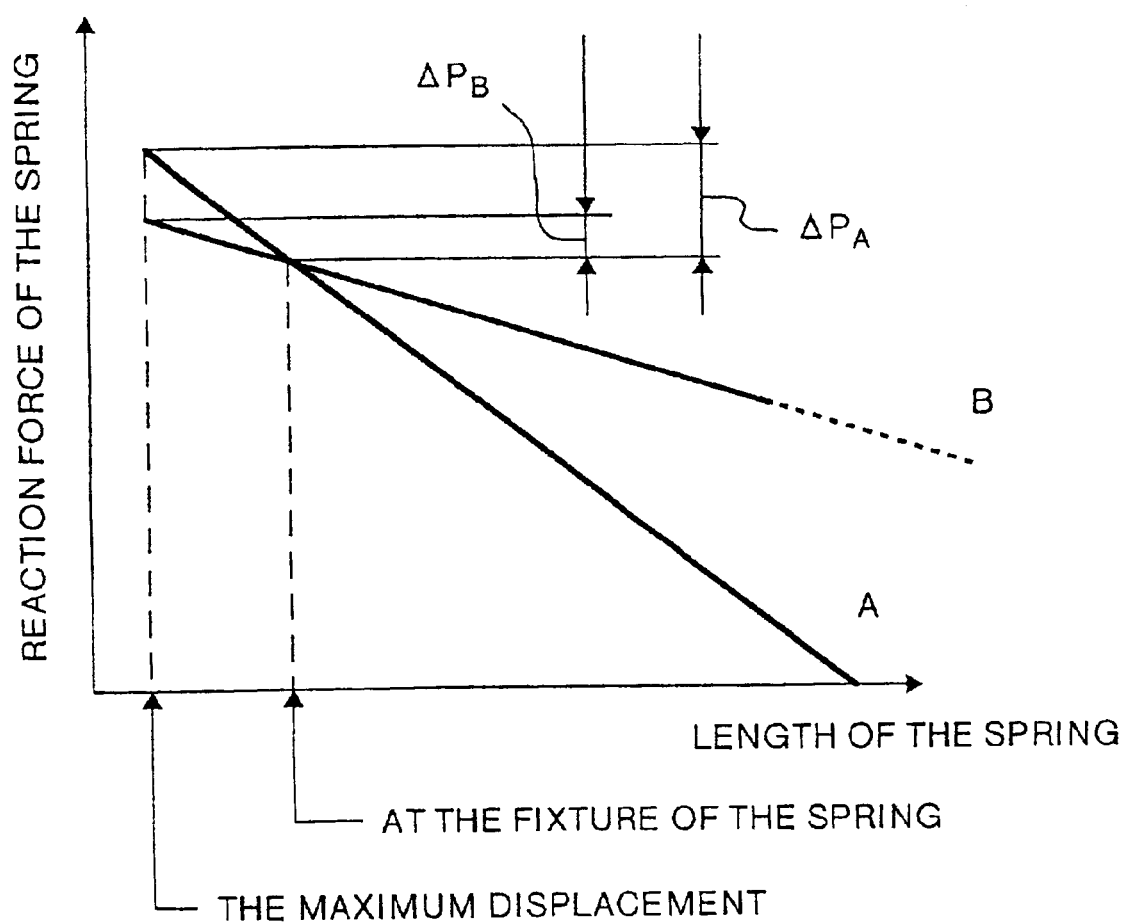
FIG. 27 is a graph showing a relation between a length of a spring and a reaction force of the spring based on comparison between a case of A where a spring having a large spring constant is used as a biasing unit and a case of B where a spring having a small spring constant is used.

For example, as shown in FIG. 26A, the biasing unit having a structure as follows is taken up as an example. That is, the biasing unit has such a structure that the protruding part 121 of the fixed member 120 is fixed to the central part of the elastic plate 118a of the actuator 110 and the protruding part 123 of the mobile unit 122 is fixed to the central part of the other elastic plate 118b. It is assumed here that the width between the two elastic plates 118a and 118b of the actuator 110 at their central parts is W and the biasing force P, that presses the mobile unit 122 against the actuator 110 and acts in the direction opposing the enlargement of the actuator 110, is provided.

Figure 26B:
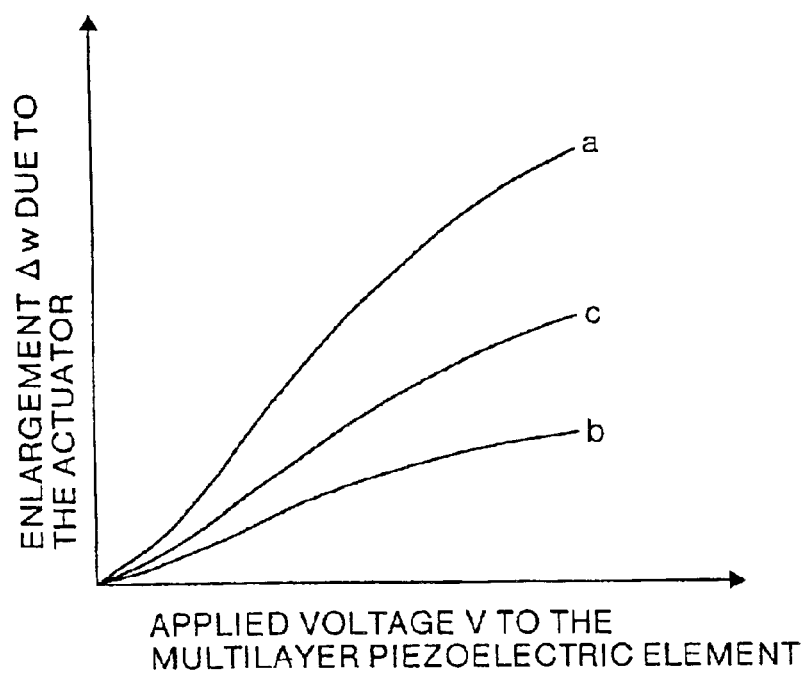

The graph in FIG. 26B shows a relation between an applied voltage V to be applied to the multilayer piezoelectric element 112 of the actuator 110 and enlargement ΔW in the actuator 110. In this graph, the curve a represents a case where the biasing force P does not change as the displacement due to the actuator 110 is enlarged such as a case where the biasing unit has only the mobile unit 122 of its own weight. The curve b represents a case where the load largely changes caused by enlargement due to the actuator 110 such as a case where any spring with a large spring constant is used as the biasing unit. Further, the curve c represents a case where the load does not much change caused by enlargement due to the actuator 110 such as a case where any spring with a spring constant smaller than the case of the curve b is used as the biasing unit. However, all the biasing force P under the condition that a voltage is not applied is the same in the curves a, b, and c.

The followings become clear from the graph of FIG. 26B. That is, the width W between the two elastic plates 118a and 118b of the actuator at their central parts increases as the applied voltage V to the multilayer piezoelectric element 112 increases. On the other hand, if the increase in the biasing force P following the increase in the enlargement ΔW is significantly large, the load acting so as to crush the enlargement ΔW due to the actuator 110 increases by increasing the biasing force P. Therefore, the loss of enlargement ΔW becomes more significant in proportion to the increase of load.

Therefore, desired enlargement ΔW can not be obtained unless the increase in the biasing force P in association with the increase in the enlargement ΔW due to the actuator 110 is decreased to a specified value or less. An example of obtaining this specified value is as follows. An allowed increase ΔP in the biasing force P is obtained as follows, where a required minimum biasing force P when a voltage is not applied to the multilayer piezoelectric element 112 is Pmin and a biasing force P (loss of displacement is not too large) with which required enlargement ΔW is obtained when the maximum voltage is applied is Pmax;

$$\Delta P = P\mathrm{max} - P\mathrm{min}$$

Therefore, it is required to design so that the increase ΔP in the biasing force P when the enlargement ΔW is the maximum is set to the specified value or less obtained from the equation.

Comparison is made between the arch-shaped flat spring 130, the two flat springs 132a and 132b, and the two coil springs 136a and 136b as the biasing units in the twelfth to the fourteenth embodiments. Based on this comparison, it is clear that the arch-shaped flat spring 130 and the two flat springs 132a and 132b may have difficulties in that variations in the biasing force P in association with the enlargement ΔW due to the actuator 110 are decreased even if the biasing unit is structured only with these springs, because each of these springs generally has a large spring constant.

For example, a case A where a spring with a large spring constant is used as the biasing unit is compared to a case B where a spring with a small spring constant is used. As a result, a relation between the length of the springs and the reaction force of the springs is shown in the graph of FIG. 27.

The conditions are such that the reaction forces (biasing force) of the springs at the time of their fixture are the same and the spring displacements during the time from their fixture to the maximum displacements are the same. Even under these conditions, as is clear from the graph of FIG. 27, the increase $\Delta P_B$ in the spring reaction force (biasing force) in the case B of using the spring with a small spring constant is lower than the increase $\Delta P_A$ in the spring reaction force (biasing force) in the case A of using the spring with a large spring constant.

Accordingly, there may be a case where it is difficult to decrease the variations in the biasing force P in association with the enlargement ΔW due to the actuator 110 because the biasing unit is structured only with the arch-shaped flat spring 130 or the two flat springs 132a and 132b each of which generally has a large spring constant. In this case each of the coil springs 136a and 136b with a small spring constant is used singly or in combination to be capable of obtaining the mechanically sufficient biasing force P at the time of fixing and minimizing the variations in the biasing force P in association with the enlargement ΔW due to the actuator 110.

Figure 28A:
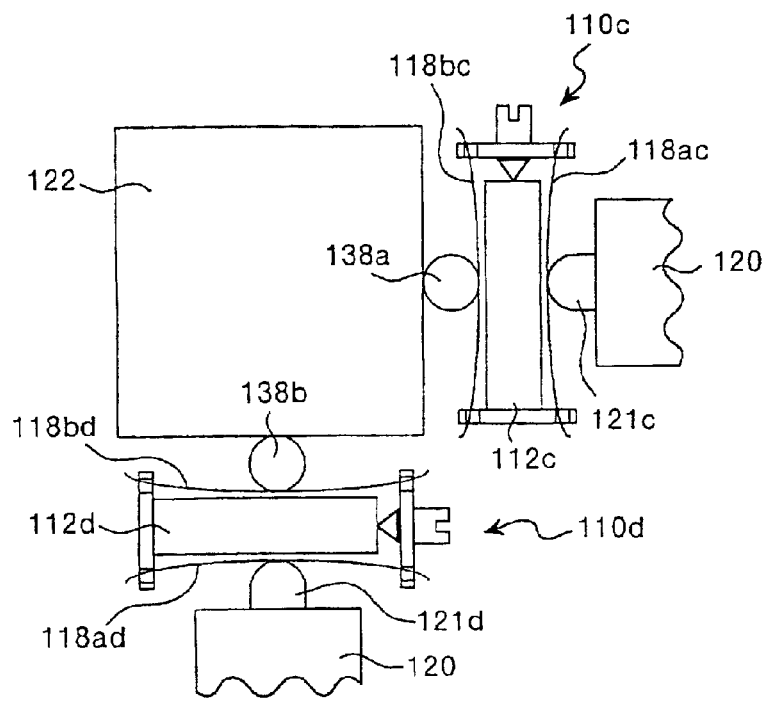
FIG. 28A is a schematic cress-sectional view showing a shake correction device in a fifteenth embodiment of this invention.

FIG. 28A shows a fifteenth embodiment. In the figure, the same legends as these in FIG. 19 to FIG. 27 represent the same components.

In the fifteenth embodiment, as shown in FIG. 28A, two actuators 110c and 110d each having the same structure as that of the actuator 110 of the tenth embodiment are disposed in the side face and the bottom face of the mobile unit 122 in the directions orthogonal to each other. A cylindrical member 138a is disposed between an elastic plate 118bc of the actuator 110c and the mobile unit 122, and a cylindrical member 138b is disposed between an elastic plate 118bd of the actuator 110d and the mobile unit 122. A protruding part 121c of the fixed member 120 is fixed to the other elastic plate 118ac of the actuator 110c at its central part, and a protruding part 121d of the fixed member 120 is fixed to the other elastic plate 118ad of the actuator 110d at its central part, respectively.

As explained above, in the fifteenth embodiment, the cylindrical members 138a and 138b are disposed between the elastic plates 118bc and 118bd of the two actuators 110c and 110d, and the mobile unit 122. Accordingly, friction between the elastic plate 118bc and the side face of the mobile unit 122 through the cylindrical member 138a decreases, and friction between the elastic plate 118bd and the bottom face of the mobile unit 122 through the cylindrical member 138b also decreases. As a result, in the fifteenth embodiment, the mobile unit 122 can smoothly move in the horizontal direction and the vertical direction while keeping its surface perpendicular to the optical axis without prevention of its movements from each other according to respective enlargements due to the two actuators 110c and 110d. Accordingly, the fifteenth embodiment can more efficiently achieve excellent performance of camera-shake correction, realization of high-resolution image by imaging based on pixel shifting, and prevention of occurrence of pseudo colors or moiré by removing a high frequency component having one half or higher of a sampling frequency of the image pickup unit.

Figure 28B:
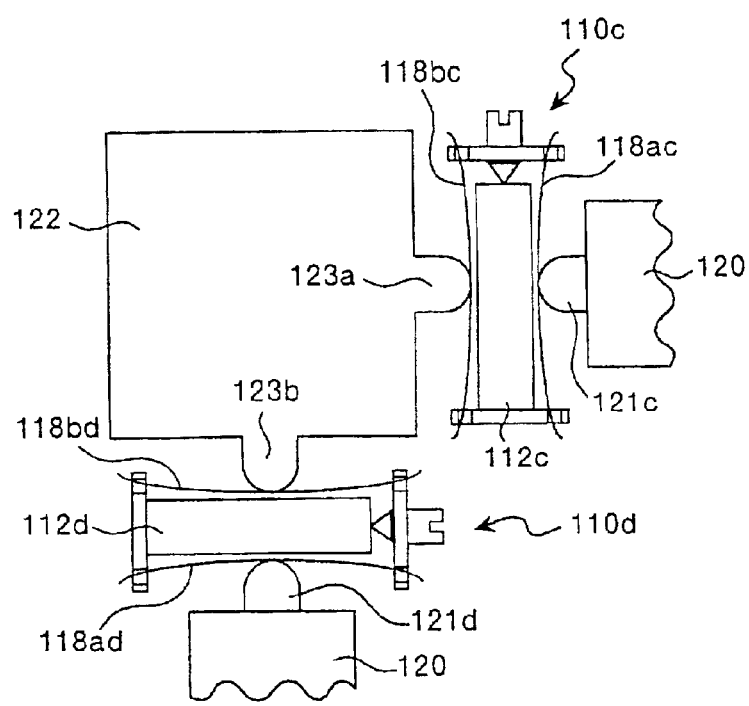
FIG. 28B is a schematic cress-sectional view showing a shake correction device for comparison.

The shake correction device using the protruding parts 123a and 123b of the mobile unit 122 instead of the cylindrical members 138a and 138b will be explained below with reference to FIG. 28B.

The two actuators 110c and 110d are disposed on the side face and the bottom face of the mobile unit 122 in the directions orthogonal to each other. The protruding part 123a on the side face of the mobile unit 122 is fixed to the elastic plate 118bc of the actuator 110c at its central part, and the protruding part 123b of the bottom face of the mobile unit 122 is fixed to the elastic plate 118bd of the actuator 110c at its central part.

Respective specified voltages are applied to the multilayer piezoelectric elements 112c and 112d of the two actuators 110c and 110d. The respective displacements of the multilayer piezoelectric elements 112c and 112d in their multilayered directions are enlarged by each pair of the elastic plates 118ac, 118bc, 118ad, and 118bd. The mobile unit 122 then moves in the two directions of the horizontal direction and the vertical direction. In this case, friction between the elastic plate 118bc and the protruding part 123a on the side face of the mobile unit 122 increases, and friction between the elastic plate 118bd and the protruding part 123a on the bottom face of the mobile unit 122 also increases. Accordingly, the mobile unit 122 can not move smoothly in the horizontal direction and the vertical direction because its respective movements according to enlargements due to the two actuators 110c and 110d are interfered with each other. Further, there may occur a case where, because the mobile unit 122 is moved by either one of the two actuators 110c and 110d, a contact point between the other actuator and the mobile unit 122 may be displaced.

Accordingly, the fifteenth embodiment can solve the problems occurring in the shake correction device using the protruding parts 123a and 123b of the mobile unit 122 by using the cylindrical members 138a and 138b instead of the protruding parts 123a and 123b of the mobile unit 122.

Figure 29:
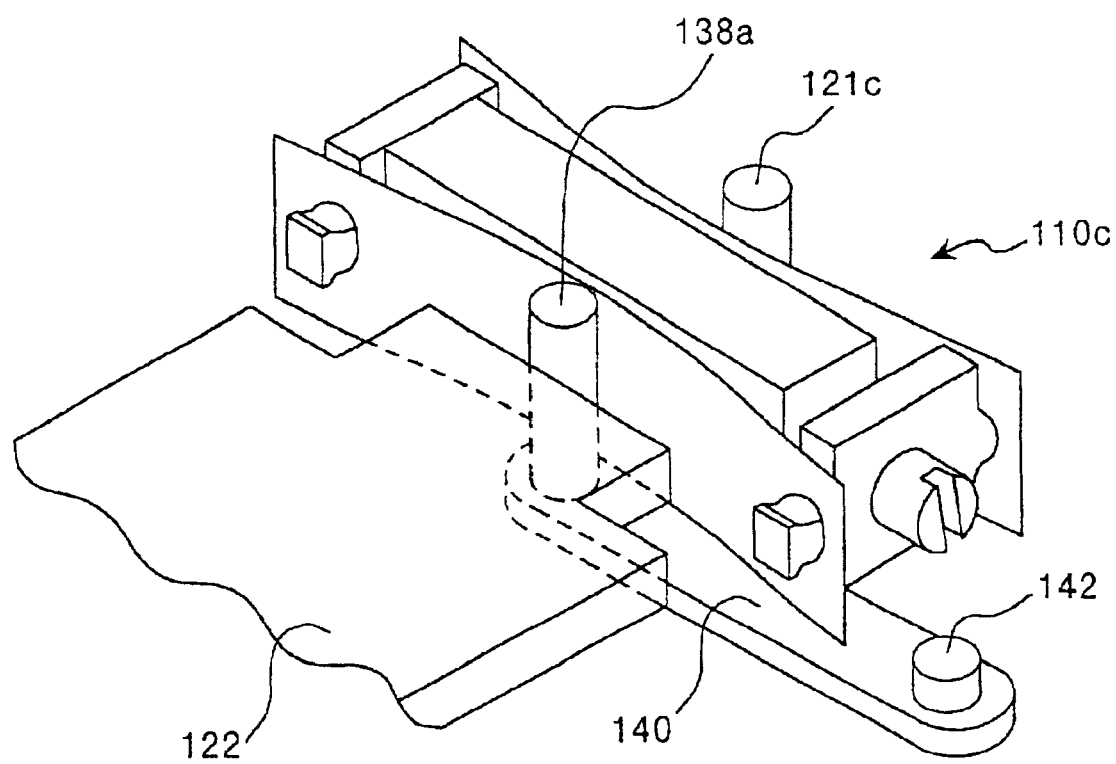
FIG. 29 is a schematic perspective view showing a partially enlarged shake correction device in a sixteenth embodiment of this invention.

FIG. 29 shows a sixteenth embodiment. In the figure, the same legends as these in FIG. 19 to FIG. 28 represent the same components.

In the sixteenth embodiment, each of the cylindrical members 138a and 138b of the fifteenth embodiment is connected to a rotation axis 142 through a plate member 140. However, only the cylindrical member 138a is shown here, and the other cylindrical member 138b has the same structure. The cylindrical members 138a and 138b are disposed between the actuators 110c, 110d and the mobile unit 122, respectively. Each of the cylindrical members 138a and 138b is fixed to one end of the plate member 140 with a caulking or the like. The other end of this plate member 140 is fixed pivotally to the rotation axis 142.

The operation of the sixteenth embodiment will be explained below. In the sixteenth embodiment, like the fifteenth embodiment, the cylindrical member 138a is disposed between the elastic plate 118bc of the actuator 110c and the mobile unit 122, and the cylindrical member 138b is disposed between the elastic plate 118bd of the actuator 110d and the mobile unit 122. Accordingly, in the sixteenth embodiment, the mobile unit 122 can move smoothly in the horizontal direction and the vertical direction while keeping its surface perpendicular to the optical axis.

When the length of the plate member 140, that connects between each of the cylindrical members 138a and 138b and the rotation axis 142, is set to a specified length or longer, the cylindrical members 138a and 138b move about the rotation axis 142 according to enlargements due to the elastic plates 118bc and 118bd, respectively. Accordingly, in the sixteenth embodiment, the cylindrical members 138a and 138b are always kept in contact with the central parts of the elastic plates 118bc and 118bd. Thus, the sixteenth embodiment can achieve the same effect as that of the fifteenth embodiment.

Figure 30:
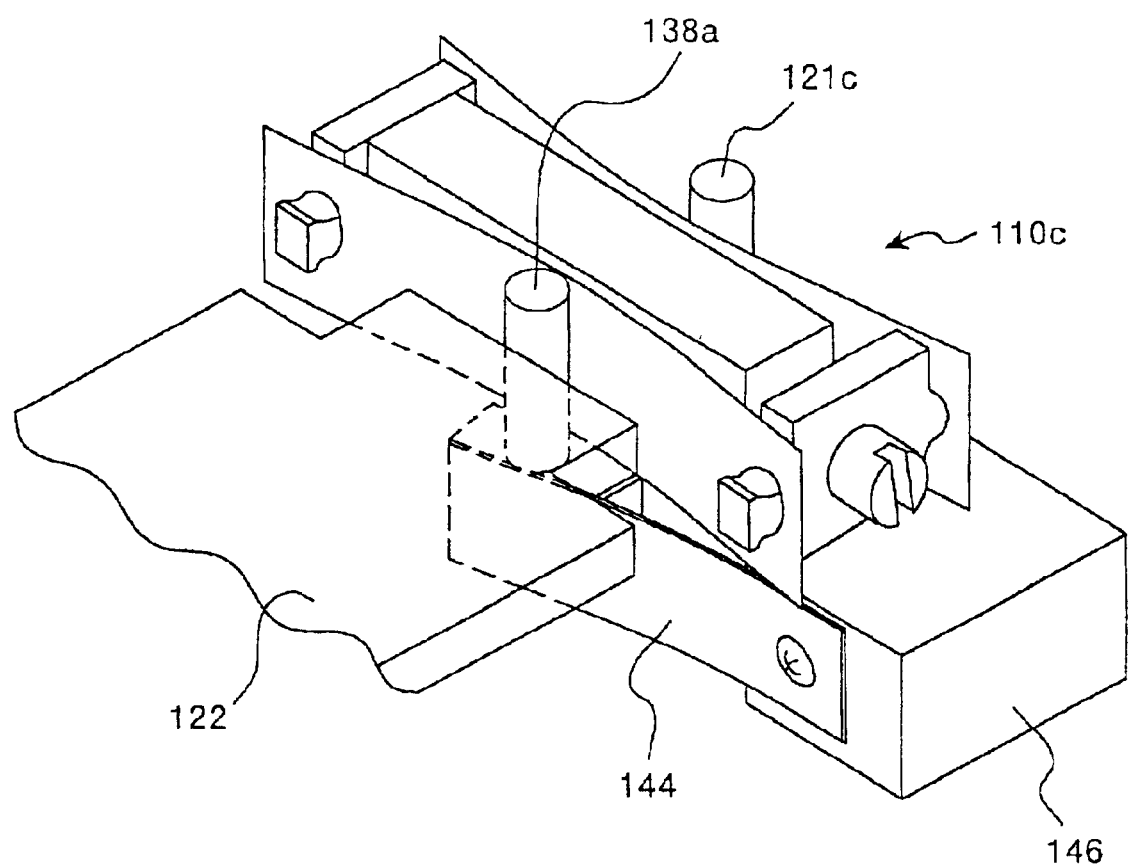
FIG. 30 is a schematic perspective view showing a partially enlarged shake correction device in a seventeenth embodiment of this invention.

FIG. 30 shows a seventeenth embodiment. In the figure, the same legends as these in FIG. 19 to FIG. 29 represent the same components.

In the seventeenth embodiment, a flat spring member 144 is disposed instead of the plate member 140 and the rotation axis 142 of the sixteenth embodiment. One ends of the flat spring members 144 are fixed to support bases 146 where the actuators 110c and 110d are mounted. The other ends of the flat spring members 144 are structured to press the cylindrical members 138a and 138b against the elastic plates 118bc and 118bd, respectively. However, only the cylindrical member 138a is shown here, and the other cylindrical member 138b has the same structure.

The operation of the seventeenth embodiment will be explained below. In the seventeenth embodiment, like in the sixteenth embodiment, the cylindrical member 138a is disposed between the elastic plate 118bc of the actuator 110c and the mobile unit 122, and the cylindrical member 138b is disposed between the elastic plate 118bd of the actuator 110d and the mobile unit 122. Accordingly, in the seventeenth embodiment, the mobile unit 122 can move smoothly in the horizontal direction and the vertical direction while keeping its surface perpendicular to the optical axis. Particularly, in the seventeenth embodiment, the cylindrical members 138a and 138b are pressed by the flat spring members 144 against the elastic plates 118bc and 118bd, respectively. Therefore, in the seventeenth embodiment, the cylindrical members 138a and 138b are always kept in contact with the central parts of the elastic plates 118bc and 118bd.

As a result, the seventeenth embodiment can achieve the same effect as that of the sixteenth embodiment. Further, the seventeenth embodiment does not require a large installation space for the flat spring members 144. Therefore, the apparatus will not possibly be upsized.

The flat spring members 144 press the elastic plates 118a and 118b through the cylindrical members 138a and 138b. Therefore, in the seventeenth embodiment, action on the elastic plates 118bc and 118bd is produced. More specifically, this action is the same as that of the case where the biasing force to press the mobile unit 122 against the elastic plate 118b is provided like in the twelfth to fourteenth embodiments. Accordingly, the seventeenth embodiment requires to take it into account that the magnitude of the spring characteristic of the flat spring member 144 is within a predetermined range.

Figure 31A:
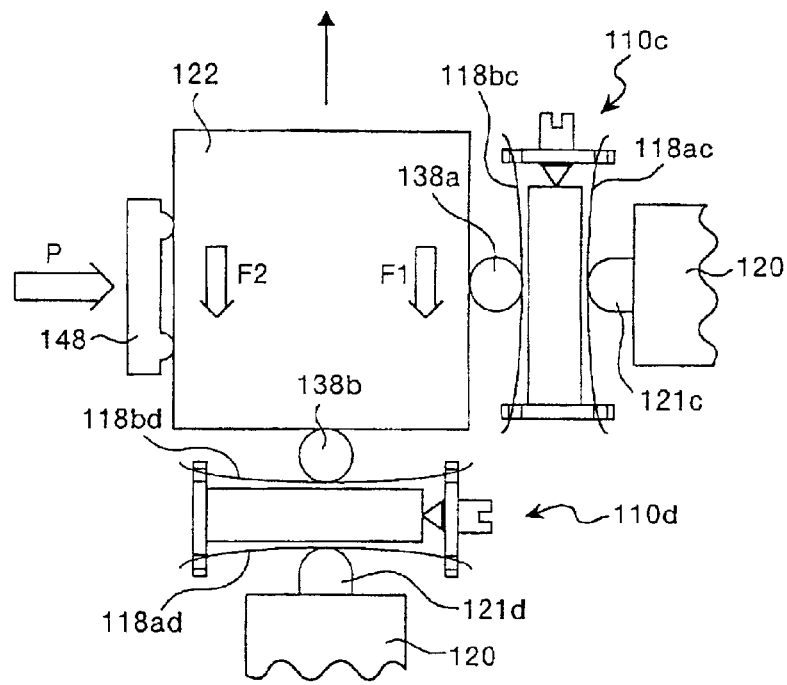
FIG. 31A is a schematic cress-sectional view showing a shake correction device in an eighteenth embodiment of this invention.

FIG. 31A shows an eighteenth embodiment. In the figure, the same legends as these in FIG. 19 to FIG. 30 represent the same components.

As shown in FIG. 31A, the eighteenth embodiment uses a pressing unit 148 as the biasing unit that provides the biasing force P to press the mobile unit 122 against the actuator 110 in the horizontal direction. More specifically, this pressing unit 148 is fixed separately from the mobile unit 122, and a part of the pressing unit 148 is in direct contact with the side of the mobile unit 122.

The operation of the eighteenth embodiment will be explained below. There is a case where the two actuators 110c and 110d are disposed on the side face and the bottom face of the mobile unit 122 in the directions orthogonal to each other, and the mobile unit 122 is moved in the horizontal direction and the vertical direction. In this case, respective biasing forces P to press the mobile unit 122 against the two actuators 110c and 110d in the horizontal direction and the vertical direction are provided.

In the eighteenth embodiment, pressing unit 148 as the biasing unit provides the biasing force P to press the mobile unit 122 against the actuator 110c. Therefore, in the eighteenth embodiment, when the mobile unit 122 is raised in the vertical direction, for example, downward frictional force F2 is produced on the side of the mobile unit 122 in contact with a part of the pressing unit 148. The downward frictional force F2 balances with frictional force F1 generated on the other side of the mobile unit 122 to prevent the mobile unit 122 from inclination due to addition of a turning effect to the mobile unit 122. Accordingly, the mobile unit 122 can be raised straight up in the vertical direction. As a result, the eighteenth embodiment can achieve the same effect as that of the fifteenth embodiment.

Figure 31B:
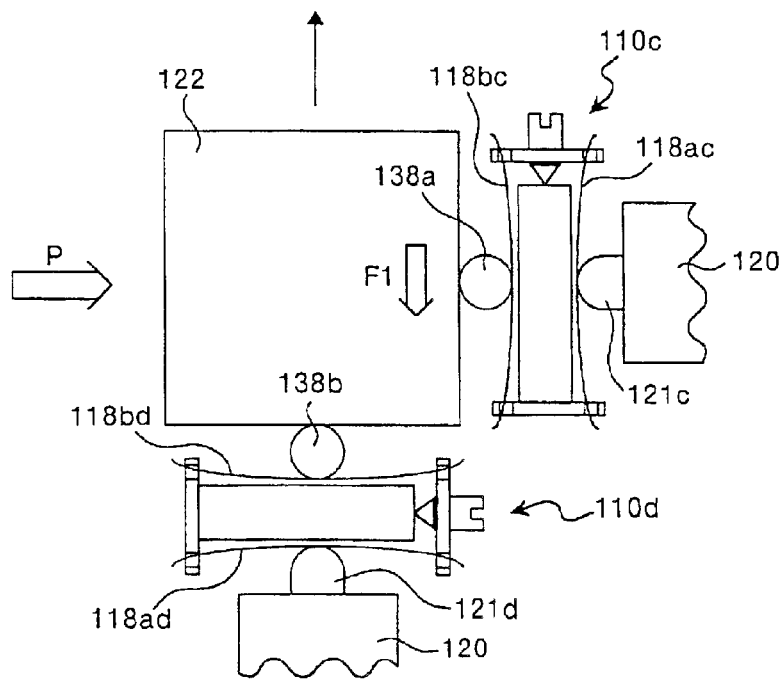
FIG. 31B is a schematic cress-sectional view showing a shake correction device for comparison.

The shake correction device not using the pressing unit 148 will be explained below with reference to FIG. 31B.

The cylindrical member 138a is disposed between the elastic plate 118bc of the actuator 110c and the mobile unit 122, and the cylindrical member 138b is disposed between the elastic plate 118bd of the actuator 110d and the mobile unit 122. Based on this situation, it is assumed that the biasing force P to press the mobile unit 122 against the actuator 110c in the horizontal direction is provided according to the enlargement due to the actuator 110d when the mobile unit 122 is raised in the vertical direction. Accordingly, the downward frictional force F1 is produced, on the side of the mobile unit 122 in contact with the actuator 110c through the cylindrical member 138a, in substantial proportion with the biasing force P. Therefore, the turning effect is added to the mobile unit 122, which causes the balance between both sides of the unit to be lost. Thus, the mobile unit 122 is inclined and may not be raised straight up in the vertical direction.

Accordingly, the eighteenth embodiment can solve the problems occurring in the shake correction device not using the pressing unit 148 because the pressing unit 148 is used in this embodiment.

Figure 32:
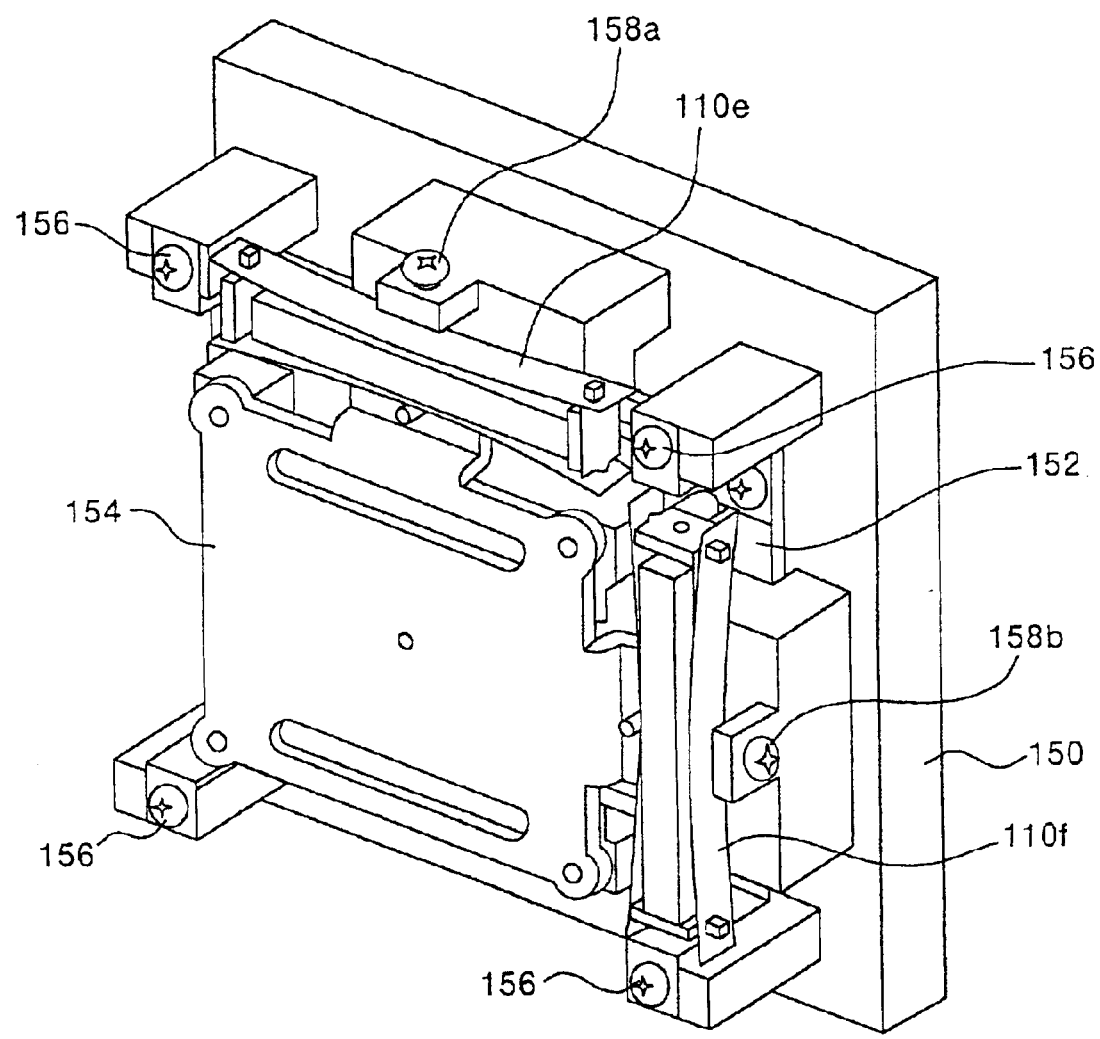
FIG. 32 is a schematic cress-sectional view showing a shake correction device in a nineteenth embodiment of this invention.
Figure 33:
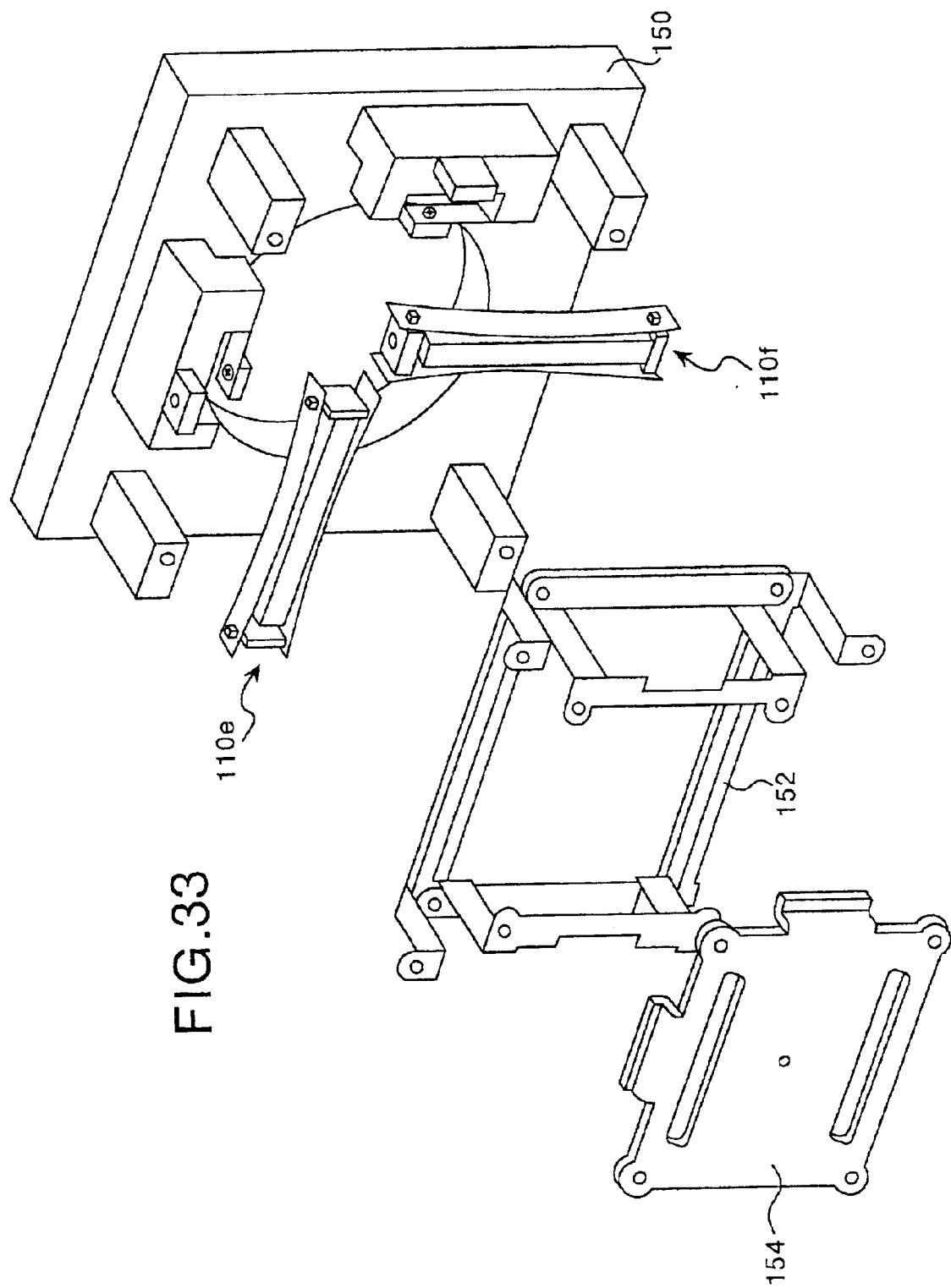
FIG. 33 is a schematic perspective view showing a disassembled state of components for a shake correction device in the nineteenth embodiment.

FIG. 32 and FIG. 33 show a nineteenth embodiment. In the figures, the same legends as these in FIG. 19 to FIG. 31 represent the same components.

In the nineteenth embodiment, two actuators 110e and 110f each having the same structure as that of the actuator 110 of the tenth embodiment are disposed on a base 150 in directions orthogonal to each other on the same plane. As a position adjustment unit to precisely fix a mobile unit (not shown) such as an image pickup unit to the actuators 110e and 110f, a space-saving guide 152 using a flat spring and a mobile unit mount base 154 for mounting the mobile unit are disposed.

The steps of assembling the components shown in FIG. 33 so as to form such a structure as shown in FIG. 32 will be explained below. The two actuators 110e and 110f are disposed on the base 150. The mobile unit is mounted on the mobile unit mount base 154. The mobile unit mount base 154 is mounted on the base 150 through the guide 152. These components are tightened by the screws 156. The positions of the mobile unit pressed against the two actuators 110e and 110f are adjusted in the horizontal direction and the vertical direction to perform positioning. Adjustment screws 158a and 158b are screwed into two screw holes on the base 150. The tips of the adjustment screws 158a and 158b are in contact with the two actuators 110e and 110f, respectively, and are bonded at their contact parts.

As explained above, in the nineteenth embodiment, as the position adjustment unit to precisely fix the mobile unit to the two actuators 110e and 110f, the guide 152 and the mobile unit mount base 154 are provided. In the nineteenth embodiment, there is a case where it is required to control variations in part size or nonuniformity of displacement of a piezoelectric element at the time of assembling the shake correction device. Even in this case, it is possible to simply perform registration of the mobile unit with respect to the two actuators 110e and 110f with high precision by accommodating the variations in the parts or the assembly using the space-saving guide 152 or the like. Thus, the nineteenth embodiment can sufficiently maintain optical performance of the shake correction device.

As shown in FIG. 26B, the correlation between the voltage applied to the piezoelectric element and the enlargement due to the actuator is not always linear. Therefore, in order to increase control precision when the movement of the mobile unit is controlled based on the enlargements due to the two actuators 110e and 110f, it is desirable that the correlation between the two is previously measured to obtain and the obtained correlation is stored in RAM or the like in the camera. When the shake correction device is actually driven, the movement of the mobile unit can be controlled with high precision by controlling the voltage applied to the piezoelectric elements based on the data in the RAM.

Figure 34:
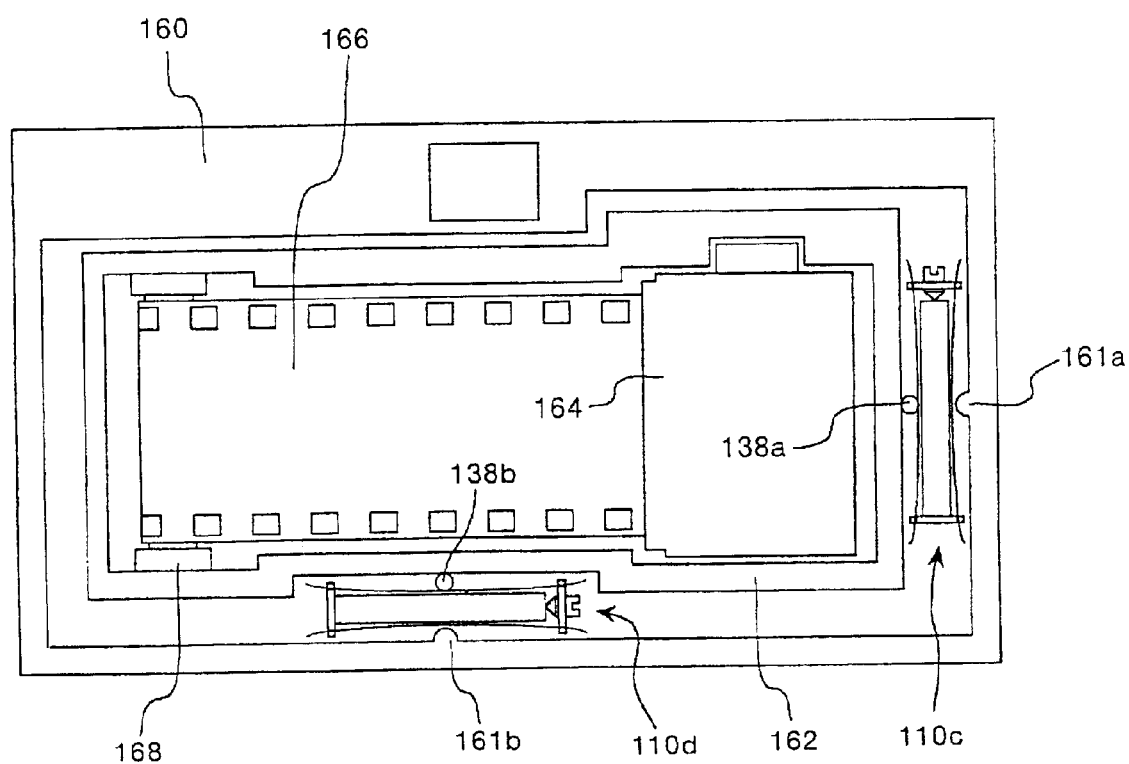
FIG. 34 is a schematic cress-sectional view showing a camera with a built-in shake correction device in a twentieth embodiment of this invention.

FIG. 34 shows a twentieth embodiment. In the figure, the same legends as these in FIG. 19 to FIG. 33 represent the same components.

In the twentieth embodiment, a film forming an image pickup surface is an object to be moved instead of the mobile unit 122 composed of the image pickup optical system such as the imaging lenses or the member holding these lenses shown in FIG. 31A of the eighteenth embodiment.

A patrone 164 of the film is loaded in a film storage part 162 including a film feeding part within a housing 160 of the camera. The film 166 fed out from the patrone 164 is taken up by a winding motor 168. The two actuators 110c and 110d are arranged between the film storage part 162 with the film 166 loaded and the housing 160 of the camera in directions orthogonal to each other.

The cylindrical member 138a is disposed between one of the elastic plates of the actuator 110c and the film storage part 162, and the cylindrical member 138b is disposed between one of the elastic plates of the actuator 110d and the film storage part 162. A protruding part 161a of the housing 160 of the camera is in contact with the other elastic plate of the actuator 110c at its central part, and a protruding part 161b of the housing 160 is in contact with the other elastic plate of the actuator 110d at its central part, respectively. The biasing unit is not shown in the figure.

The operation of the twentieth embodiment will be explained below. The protruding parts 161a and 161b of the housing 160 for the camera are in contact with one of the elastic plates of the actuators 110c and 110d, respectively. The cylindrical member 138a is disposed between the other elastic plate and the film storage part 162, and the cylindrical member 138b is disposed between the other elastic plate and the film storage part 162. Accordingly, the film storage part 162 and the film 166 loaded in the film storage part 162 can move smoothly in the horizontal direction and the vertical direction while keeping its surface perpendicular to the optical axis according to respective enlargements due to the two actuators 110c and 110d.

As explained above, in the twentieth embodiment, the object to be moved is the film storage part 162, to be more specific, the film 166 loaded in this film storage part 162. Accordingly, the twentieth embodiment can move the film 166 widely and quickly enough while keeping its surface perpendicular to the optical axis according to respective enlargements due to the two actuators 110c and 110d during exposing time based on the information from the shake detection unit of the camera such as the acceleration sensor or the gyro.

Accordingly, like the seventeenth embodiment, the twentieth embodiment can more efficiently achieve excellent performance of camera-shake correction, realization of high-resolution image by imaging based on pixel shifting, and prevention of occurrence of pseudo colors or moiré by removing a high frequency component having one half or higher of a sampling frequency of the image pickup unit.

Particularly, when a light path shifting mechanism can not be provided in the lens of the silver-salt camera or the like, application of the twentieth embodiment that moves the film 166 as an image pickup surface to such a camera is the most appropriate.

When the film 166 is to be moved, only the exposing part or the periphery of this part of the film 166 tends to be moved. In this case, it is required to change the force to hold the film 166 for feeding the film 166 and for correction during exposure. Therefore, a switching unit to hold and release the film 166 is required for each time the film 166 is taken up or fed back. Resultantly, the mechanism becomes complicated.

Further, when the film 166 is moved while pressing a part of it, stress occurs in the film 166, which may cause the film 166 to be damaged. Accordingly, the twentieth embodiment can solve the problems because the whole film storage part 162, that is, the whole mechanism of taking up or feeding back the film 166 is moved.

Figure 35:
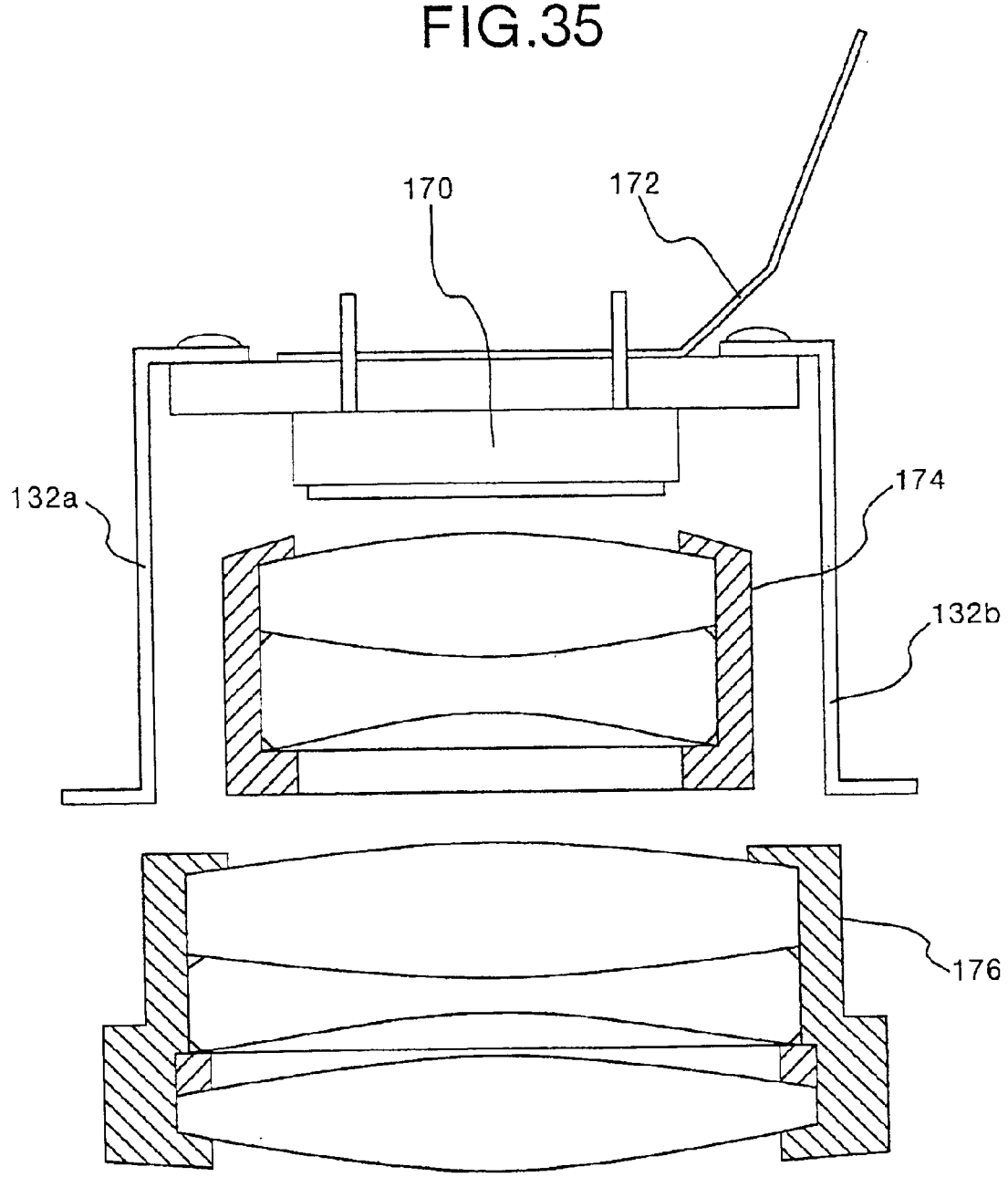
FIG. 35 is a schematic cress-sectional view showing a shake correction device in a twenty-first embodiment of this invention.

FIG. 35 shows a twenty-first embodiment. In the figure, the same legends as these in FIG. 19 to FIG. 34 represent the same components.

The twenty-first embodiment presents a case where the mobile unit 122 of the twelfth embodiment is the image pickup unit and an image pickup optical system is disposed between two flat springs 132a and 132b as the biasing units.

An image pickup unit 170 as the mobile unit 122 of the twelfth embodiment and a flexible printed board 172 connected to this image pickup unit 170 are held by two identically-shaped flat springs 132a and 132b. Further, the flexible printed board 172 is pressed against the actuator 110 of the twelfth embodiment by the biasing force P.

An image pickup lens body 174 forming a part of the image pickup optical system is disposed in the space between the two flat springs 132a and 132b. An image pickup lens body 176 forming the other part of the image pickup optical system is disposed under the image pickup lens body 174. The two flat springs 132a and 132b and the image pickup lens body 174 disposed between the two flat springs 132a and 132b are arranged in a nesting shape. The optical axes of the image pickup lens bodies 174, 176 and the image pickup surface of the image pickup unit 170 are kept perpendicular to each other.

As explained above, in the twenty-first embodiment, the image pickup lens body 174 as a part of the image pickup optical system is arranged in the nesting shape in a space between the two flat springs 132a and 132b as the biasing units. Accordingly, in the twenty-first embodiment, the length of the camera in the direction of its optical axis does not need to be long even when the two flat springs 132a and 132b are disposed, thus minimizing the camera.

The twenty-first embodiment has a high degree of flexibility of designing the lenses, housing, and designs because the distance between the image pickup lens body 174 as a rear end of the image pickup optical system and the image pickup unit 170 is not limited, and the arrangement of these two is not restricted.

Further, in the twenty-first embodiment, the two flat springs 132a and 132b are arranged outside the image pickup lens body 174 in the nesting shape. Accordingly, in the twenty-first embodiment, the length of the two flat springs 132a and 132b in the direction of their optical axes can be made longer without making longer the length of the camera in the direction of its optical axis. Therefore, the twenty-first embodiment can decrease the shake width in the direction of its optical axis when the image pickup unit 170 is moved, and can reduce bad influence due to the shake of the image pickup unit 170 in its optical axis direction over an image.

Figure 36:
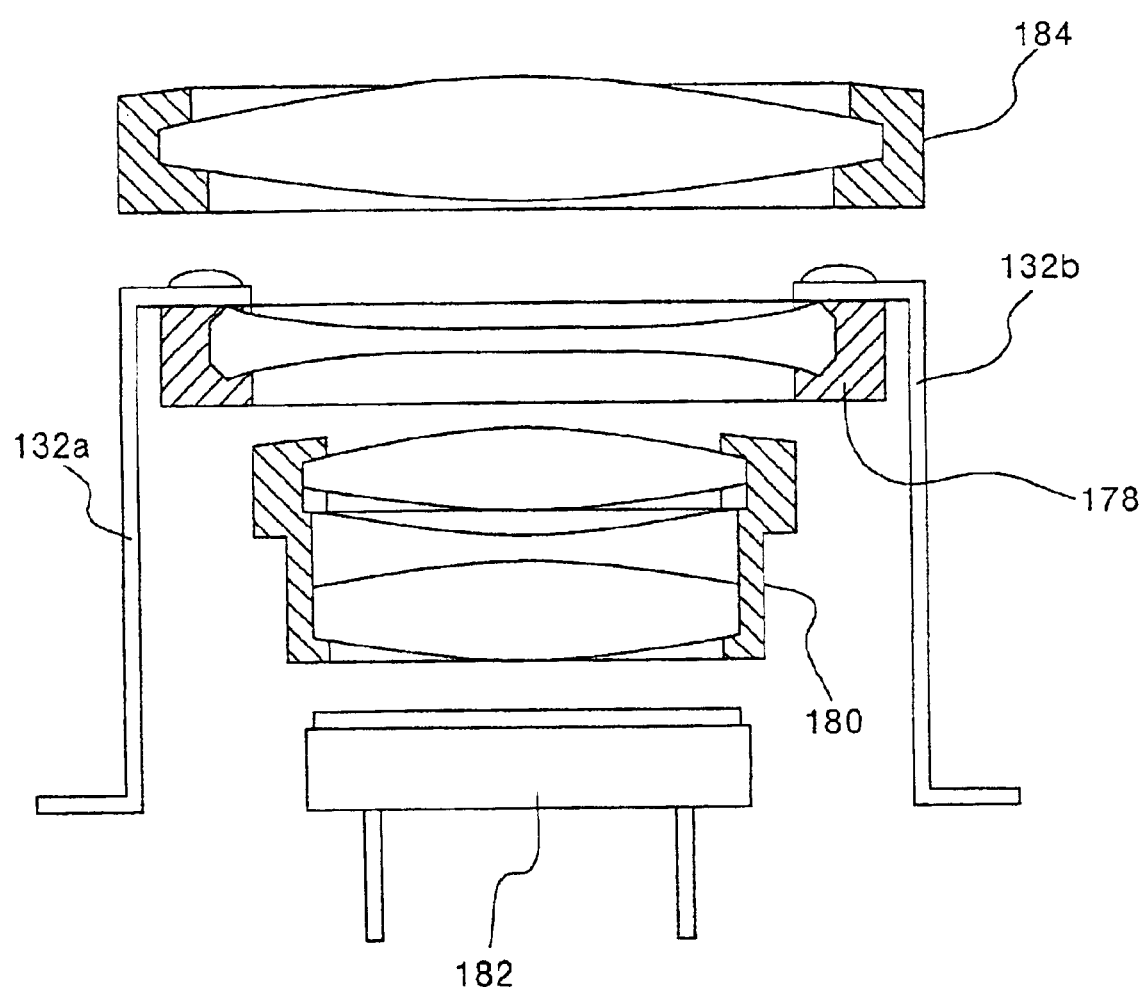
FIG. 36 is a schematic cress-sectional view showing a shake correction device in a twenty-second embodiment of this invention.

FIG. 36 shows a twenty-second embodiment. In the figure, the same legends as these in FIG. 19 to FIG. 35 represent the same components.

The twenty-second embodiment uses a light-path shifting lens 178 instead of the image pickup unit 170 as the mobile unit of the twenty-first embodiment and has a part of the image pickup optical system and the image pickup unit disposed between the two flat springs 132a and 132b as the biasing units.

Instead of the image pickup unit 170 of the twenty-first embodiment, the light-path shifting lens 178 as a mobile unit is held by the two identically-shaped flat springs 132a and 132b. The light-path shifting lens 178 is pressed against the actuator 110 of the twelfth embodiment by the biasing force P.

An image pickup lens body 180 as a part of the image pickup optical system and an image pickup unit 182 are disposed in the space between the two flat springs 132a and 132b. An image pickup lens body 184 as the other part of the image pickup optical system is disposed on the opposite side through the light-path shifting lens 178. The two flat springs 132a and 132b, and the image pickup lens body 180 and the image pickup unit 182 that are disposed between the two flat springs 132a and 132b are arranged in a nesting shape. The optical axes of the image pickup lens bodies 180, 184 and the image pickup surface of the image pickup unit 182 are kept perpendicular to each other.

As explained above, in the twenty-second embodiment, the image pickup lens body 180 as a part of the image pickup optical system and the image pickup unit 182 are arranged in the nesting shape in the space between the two flat springs 132a and 132b as the biasing units. Accordingly, the twenty-second embodiment can achieve the same effect as that of the twenty-first embodiment.

The silver-salt camera uses the film instead of the image pickup unit 182. In this case, the two flat springs 132a and 132b as the biasing units can be arranged on both sides of this film.

Figure 37:
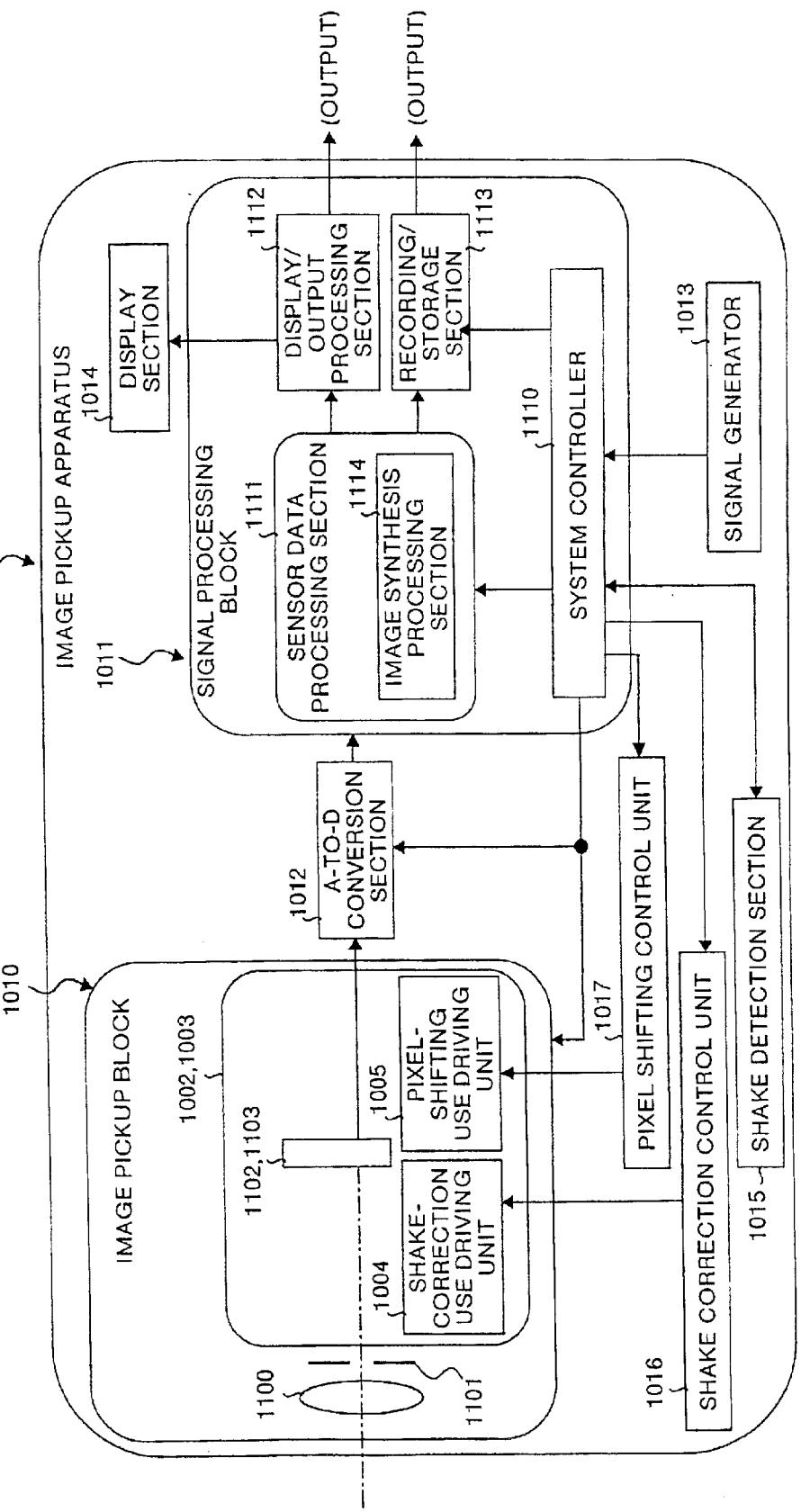
FIG. 37 is a schematic block diagram of the overall device showing a shake correction device in a twenty-third embodiment of this invention.

In FIG. 37, legend 1001 represents an image pickup device. This image pickup apparatus 1001 comprises an image pickup block 1010, a signal processing block 1011, an A-to-D conversion section 1012, a signal generator 1013, a display section 1014, a shake detection section 1015, a shake correction control unit 1016, and a pixel shifting control unit 1017.

The image pickup block 1010 images an object (not shown) to obtain analog image signals. This image pickup block 1010 is composed of an imaging optical system 1100, a shutter 1101, an image pickup unit 1102, a shake-correction use supporting unit 1002 and a pixel-shifting use supporting unit 1003 as a supporting section of the image pickup unit 1102, and a shake-correction use driving unit 1004 and a pixel-shifting use driving unit 1005 as a driving section for the image pickup unit 1102.

The imaging optical system 1100 comprises lenses, and forms an object image on an image forming surface (not shown) of the image pickup unit 1102. The shutter 1101 shields the incident light into the imaging optical system 1100, and includes a mechanical shutter that performs light shielding by a mechanical system or an electronic shutter that electrically performs light shielding. The image pickup unit 1102 converts the light reaching the image forming surface into analog electric signals and outputs the analog electric signals to the A-to-D conversion section 1012.

When an object is imaging in the image pickup block 1010, the light from the object reaches the image forming surface of the image pickup unit 1102 by passing through the imaging optical system 1100 and the shutter 1101, and an object image is formed on the image forming surface. The light reaching the image forming surface of the image pickup unit 1102 is converted to analog electric signals by the image pickup unit 1102 to be output to the A-to-D conversion section 1012. The image pickup block 1010 obtains an image signal from the object image formed on the image forming surface of the image pickup unit 1102 through the imaging optical system 1100 by the action of the image pickup unit 1102.

The signal processing block 1011 performs processing on digital image signals obtained by digitizing the analog image signals, obtained in the image pickup block 1010, in the A-to-D conversion section 1012, and outputs the signals to the outside. The signal processing block 1011 is composed of a system controller 1110, a sensor data processing section 1111, a display/output processing section 1112, and a recording/storage section 1113.

The system controller 1110 is connected to a control section (not shown) that controls the imaging optical system 1100, the shutter 1101, and the image pickup unit 1102 in the image pickup block 1010. The system controller 1110 is also connected to the A-to-D conversion section 1012, the sensor data processing section 1111, the recording/storage section 1113, the signal generator 1013, the shake detection section 1015, the shake correction control unit 1016, and the pixel shifting control unit 1017, respectively. The system controller 1110 controls image pickup operations such as zooming, focusing, exposure, white balance, strobe light flashing, and any operation according to mode selection or key entry such as A-to-D conversion, read or write data from or in the memory, shake correction, or pixel shifting. Further, the system controller 1110 comprises a microcomputer. Therefore, controlling the units and arithmetic operations are executed by operating the microcomputer according to various programs previously stored in ROM.

The sensor data processing section 1111 inputs digital image signals from the A-to-D conversion section 1012 and outputs the input digital image signals to the recording/storage section 1113 or to the display/output processing section 1112 according to the control of the system controller 1110. The sensor data processing section 1111 has an image synthesis processing section 1114.

The display/output processing section 1112 displays the digital image signals input from the sensor data processing section 1111 on the display section 1014 such as a liquid crystal monitor, or outputs the signals to a personal computer or a TV monitor.

The followings are possible in the recording/storage section 1113. That is,

1) To store digital image signals for plural frames.
2) To reduce an imaging interval for each frame by storing digital image signals for one frame for each imaging, outputting the digital image signals straight to an external memory card (not shown) when the signals for plural frames are stored, and recording the signals in the external memory card.
3) To convert the digital image signals for two frames stored in the recording/storage section 1113 to a piece of composite image obtained by being subjected to processing for higher image quality in the image synthesis processing section 1114 of the sensor data processing section 1111 when pixel shifting is to be performed.

The shake detection section 1015 is a circuit to detect a shake direction and a shake quantity on the image forming surface of the image pickup unit 1102, and comprises an angular velocity sensor and an angular acceleration sensor. A signal to correct shake is output from the system controller 1110 to the shake correction control unit 1016 based on the signals indicating the shake direction and the shake quantity detected by the shake detection section 1015.

The shake directions on the image forming surface of the image pickup unit 1102 are, as shown in FIG. 4, the X direction and the Y direction which are vertical with respect to the optical axis Z—Z of the imaging optical system 1100 and are orthogonal to each other. The X direction is the horizontal direction and the Y direction is the vertical direction. The X direction and the Y direction indicate the horizontal direction and the vertical direction in this example, but these directions may be changed to reverse directions, or may be changed to some other directions.

The shake correction control unit 1016 is connected to the shake-correction use driving unit 1004 of the image pickup unit 1102. This shake correction control unit 1016 outputs a signal to vibrate the image pickup unit 1102 to the shake-correction use driving unit 1004 so as to cancel out the shake directions and the shake quantity on the image forming surface of the image pickup unit 1102 detected by the shake detection section 1015, and then shake correction is executed.

The pixel shifting control unit 1017 is connected to the pixel-shifting use driving unit 1005 of the image pickup unit 1102. When pixel shifting is to be performed, the pixel shifting control unit 1017 outputs a signal to control a displacement quantity (e.g., by one pixel) and a displacement direction of the image pickup unit 1102 to the pixel-shifting use driving unit 1005, and pixel shifting is executed.

The signal generator 1013 has a switch to operate the shutter 1101 to pick up an image and mode switches to set various modes. Through operation of any of the mode switches, the signal generator 1013 outputs a signal corresponding to the operation to the system controller 1110.

The shake-correction use supporting unit 1002 supports the image pickup unit 1102 so as to be capable of vibrating in the X direction and the Y direction which are perpendicular to the optical axis of the imaging optical system 1100 and are orthogonal to each other.

As shown in FIG. 38 to FIG. 41, the shake-correction use supporting unit 1002 comprises a first flat spring body 1021 that displaces substantially in the Y direction, a second flat spring body 1022 that displaces substantially in the X direction, a first support plate 1023 to which one end of the first flat spring body 1021 is fixed and which is perpendicular to the optical axis Z—Z, a second support plate 1024 to which one end of the second flat spring body 1022 is fixed and which is perpendicular to the optical axis Z—Z, and a third support plate 1025 to which the other ends of the first flat spring body 1021 and the second flat spring body 1022 are fixed and which is perpendicular to the optical axis Z—Z.

The first flat spring body 1021 is formed with four flat springs 1210 whose longitudinal direction is parallel to the optical axis Z—Z and which are disposed vertically symmetrically with respect to the optical axis Z—Z. The four flat springs 1210 form a link with the first support plate 1023 and the third support plate 1025.

The second flat spring body 1022 is formed with four flat springs 1220 whose longitudinal direction is parallel to the optical axis Z—Z and which are disposed horizontally symmetrically with respect to the optical axis Z—Z. The four flat springs 1220 form a link with the second support plate 1024 and the third support plate 1025.

Figure 41:
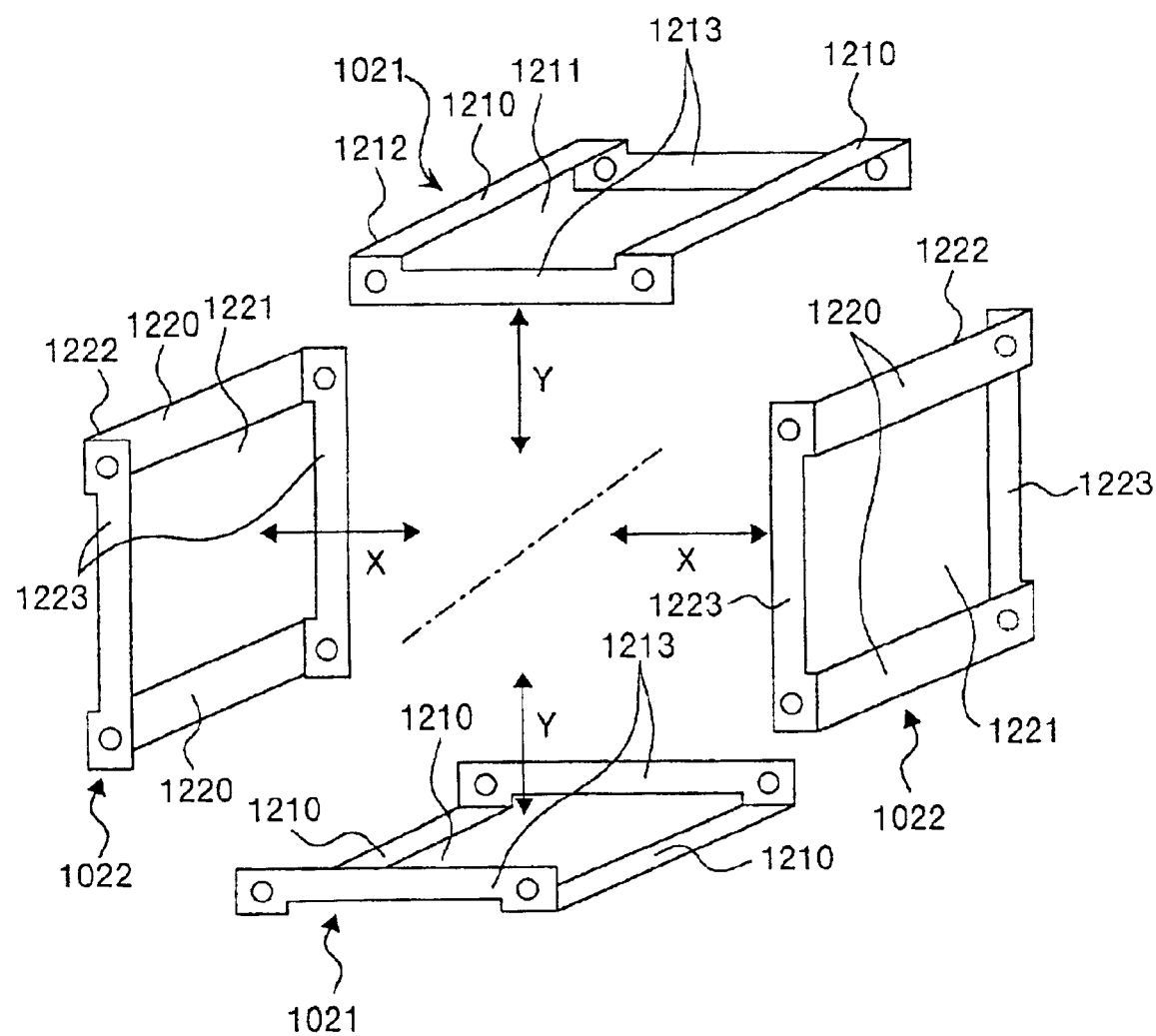
FIG. 41 is a partially perspective view showing the first flat spring body and the second flat spring body of the shake correction device in the twenty-third embodiment.

As shown in FIG. 41, the first flat spring body 1021 is formed with a flat spring unit 1212, and the second flat spring body 1022 is formed with a flat spring unit 1222. The flat spring unit 1212 is structured to open a sheet of spring plate (e.g., a metal plate) in its central part 1211 to form two flat springs 1210, and the flat spring unit 1222 is structured to open a sheet of spring plate in its central part 1221 to form two flat springs 1220. The first flat spring body 1021 is formed with the vertically disposed two flat spring units 1212. The second flat spring body 1022 is formed with the horizontally disposed two flat spring units 1222.

Both end parts 1213 of the first flat spring body 1021 are folded to the side of optical axis Z—Z, and so are both end parts 1223 of the second flat spring body 1022. The folded end parts 1213 and 1223 are used as parts for positioning and fixing in order to fix the bodies to the first support plate 1023, the second support plate 1024, and the third support plate 1025. Holes for positioning and holes for screwing can be made on the folded end parts 1213 and 1223.

The folded end parts 1213 and 1223 of the first flat spring body 1021 and the second flat spring body 1022 are fastened with screws to the first support plate 1023, the second support plate 1024, and the third support plate 1025. As fixing means, swaging or bonding may be used other than screwing.

Figure 38:
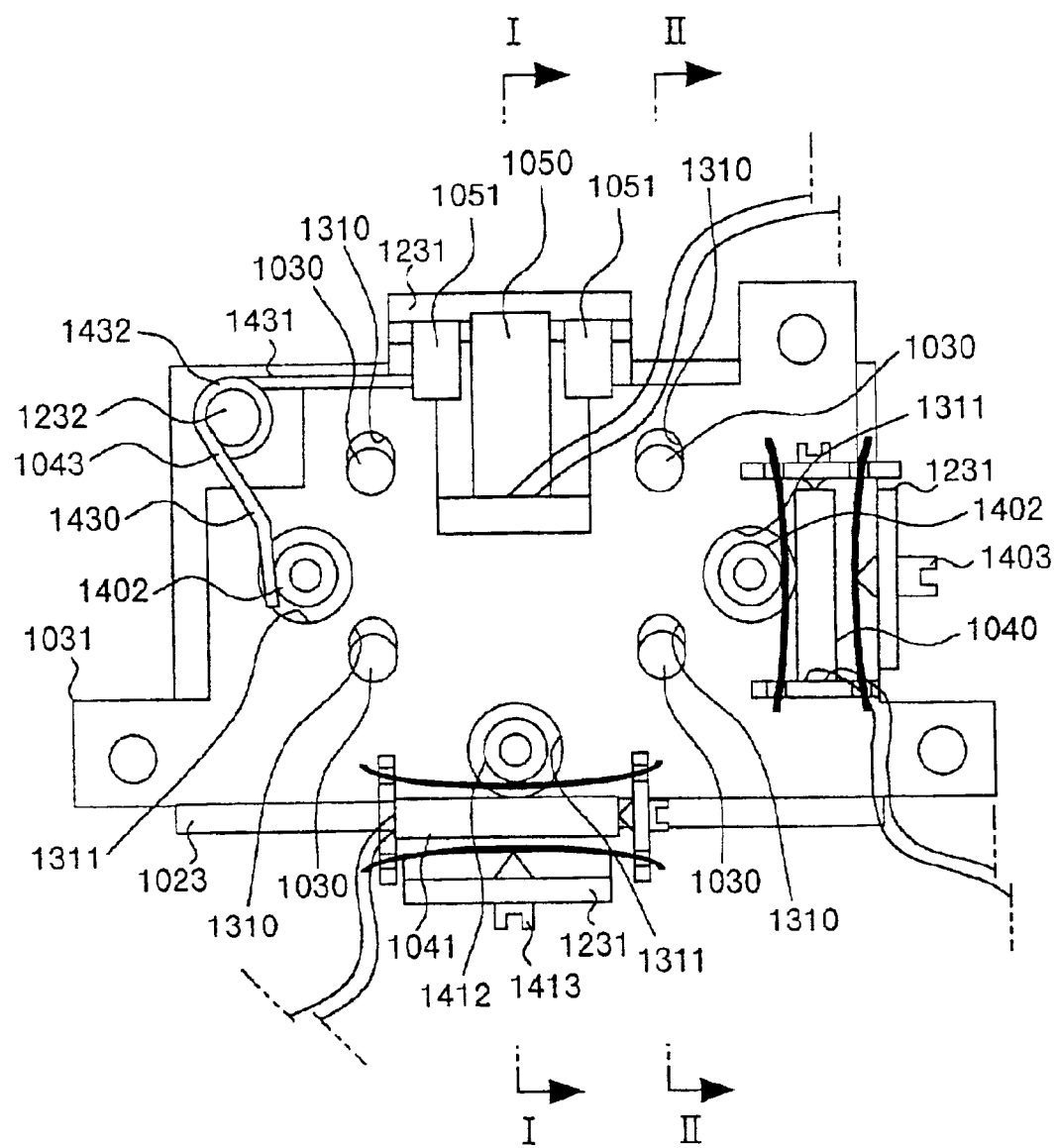
FIG. 38 is a schematic rear diagram showing the shake correction device in the twenty-third embodiment.

An opening part 1230 is provided at the center of the first support plate 1023. A mounting part 1231 having an L shape when viewed from the horizontal side and a T shape when viewed from the vertical side is integrally provided at each center of the upper and lower sides and the left side of the first support plate 1023 (FIG. 38 shows a rear view. Therefore, the above-mentioned left side should be reversed to the right side. Hereafter, left to right is reversed in FIG. 38). The second support plate 1024 positions on the front side of the first support plate 1023. The third support plate 1025 positions on the front side of the first support plate 1023 and the second support plate 1024 through the first flat spring body 1021 and the second flat spring body 1022. An opening part 1250 is provided in the center of the third support plate 1025.

The image pickup unit 1102 is stored in a unit 1103. The unit 1103 is opened on its front side and is blocked on its both sides and rear side. The image forming surface of the image pickup unit 1102 faces the front opening part of the unit 1103. As the unit 1103, any unit formed with a frame composed of a front side opening part and side block parts, and a pressure plate composed of the rear side block part may be used so that the image pickup unit 1102 will be stored by being sandwiched between the frame and the pressure plate.

The rear side (pressure plate) of the unit 1103 is fixed to the front side of the second support plate 1024 with at least one connecting pin 1240. The fixture with the connecting pin 1240 is performed by screwing, swaging, or bonding. The image forming surface of the image pickup unit 1102 faces the opening part 1250 of the third support plate 1025. Therefore, the image pickup unit 1102 is disposed between the first support plate 1023, the second support plate 1024, and the third support plate 1025, and is supported by the second support plate 1024.

Figure 39:
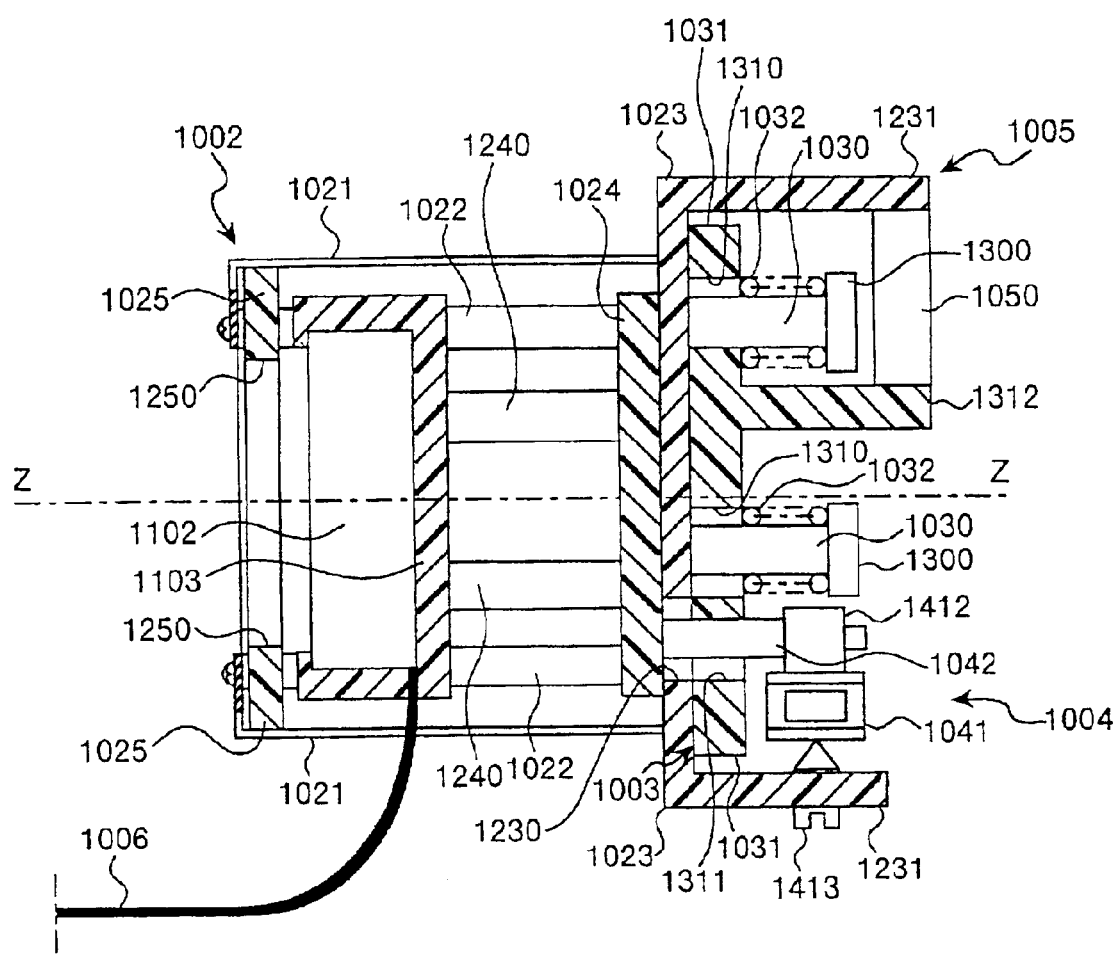
FIG. 39 is a cross-sectional view showing the composition of a cross section taken along the line I—I and a cross section taken along the line II—II in FIG. 38.
Figure 40:
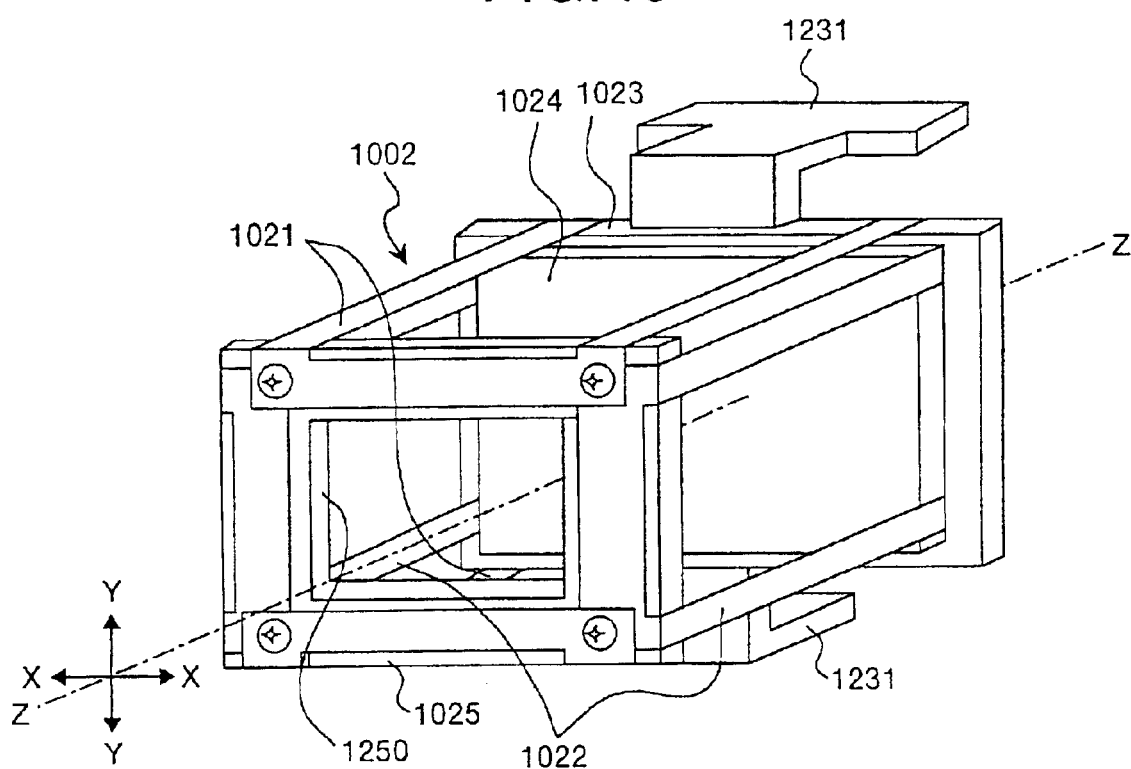
FIG. 40 is a perspective view showing the shake-correction use supporting unit of the shake correction device in the twenty-third embodiment.

The second support plate 1024 supporting the image pickup unit 1102 is a movable-side support part, and the first support plate 1023 is a fixed-side support part. The shake-correction use driving unit 1004 is disposed between the first support plate 1023 as the fixed-side support part and the second support plate 1024 as the movable-side support part. Legend 1006 of FIG. 39 represents a wiring member whose one end is connected to the image pickup unit 1102.

The action of the above-structured shake-correction use supporting unit 1002 will be explained below.

When the shake-correction use driving unit 1004 is driven in the X direction, the second support plate 1024 as the movable-side support part is displaced in the X direction (horizontal direction) with respect to the first support plate 1023 as the fixed-side support part. At this time, the four flat springs 1220 of the second flat spring body 1022 act on the X direction and the second support plate 1024 can displace in the X direction. On the other hand, the four flat springs 1210 of the first flat spring body 1021 and the third support plate 1025 are in a fixed state.

When the shake-correction use driving unit 1004 is driven in the Y direction, the second support plate 1024 as the movable-side support part is displaced in the Y direction (vertical direction) with respect to the first support plate 1023 as the fixed-side support part through the third support plate 1025 and the second flat spring body 1022. At this time, the four flat springs 1210 of the first flat spring body 1021 act on the Y direction and the second support plate 1024 can displace in the Y direction. On the other hand, the four flat springs 1220 of the second flat spring body 1022 and the third support plate 1025 move together with the second support plate 1024 in parallel with each other while keeping the linked structure.

The image pickup unit 1102 displaces in the X direction and the Y direction as the second support plate 1024 displaces in the X direction and the Y direction, so that the shake of the imaging apparatus is corrected.

As explained above, the twenty-third embodiment has the image pickup unit 1102 disposed in the shake-correction use supporting unit 1002 composed of the first flat spring body 1021, the second flat spring body 1022, the first support plate 1023, the second support plate 1024, and the third support plate 1025. Thus, the twenty-third embodiment can minimize the shake-correction use supporting unit 1002 and also minimize the imaging apparatus.

Particularly, in the twenty-third embodiment, a link is formed with the four flat springs 1210 of the first flat spring body 1021, the first support plate 1023 and the third support plate 1025. Further, another link is formed with the four flat springs 1220 of the second flat spring body 1022, the second support plate 1024 and the third support plate 1025. Thus, a load applied to each of the flat springs 1210 and 1220 can be reduced.

The twenty-third embodiment can reduce the number of components because the two flat springs 1210 are formed with a signal flat spring unit 1212, and the two flat springs 1220 are formed with a signal flat spring unit 1222. If the two flat spring units 1212 and 1222 are made of one component, the number of components can further be reduced. Further, the four flat springs 1210 and 1220 may be discretely used without using the flat spring units 1212 and 1222.

The twenty-third embodiment uses the folded end parts 1213 and 1223 at both ends of the first flat spring body 1021 and the second flat spring body 1022 as positioning and fixing parts for fixing the bodies to the first support plate 1023, the second support plate 1024, and the third support plate 1025. Accordingly, since the need for positioning components and fixing components as discretely prepared components is eliminated, the twenty-third embodiment can reduce the number of components by the same amount.

The twenty-third embodiment can minimize the imaging apparatus because the folded end parts 1213 and 1223 at both ends of the first flat spring body 1021 and the second flat spring body 1022 are folded into the side of the optical axis Z—Z, that is, inwardly. Further, the first flat spring body 1021 is formed with the four flat springs 1210, and the second flat spring body 1022 is formed with the four flat springs 1220. However, each structure of the first flat spring body 1021 and the second flat spring body 1022 is not particularly limited in this invention. For example, the first flat spring body and the second flat spring body each formed with a single flat spring or a plurality of flat springs may be used.

The shake-correction use driving unit 1004 is composed of a multilayer piezoelectric element 1040 with the X-direction enlarging mechanism and a multilayer piezoelectric element 1041 with a Y-direction enlarging mechanism. The multilayer piezoelectric element 1040 with the X-direction enlarging mechanism and the multilayer piezoelectric element 1041 with the Y-direction enlarging mechanism are disposed between the second support plate 1024 as the movable-side support part and the first support plate 1023 as the fixed-side support part.

Figure 42:
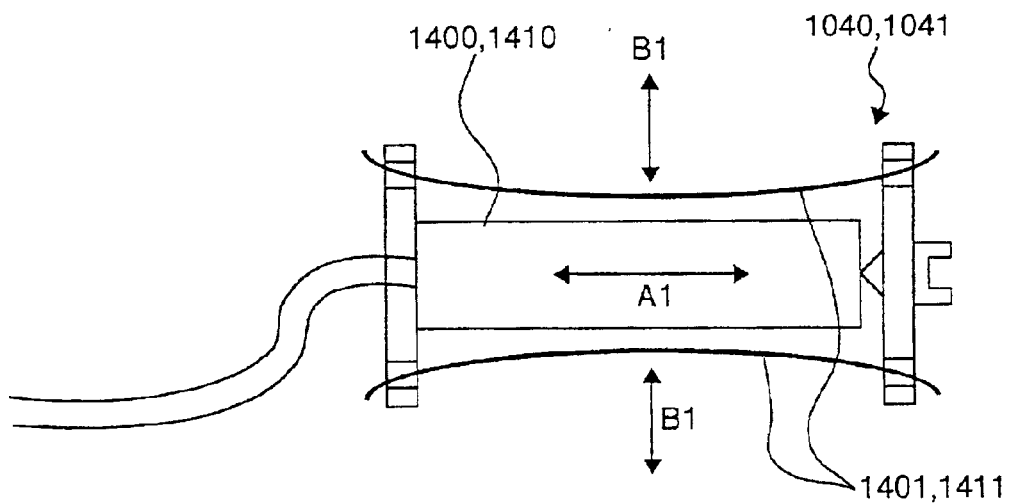
FIG. 42 shows the multilayer piezoelectric element with the enlarging mechanism of the shake correction device in the twenty-third embodiment.
Figure 43:
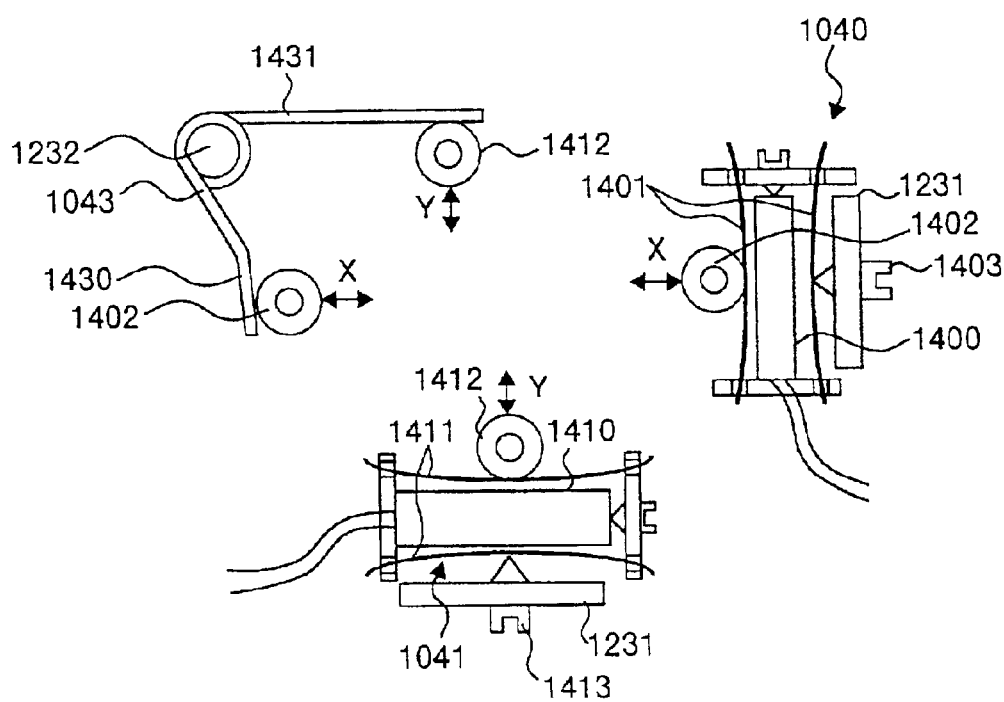
FIG. 43 shows the multilayer piezoelectric element with the enlarging mechanism, the rollers, the adjustment screws, and the biasing springs of the shake correction device in the twenty-third embodiment.

As shown in FIG. 42, the multilayer piezoelectric element 1040 with the X-direction enlarging mechanism has curved flat springs stretched over both ends of the multilayer piezoelectric element 1400. The multilayer piezoelectric element 1041 with the Y-direction enlarging mechanism also has curved flat springs stretched over both ends of the multilayer piezoelectric element 1410. That is, both of the elements have displacement parts 1401 and 1411 on their both sides (on the upper and lower sides in FIG. 42), respectively.

A voltage is applied to the multilayer piezoelectric elements 1400 and 1410 in this state. In response to this application, the multilayer piezoelectric elements 1400 and 1410 expand in the longitudinal direction (the direction of the arrow A1, i.e. the horizontal direction in FIG. 42). At this time, the displacement parts 1401 and 1411 each made of two curved flat springs are pulled to change their curvature. The change in this curvature causes their displacement in a direction perpendicular (the direction of the arrow B1, i.e. the vertical direction in FIG. 42) to the displacement direction of the multilayer piezoelectric elements 1400 and 1410.

The displacement parts 1401 are provided on both sides of the multilayer piezoelectric element 1400 and the displacement parts 1411 are provided on both sides of the multilayer piezoelectric element 1410. Accordingly, the displacement quantity due to the change in the curvature becomes twice, so that the displacement quantity larger than that of the change due to expansion of each of the multilayer piezoelectric elements 1400 and 1410 can be obtained. That is, the enlargement perpendicularly changed by the enlarging mechanism can be obtained. This enlarged displacement quantity is utilized as a driving source for shake correction. Regarding this multilayer piezoelectric element with the enlarging mechanism, refer to Japanese Patent Application Laid-Open No. 11-204848 filed by this applicant.

As shown in FIG. 38 and FIG. 39, the multilayer piezoelectric element 1040 with the X-direction enlarging mechanism and the multilayer piezoelectric element 1041 with the Y-direction enlarging mechanism are disposed in positions on the substantially same plane opposite to the image forming surface of the image pickup unit 1102. That is, the multilayer piezoelectric element 1040 with the X-direction enlarging mechanism is disposed at the center of the left side of the first support plate 1023 so that the displacement direction of the displacement parts 1401 coincides with the X direction. The multilayer piezoelectric element 1041 with the Y-direction enlarging mechanism is disposed at the center of the bottom side of the first support plate 1023 so that the displacement direction of the displacement parts 1411 coincides with the Y direction.

The multilayer piezoelectric element 1040 with the X-direction enlarging mechanism and the multilayer piezoelectric element 1041 with the Y-direction enlarging mechanism are disposed in a state where the displacement directions of the multilayer piezoelectric elements 1400 and 1410 (longitudinal directions of the multilayer piezoelectric elements 1400 and 1410) are orthogonal to the vibrating directions (the X and Y directions) of the image pickup unit 1102, respectively.

The displacement part 1401 of the multilayer piezoelectric element 1040 with the X-direction enlarging mechanism is disposed between the second support plate 1024 as the movable-side support part and the first support plate 1023 as the fixed-side support part through an X-direction roller 1402 and an X-direction adjustment screw 1403. The displacement part 1411 of the multilayer piezoelectric element 1041 with the Y-direction enlarging mechanism is disposed between the second support plate 1024 as the movable-side support part and the first support plate 1023 as the fixed-side support part through a Y-direction roller and a Y-direction adjustment screw 1413.

The ends of the interlocking pins 1042 are fixed to four positions on the upper and lower sides and left and right sides of the rear face of the second support plate 1024 as the movable-side support part, respectively. The interlocking pins 1042 are fastened by screwing, swaging, or bonding in the same manner as that of the connecting pin 1240. The four interlocking pins 1042 fixed to the second support plate 1024 protrude from the rear face of a fixed base 1031 through the opening parts 1230 of the first support plate 1023 and recess holes 1311 of the fixed base 1031. These four interlocking pins 1042 are designed so that any of the pins will not interfere with the opening parts 1230 of the first support plate 1023 at the time of shake correction and will not interfere with the recess holes 1311 of the fixed base 1031 at the time of shake correction and pixel shifting, respectively.

Rollers 1402 and 1412 are rotatably fixed to the other ends of the four interlocking pins 1042. Of the four rollers, the horizontally provided two rollers are the X-direction rollers 1402, which are in contact with the inner displacement part 1401 of the multilayer piezoelectric element 1040 with the X-direction enlarging mechanism and an X-direction biasing spring 1430, and rotate in the Y direction. The vertically provided two rollers are the Y-direction rollers 1412, which are in contact with the inner displacement part 1411 of the multilayer piezoelectric element 1041 with the Y-direction enlarging mechanism and a Y-direction biasing spring 1431, and rotate in the X direction. By providing slip-off prevention mechanisms to the interlocking pins 1042 and the rollers 1402 and 1412, it is possible to improve assembly efficiency.

The X-direction adjustment screw 1403 is provided in the mounting part 1231 on the left side of the first support plate 1023 as the fixed-side support part, and the Y-direction adjustment screw 1413 is provided in the mounting part 1231 on the bottom side of the first support plate 1023. Screw holes are made on the mounting parts 1231 of the first support plate 1023. The X-direction adjustment screw 1403 and the Y-direction adjustment screw 1413 are fixed to the screw holes. The tip of the X-direction adjustment screw 1403 is in contact with the outer displacement part 1401 of the multilayer piezoelectric element 1040 with the X-direction enlarging mechanism. The tip of the Y-direction adjustment screw 1413 is in contact with the outer displacement part 1411 of the multilayer piezoelectric element 1041 with the Y-direction enlarging mechanism. It is desirable that the X-direction adjustment screw 1403 is in contact with the center of the displacement part 1401 of the multilayer piezoelectric element 1040 with the X-direction enlarging mechanism, and the Y-direction adjustment screw 1403 is in contact with the center of the displacement part 1411 of the multilayer piezoelectric element 1041 with the Y-direction enlarging mechanism.

The X-direction adjustment screw 1403 and the Y-direction adjustment screw 1413 adjust initial positions in the X direction and the Y direction of the image pickup unit 1102. The X-direction adjustment screw 1403 and the Y-direction adjustment screw 1413 are rotated. In response to these rotations, the image pickup unit 1102 slightly moves in the X direction and the Y direction through the components as follows. That is, the multilayer piezoelectric element 1040 with the X-direction enlarging mechanism and the multilayer piezoelectric element 1041 with the Y-direction enlarging mechanism, the X-direction roller 1402 on the left side and the Y-direction roller 1412 on the bottom side, the interlocking pins 1042 on the left side and the bottom side, the second support plate 1024, the connecting pins 1240, and the unit 1103. Accordingly, the image pickup unit 1102 is positioned through its adjustment to a specified position (initial position) with respect to the optical axis Z—Z.

As shown in FIG. 38, the X-direction biasing spring 1430 and the Y-direction biasing spring 1431 are disposed between the second support plate 1024 as the movable-side support part and the first support plate 1023 as the fixed-side support part, respectively. The X-direction biasing spring 1430 and the Y-direction biasing spring 1431 are formed with a single biasing spring 1043. The single biasing spring 1043 is formed with a central link part 1432, and the X-direction biasing spring 1430 and the Y-direction biasing spring 1431 as both arm parts on the left and right sides which are used in a state where the closed arms are kept open.

The link part 1432 is engaged with a cylindrical projection 1232 fixed to the corner on the right upper side of the rear face of the first support plate 1023. While the X-direction biasing spring 1430 elastically contacts the X-direction roller 1402 on the right side and the Y-direction biasing spring 1431 elastically contacts the Y-direction roller 1412 on the upper side.

Accordingly, the X-direction biasing spring 1430 biases the second support plate 1024 to the side (left side) of the multilayer piezoelectric element 1040 with the X-direction enlarging mechanism through the right-side X-direction roller 1402 and interlocking pin 1042. Further, the X-direction biasing spring 1430 biases the image pickup unit 1102 to the side (left side) of the multilayer piezoelectric element 1040 with the X-direction enlarging mechanism through the second support plate 1024, the connecting pin 1240, and the unit 1103.

Accordingly, the X-direction roller 1402 on the left side of the movable-side support part is brought into contact with the inner displacement part 1401 of the multilayer piezoelectric element 1040 with the X-direction enlarging mechanism through the left-side interlocking pin 1042. In accordance with this contact, the X-direction adjustment screw 1403 of the fixed-side support part is brought into contact with the outer displacement part 1401 of the multilayer piezoelectric element 1040 with the X-direction enlarging mechanism.

The Y-direction biasing spring 1431 biases the second support plate 1024 to the side (lower side) of the multilayer piezoelectric element 1041 with the Y-direction enlarging mechanism through the upper-side Y-direction roller 1412 and interlocking pin 1042. Further, the Y-direction biasing spring 1431 biases the image pickup unit 1102 to the side (lower side) of the multilayer piezoelectric element 1041 with the Y-direction enlarging mechanism through the second support plate 1024, the connecting pin 1240, and the unit 1103.

Accordingly, the Y-direction roller 1412 on the lower side of the movable-side support part is brought into contact with the inner displacement part 1411 of the multilayer piezoelectric element 1041 with the Y-direction enlarging mechanism through the lower-side interlocking pin 1042. In accordance with this contact, the Y-direction adjustment screw 1413 of the fixed-side support part is brought into contact with the outer displacement part 1411 of the multilayer piezoelectric element 1041 with the Y-direction enlarging mechanism.

The action of the above-structured shake-correction use driving unit 1004 will be explained below.

A signal is output from the shake correction control unit 1016 to the shake-correction use driving unit 1004. More specifically, this signal vibrates the image pickup unit 1102 so that the shake direction and the shake quantity on the image forming surface of the image pickup unit 1102 detected by the shake detection section 1015 will be cancelled out.

For example, a voltage is applied to the multilayer piezoelectric element 1040 with the X-direction enlarging mechanism. The multilayer piezoelectric element 1400 then displaces in its longitudinal direction. In association with this displacement, the displacement part 1401 is enlarged in the direction orthogonal to the displacement direction of the multilayer piezoelectric element 1400, that is, the X direction. This enlargement is conveyed to the second support plate 1024 through the left-side X-direction roller 1402 and interlocking pin 1042, and is further conveyed to the image pickup unit 1102 through the second support plate 1024, the connecting pin 1240, and the unit 1103, respectively. Accordingly, the image pickup unit 1102 vibrates in the X direction, and the shake in the X direction is corrected. When the image pickup unit 1102 vibrates in the X direction, the Y-direction rollers 1412 on the upper and lower sides rotate in the X direction along the Y-direction biasing spring 1431 and the inner displacement part 1411 of the multilayer piezoelectric element 1041 with the Y-direction enlarging mechanism through the second support plate 1024 and the interlocking pins 1042 on the upper and lower sides.

Further, a voltage is applied to the multilayer piezoelectric element 1041 with the Y-direction enlarging mechanism. The multilayer piezoelectric element 1410 then displaces in its longitudinal direction. In association with this displacement, the displacement part 1411 is enlarged in a direction orthogonal to the displacement direction of the multilayer piezoelectric element 1410, that is, the Y direction. The enlargement is conveyed to the second support plate 1024 through the lower-side Y-direction roller 1412 and interlocking pin 1042, and is further conveyed to the image pickup unit 1102 through the second support plate 1024, the connecting pin 1240, and the unit 1103, respectively. Accordingly, the image pickup unit 1102 vibrates in the Y direction, and the shake in the Y direction is corrected. When the image pickup unit 1102 vibrates in the Y direction, the X-direction rollers 1412 on the left and right sides rotate in the Y direction along the X-direction biasing spring 1430 and the inner displacement part 1401 of the multilayer piezoelectric element 1040 with the X-direction enlarging mechanism through the second support plate 1024 and the interlocking pins 1042 on the left and right sides.

In the twenty-third embodiment, the X-direction rollers 1402 and the Y-direction rollers 1412 are fixed to the second support plate 1024 as the movable-side support part through the interlocking pins 1042. While the X-direction adjustment screw 1403 and the Y-direction adjustment screw 1413 are fixed to the first support plate 1023 as the fixed-side support part. In this invention, however, reverse fixture may be applied. That is, the X-direction rollers 1402 and the Y-direction rollers 1412 may be fixed to the first support plate 1023 as the fixed-side support part, and the X-direction adjustment screw 1403 and the Y-direction adjustment screw 1413 may be fixed to the second support plate 1024 as the movable-side support part.

As explained above, in the twenty-third embodiment, each of the enlargement directions of the displacement parts 1401 and 1411 that vibrate the image pickup unit 1102 is orthogonal to each of the displacement directions of the multilayer piezoelectric elements 1400 and 1410, respectively. Therefore, in the twenty-third embodiment, the multilayer piezoelectric elements with the enlarging mechanisms 1040 and 1041 can be disposed in a state where the displacement directions of the multilayer piezoelectric elements 1400 and 1410, that is, the longitudinal directions of the multilayer piezoelectric elements 1400 and 1410 are orthogonal to the vibration directions (X direction and Y direction) of the image pickup unit 1102. Accordingly, the twenty-third embodiment can minimize the shake-correction use driving unit 1004 and also minimize the image pickup apparatus as compared to the device in which the multilayer piezoelectric elements are disposed in a state where the longitudinal directions of the multilayer piezoelectric elements coincide with the vibration directions of the image pickup device.

Particularly, the twenty-third embodiment uses the multilayer piezoelectric elements with the enlarging mechanisms 1040 and 1041 as the shake-correction use driving units 1004. Accordingly, the twenty-third embodiment can take a large degree of allowance for correction and support a large quantity of shake because displacement amplified larger than the displacement of the multilayer piezoelectric elements 1040 and 1410 can be obtained.

In the twenty-third embodiment, each of the displacement directions of the displacement parts 1401 and 1411 is orthogonal to each of the displacement directions of the multilayer piezoelectric elements 1400 and 1410, respectively. Accordingly, the twenty-third embodiment can simplify control for the multilayer piezoelectric elements 1400 and 1410 and control for vibration of the image pickup unit 1102, prevent loss at the time of driving, and ensure sufficient driving force and driving quantity with a low voltage.

The twenty-third embodiment can support multi-dimensional shake correction because the image pickup unit 1102 is allowed to vibrate in the X direction and the Y direction each perpendicular to the direction of the optical axis Z—Z and orthogonal to each other.

In the twenty-third embodiment, the multilayer piezoelectric element 1040 with the X-direction enlarging mechanism and the multilayer piezoelectric element 1041 with the Y-direction enlarging mechanism are disposed in positions on the substantially same plane opposite to the image forming surface of the image pickup unit 1102. Accordingly, the twenty-third embodiment can minimize the space surrounding the image pickup unit 1102 and also minimize the space on the rear side (opposite side to the image forming surface) of the image pickup unit 1102. It should be noted that the opposite side to the image forming surface of the image pickup unit 1102 and the opposite side to the imaging optical system 1100 are synonymous with each other in this specification.

In the twenty-third embodiment, the X-direction biasing spring 1430 and the Y-direction biasing spring 1431 are disposed between the second support plate 1024 as the movable-side support part and the first support plate 1023 as the fixed-side support part. Accordingly, in this embodiment, the X-direction roller 1402 in the movable-side support part and the X-direction adjustment screw 1403 in the fixed-side support part are in contact with the displacement part 1401 of the multilayer piezoelectric element 1040 with the X-direction enlarging mechanism. Further, the Y-direction roller 1412 in the movable-side support part and the Y-direction adjustment screw 1413 in the fixed-side support part are in contact with the displacement part 1411 of the multilayer piezoelectric element 1041 with the Y-direction enlarging mechanism. The second support plate 1024 as the movable-side support part and the image pickup unit 1102 vibrate in the X direction and the Y direction with respect to the first support plate 1023 as the fixed-side support part in their contact state. Accordingly, in the twenty-third embodiment, loss of the biasing forces of the X-direction biasing spring 1430 and the Y-direction biasing spring 1431 is reduced, and each hysteresis of the X-direction biasing spring 1430 and the Y-direction biasing spring 1431 may be hard to occur. As a result, in the twenty-third embodiment, each biasing force of the X-direction biasing spring 1430 and the Y-direction biasing spring 1431 is stabilized, and positional precision is stabilized.

The twenty-third embodiment can reduce the number of components and minimize the apparatus because the X-direction biasing spring 1430 and the Y-direction biasing spring 1431 are formed with the single biasing spring 1043.

In the twenty-third embodiment, the X-direction roller 1402 in the movable-side support part and the X-direction adjustment screw 1403 in the fixed-side support part are in contact with the inner and outer displacement parts 1401 of the multilayer piezoelectric element 1040 with the X-direction enlarging mechanism through no other components therebetween. Further, the Y-direction roller 1412 in the movable-side support part and the Y-direction adjustment screw 1413 in the fixed-side support part are in contact with the inner and outer displacement parts 1411 of the multilayer piezoelectric element 1041 with the Y-direction enlarging mechanism through no other components therebetween. Accordingly, there is a merit such that positional precision does not depend on the precision of the components.

In the twenty-third embodiment, the X-direction rollers 1402 and the Y-direction rollers 1412 are disposed between the inner displacement parts 1401 and 1411 of the multilayer piezoelectric elements 1040 and 1041 with the X-direction and Y-direction enlarging mechanisms, the X-direction and Y-direction biasing springs 1430 and 1431, and the interlocking pins 1042 fixed to the second support plate 1024. Accordingly, the twenty-third embodiment can reduce friction resistance produced when the second support plate 1024 as the movable-side support part and the image pickup unit 1102 vibrate in the X direction and the Y direction with respect to the first support plate 1023 as the fixed-side support part, thus improving precision of the imaging apparatus and reducing load to the driving force.

The twenty-third embodiment has the X-direction adjustment screw 1403 and the Y-direction adjustment screw 1413 disposed between the outer displacement parts 1401 and 1411 of the multilayer piezoelectric elements 1040 and 1041 with the X-direction and Y-direction enlarging mechanisms, and the mounting part 1231 of the first support plate 1023 where the rollers 1402 and 1412 are not disposed. Accordingly, this embodiment can adjust the initial positions of the image pickup unit 1102 in the X direction and the Y direction through the second support plate 1024.

A relation between displacement and time for the image pickup unit 1102 during shake correction will be explained below with respect to FIG. 44.

Hand shake occurring during exposure naturally causes an out-of-focus object image and a blurred image with no sharpness. Further, if a voltage is applied to the multilayer piezoelectric elements 1040 and 1041 with the enlarging mechanisms with no voltage applied, displacement is produced only in one direction. Resultantly, the device can support a shake only in one direction. Therefore, it is required that the image pickup unit 1102 should be displaced to the central position of a displacement range before exposure so that displacement can be performed in both directions.

Figure 44:
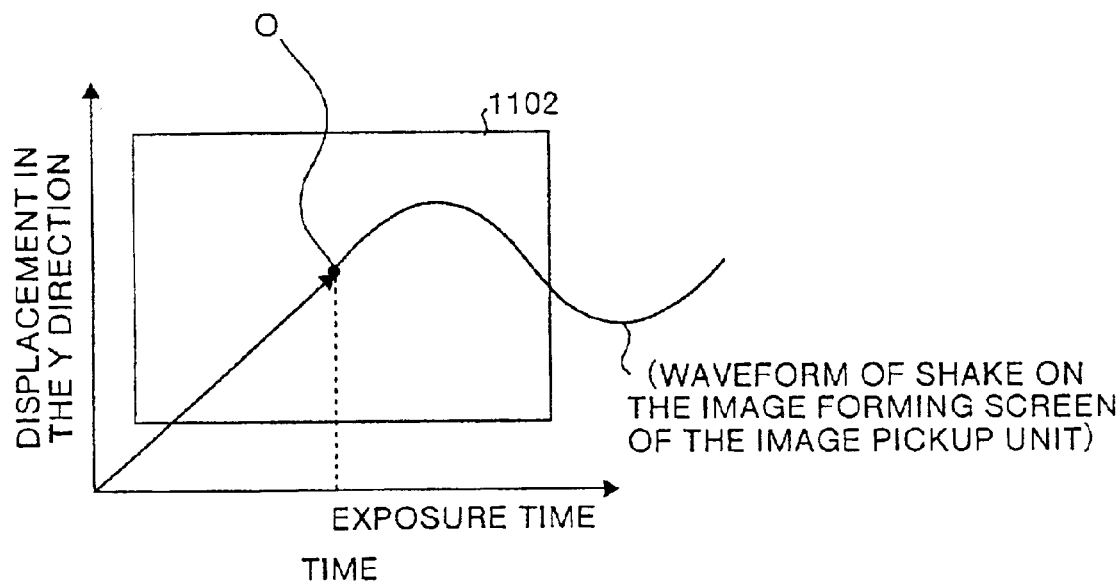
FIG. 44 is a graph showing a correlation between displacement and time of the image pickup unit during shake correction of the shake correction device in the twenty-third embodiment.

The graph in FIG. 44 shows the relation between displacement and time for the image pickup unit 1102 during shake correction. The X axis represents time and the Y axis represents displacement in the Y direction (vertical direction) in this example. As explained above, the image pickup unit 1102 is previously placed before exposure in a position where displacement in both directions can be performed. This operation is expressed by a slanting line with an arrow. That is, the position indicated by the arrow becomes an origin point O of shake correction. In the figure, a vertically waved line expresses displacement in the Y direction from the origin point O of shake correction.

The shake detection section 1015 detects a shake in response to starting of exposure. The shake correction control unit 1016 drives the shake-correction use driving unit 1004 based on the detected data to displace the image pickup unit 1102 to a position at which the shake will be cancelled out through the shake-correction use supporting unit 1002. As shown in FIG. 44, the displacement of the image pickup unit 1102 during exposure is shown by a nonlinear wiggly line. In FIG. 44, the imaging apparatus vertically vibrates in the Y direction during exposure. Therefore, the image pickup unit 1102 is driven so as to cancel out the shake. Accordingly, the shake quantity during exposure can be reduced, thus acquiring a sharp image.

Although shake correction of the image pickup unit 1102 in the Y direction is explained with reference to FIG. 44, the shake correction in the X direction (horizontal direction) is simultaneously executed in the same manner as the shake correction in the Y direction.

A correction quantity to a shake will be explained below with reference to FIG. 45. Types of shake includes a shake due to shifting that occurs when the image pickup apparatus moves in parallel and a shake due to tilting that occurs when the image pickup unit rotates. Occurrence of the shake due to tilting is higher in cameras and digital cameras because of a relation between how to hold the camera and where is a release position or the like. The shake due to shifting is constant irrespective of a distance between the apparatus and an object. While in the case of the shake due to tilting, the farther the distance to the object, the larger the effect of the shake is. In the cameras and the digital cameras, the object may be far from the apparatus, therefore, improvement of correction to this shake due to tilting allows an effective means for shake correction.

Figure 45:
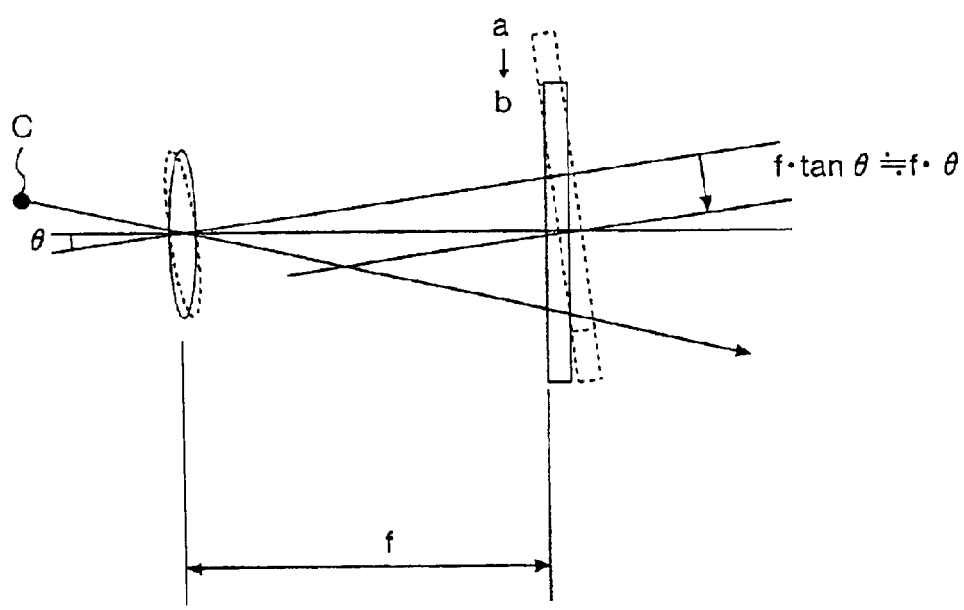
FIG. 45 shows the quantity of shake correction of the shake correction device in the twenty-third embodiment.

FIG. 45 schematically shows the imaging optical system 1100 and the image pickup unit 1102 of the image pickup block 1010 in the image pickup apparatus.

In general imaging, a light beam D from an object C passes through the imaging optical system 1100 indicated by a solid line to reach the image forming surface of the image pickup unit 1102 indicated by the solid line. The light D from the object incident from an infinite point has a focal point at a position of a focal length f of the imaging optical system 1100. When the image pickup apparatus is inclined by an angle θ in that state, both of the imaging optical system 1100 and the image forming surface of the image pickup unit 1102 become those indicated by dotted lines. That is, the light beam D from the object C reaches a different position on the image forming surface. Therefore, if such an operation occurs continuously during exposure, an out-of-focus image (blurred image) such that the object image goes out of focus is obtained. In order to register the object image to the equivalent position on the image forming surface in the inclined state, the image forming surface of the image pickup unit 1102 at a position a may be displaced to a position b. The displacement quantity from a to b at this time becomes a correction quantity to the shake. This correction quantity can be expressed as f·tan θ using f and θ. θ as the rotating shake quantity is an extremely micro angle, so that an approximate expression: f·tan θ≅f·θ can be obtained. Accordingly, the shake correction quantity is expressed by f·θ.

Further, the operation of shake correction will be explained below with reference to FIG. 46.

When imaging with the image pickup apparatus in a standby state (S100), an operator presses a release button (S101). The imaging is started in response to pressing of the release button. That is, exposure is started (S102), and at the same times the shake detection section (angular velocity detection unit) 1015 starts detecting a shake (S103).

An offset voltage is then calculated and the offset voltage is subtracted (S104). The reasons that the operations are executed are as follows. Since a voltage produces according to tilting of the image pickup apparatus even when input (vibration) of the shake detection section 1015 is zero, it is required to perform accurate shake (angular velocity) detection by outputting a voltage according to the vibration obtained through subtraction of the voltage at zero from the voltage producing when the apparatus actually vibrates. It is also required to prevent accumulation of errors.

Subsequently, voltage-to-angular velocity conversion (angular velocity ω) is performed (S105). This is the processing to convert the voltage obtained from the shake detection section 1015 to an angular velocity. Integration processing (angle θ) is then performed (S106). This processing is executed to calculate an angle θ displaced from the time of starting exposure by integrating the converted angular velocities ω.

Further, the driving quantity of the image pickup unit 1102 is computed (S107). This computation is executed to calculate a position where the image pickup unit 1102 has to be displaced from the obtained angle θ and to obtain a voltage required for displacing the image pickup unit 1102 to the calculated position. In this connection, V=k·f·θ is expressed using a conversion factor k where a voltage required for displacing the image pickup unit 1102 is V. f represents a focal length of the imaging optical system 1100, and θ represents an angle.

The voltage V for the driving quantity of the image pickup unit 1102 obtained to drive the image pickup unit 1102 is applied (S108). By doing so, shake correction according to the shake quantity from the time of starting exposure is executed.

If a signal indicating finish of exposure is received after the correction is executed, the imaging is finished as it is (S109, S110). However, when the exposure is not finished, the routine from the voltage-to-angular velocity conversion is restarted to perform correction by following the shake (S109, S104, S105, S106, S107, S108). Accordingly, high-precision shake correction becomes possible.

Figure 46:
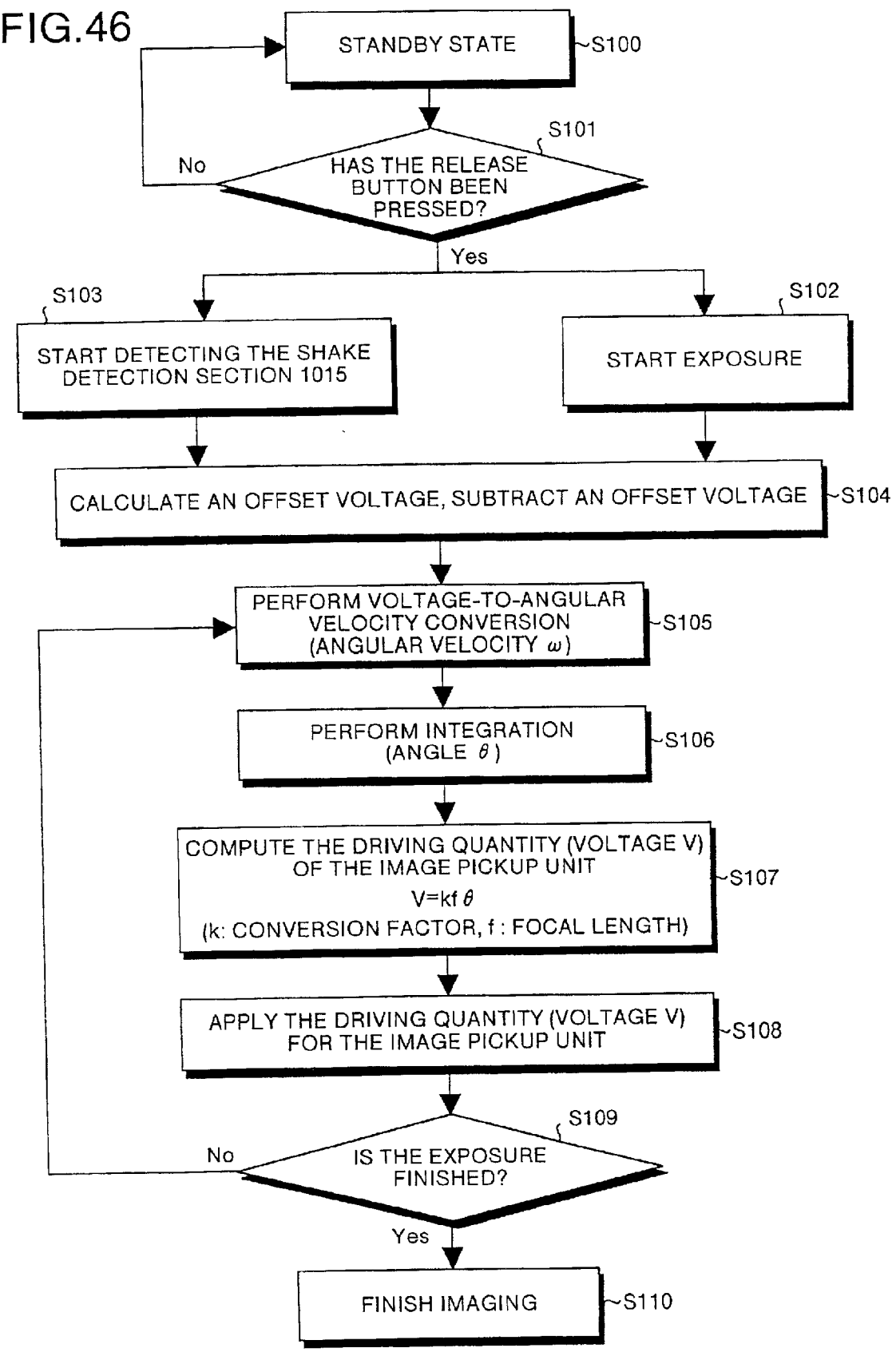
FIG. 46 is a flow chart showing the operation of shake correction of the shake correction device in the twenty-third embodiment.

The operation of the shake correction based on the flow chart of FIG. 46 is controlled in the system controller 1110.

As explained above, in the twenty-third embodiment, the shake correction control unit 1016 can control the shake-correction use driving unit 1004 through the shake detection section 1015 and the system controller 1110. Therefore, shake correction can be automatically controlled.

The pixel-shifting use supporting unit 1003 movably supports the image pickup unit 1102, the shake-correction use supporting unit 1002, and the shake-correction use driving unit 1004 in a direction of pixel shifting perpendicular to the optical axis Z—Z of the imaging optical system 1100, the Y direction (vertical direction) in this example. The pixel-shifting use supporting unit 1003 is composed of plural guide pins, four guide pins 1030 in this example, the fixed base 1031, and lead-in springs 1032.

One ends of the guide pins 1030 are fixed to the rear face of the first support plate 1023 for the shake-correction use supporting unit 1002. The guide pins 1030 are extended on the side opposite to the image forming surface of the image pickup unit 1102 in the direction of the optical axis Z—Z. On the other hand, four lengthy guide grooves 1310 are provided in the Y direction on the fixed base 1031. The guide pins 1030 are inserted into the guide grooves 1310 so as to be guided along the Y direction and are engaged in the grooves 1310.

Slip-off prevention mechanisms 1300 for the lead-in springs are provided at the other ends of the guide pins 1030. The lead-in springs 1032 are wound around the other ends of the guide pins 1030, respectively. The lead-in spring 1032 is disposed in its compressed state between the slip-off prevention mechanism 1300 and the fixed base 1031. Accordingly, the first support plate 1023 (the image pickup unit 1102, the shake-correction use supporting unit 1002, and the shake-correction use driving unit 1004) and the fixed base 1031 are in contact with each other in the direction of the optical axis Z—Z, and can be moved in the Y direction, that is, the pixel shifting direction.

The fixed base 1031 has four recess holes 1311. The four interlocking pins 1042 are inserted into these four recess holes 1311. These recess holes 1311 are provided so that the interlocking pins 1042 do not interfere with the fixed base 1031 at the time of shake correction and pixel shifting. A mounting part 1312 is protruded integrally from a substantially central part on the rear side of the fixed base 1031 on the opposite side to the image forming surface of the image pickup unit 1102 in the direction of the optical axis Z—Z. The mounting part 1312 is provided for mounting a multilayer piezoelectric element 1050 for the pixel-shifting use driving unit 1005.

The pixel-shifting use driving unit 1005 is used to move the image pickup unit 1102, the shake-correction use supporting unit 1002, and the shake-correction use driving unit 1004 in the pixel shifting direction in the Y direction by a specified quantity.

The pixel-shifting use driving unit 1005 is composed of the multilayer piezoelectric element 1050. This multilayer piezoelectric element 1050 is disposed in a position, of the fixed base 1031, opposite to the image forming surface of the image pickup unit 1102. More specifically, this multilayer piezoelectric element 1050 is disposed on the substantially same plane where the multilayer piezoelectric elements 1040 and 1041 with the X-and Y-direction enlarging mechanisms of the shake-correction use driving unit 1004, and disposed so that its displacement direction (longitudinal direction of the multilayer piezoelectric element 1050) is the Y direction (pixel shifting direction). One end of the multilayer piezoelectric element 1050 is fixed to the upper side mounting part 1231 of the first support plate 1023 for the shake-correction use supporting unit 1002. The other end of the multilayer piezoelectric element 1050 is fixed to the mounting part 1312 of the fixed base 1031.

Return springs 1051 are disposed between the first support plate 1023 of the shake-correction use supporting unit 1002 and the fixed base 1031. When application of the voltage to the multilayer piezoelectric element 1050 is turned off, this return spring 1051 is used for preventing the image pickup unit 1102, through the first support plate 1023, from not returning properly to the position of the standby state due to the spring action of the lead-in spring 1032 and the friction action between the first support plate 1023 and the fixed base 1031.

The actions of the above-structured pixel-shifting use supporting unit 1003 and pixel-shifting use driving unit 1005 will be explained below.

When a pixel shifting mode is selected in the signal generator 1013, a voltage is applied to the multilayer piezoelectric element 1050 to expand in its longitudinal direction. In association with this expansion, the image pickup unit 1102 moves by one pixel in the Y direction from its standby-state position with respect to the fixed base 1031 through the guide pins 1030 and the first support plate 1023.

Application of the voltage to the multilayer piezoelectric element 1050 is turned off at the point in time when imaging in a shifted state by one pixel is finished. In response to turning it off, the image pickup unit 1102 returns to its standby-state position with respect to the fixed base 1031 through the guide pins 1030 and the first support plate 1023 by the action of the return springs 1051.

In pixel shifting, the following components move by one pixel with respect to the fixed base 1031 through the guide pins 1030. That is, the shake-correction use supporting unit 1002 comprising the first support plate 1023 and the components such as the first flat spring body 1021, the second flat spring body 1022, the first support plate 1023, the second support plate 1024, and the third support plate 1025. Further, the shake-correction use driving unit 1004 comprising the multilayer piezoelectric elements 1040 and 1041 with the enlarging mechanisms, the rollers 1402 and 1412, the adjustment screws 1403 and 1413, the interlocking pins 1042, and the biasing springs 1043, and the image pickup unit 1102.

As explained above, the twenty-third embodiment has the pixel-shifting use supporting unit 1003 disposed in the shake-correction use supporting unit 1002 on the opposite side to the image forming surface of the image pickup unit 1102 in the direction of the optical axis Z—Z. Accordingly, this embodiment can minimize the space surrounding the image pickup unit 1102, and also minimize the space on the rear side (opposite side to the image forming surface) of the image pickup unit 1102.

Particularly, the twenty-third embodiment uses the multilayer piezoelectric element 1050 as the pixel-shifting use driving unit 1005, which is disposed together with the multilayer piezoelectric elements 1040 and 1041 with enlarging mechanisms in the position, on the substantially same plane of the fixed base 1031, opposite to the image forming surface of the image pickup unit 1102. Accordingly, the twenty-third embodiment can minimize the space surrounding the image pickup unit 1102, and also minimize the space on the rear side (opposite side to the image forming surface) of the image pickup unit 1102.

Figure 47:
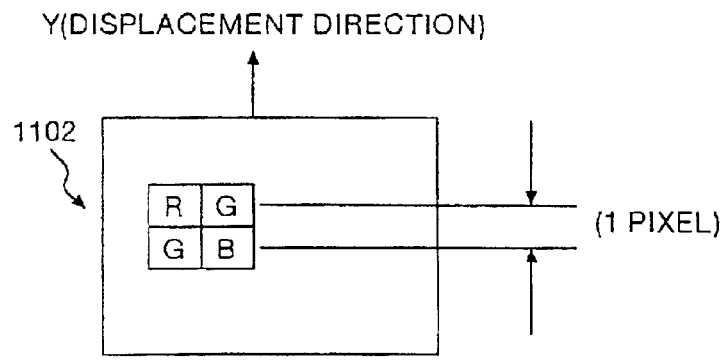
FIG. 47 shows displacement of the image pickup unit at the time of pixel shifting of the shake correction device in the twenty-third embodiment.
Figure 48:
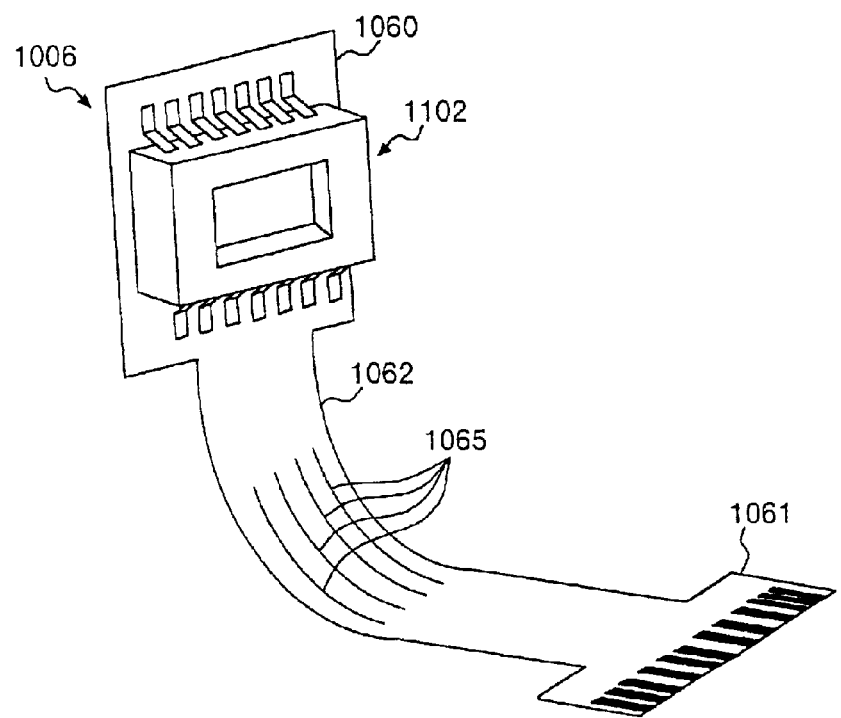
FIG. 48 is a perspective view showing the wiring member of the shake correction device in the twenty-third embodiment.
Figure 49:
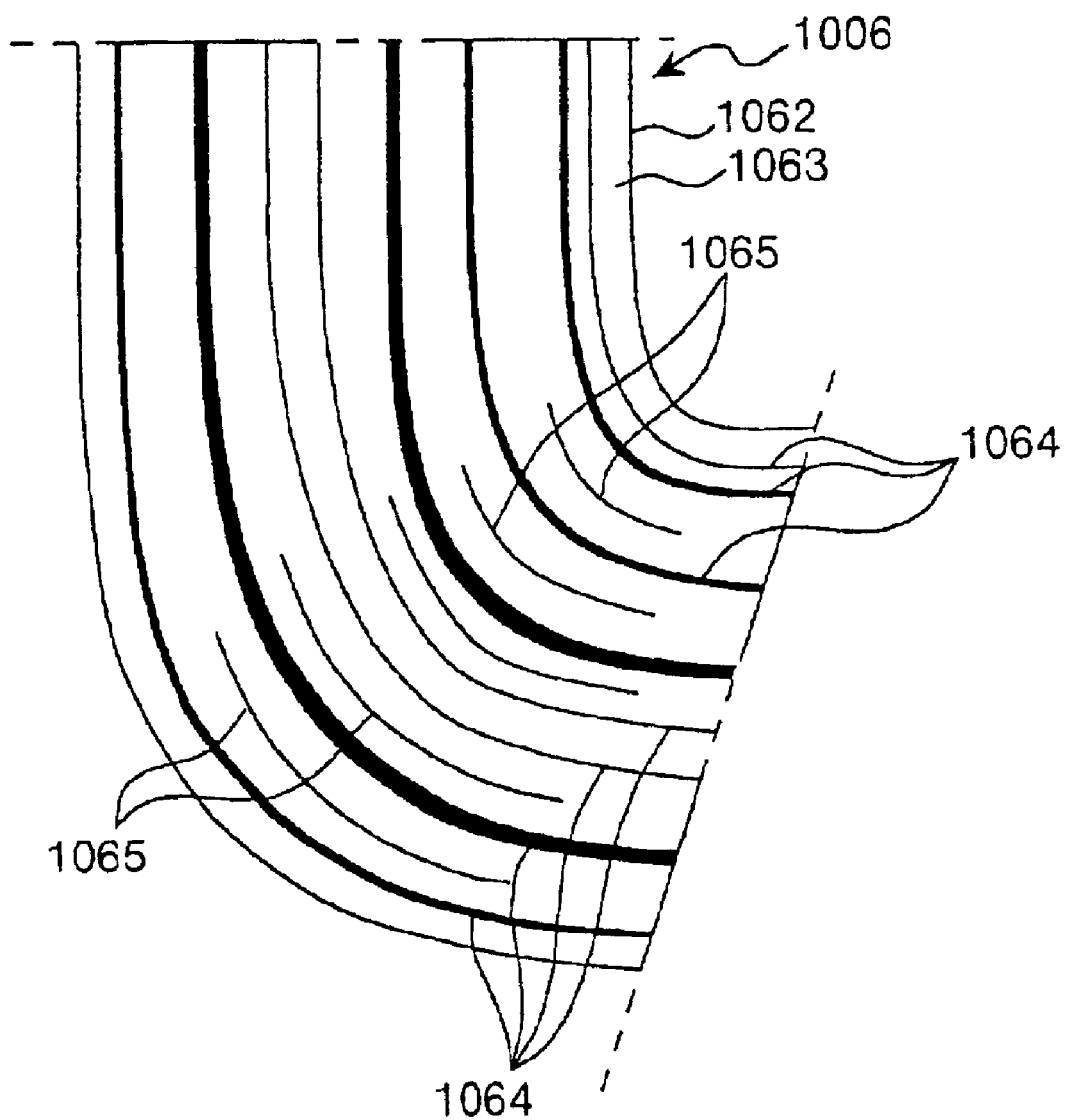
FIG. 49 is a partially enlarged view showing the wiring member of the shake correction device in the twenty-third embodiment.

Displacement of the image pickup unit 1102 at the time of pixel shifting will be explained below with respect to FIG. 47.

Color filters of a red color R, a green color G, and a blue color B arranged so as to be checkered are allocated to pixels in an image receptor section of the image pickup unit 1102. To make it easier to understand, an R pixel is sensitive mainly to the red color, a G pixel to the green color, and a B pixel to the blue color. Recording is performed in the image pickup unit 1102 with such pixel arrangement.

Recording is performed in a state where the pixels are shifted by one pixel in an upward direction as a pixel shifting direction (displacement direction). By synthesizing the two recorded images, the R pixel obtains data for R+G, the upper G pixel obtains data for G+B, the lower G pixel obtains data for G+R, and the B pixel obtains data for B+G.

That is, G-color image information is acquired for overall one screen, so that the amount of information for the object increases. Further, any lack pixel for B or R in the composite pixels can be calculated from its adjacent pixel, and all color information for G, B, and R can be obtained in one pixel. Further, the wavelength band of G is the highest visibility for human sense of sight, and has a wide sensitive distribution in a CCD. In addition, as a characteristic of human sense of sight, the ability to discriminate changes in hue is low as compared to change in brightness of an object. Based on these facts, it is possible to acquire a high quality image that fits the human sense of sight.

The operation of pixel shifting is controlled in the system controller 1110. Regarding the control for pixel shifting, refer to Japanese Patent Application Laid-Open No. 10-327359 and Japanese Patent Application Laid-Open No. 10-336686 filed by this applicant.

As explained above, in the twenty-third embodiment, the pixel shifting control unit 1017 can control driving of the pixel-shifting use driving unit 1005 through the signal generator 1013 and the system controller 1110. Accordingly, this embodiment can automatically control pixel shifting.

A connection part 1060 at one end of a wiring member 1006 is connected to the image pickup unit 1102. A connection terminal 1061 connecting an electric circuit of another electronic board (not shown) is provided at the other end of the wiring member 1006. A flexible wiring part 1062 is wired between the connection part 1060 and the connection terminal 1061.

The flexible wiring part 1062 is composed of a band-like flexible insulator 1063. The flexible insulator 1063 has a plurality of wiring patterns 1064 printed in parallel with each other. A plurality of slits 1065 are provided between the wiring patterns 1064 and in parallel with the wiring patterns 1064 on the flexible insulator 1063.

As explained above, the twenty-third embodiment has the flexible insulator 1063 where a plurality of slits 1065 are provided between the wiring patterns 1064 and in parallel with the wiring patterns 1064. Resultantly, this embodiment can reduce the rigidity of the flexible wiring part 1062 without exerting any influence on the wiring patterns 1064. Accordingly, the twenty-third embodiment can reduce operating errors due to the rigidity at the time of driving, improve positional precision, and reduce the load to the driving force. Further, the flexible wiring part 1062 has a slip-like shape, so that it is possible to slim the wiring member 1006, thus minimizing the imaging apparatus.

Although the examples of the shake correction device applied to the image pickup apparatus such as a digital camera are explained in twenty-third embodiment, the shake correction device in the imaging apparatus according to this invention is also applicable to any other image pickup apparatus.

In the twenty-third embodiment, the second support plate 1024 is the movable-side support part that supports the image pickup unit 1102, while the first support plate 1023 is the fixed-side support part. However, in the shake correction device in the imaging apparatus of this invention, the first support plate may be changed to the movable-side support part that supports the image pickup unit 1102 and the second support plate may be changed to the fixed-side support part in reverse.

The imaging apparatus according to one aspect of this invention calculates predictive shake information based on information for shake detection detected by a shake detection unit, determines a position as a start position of a correcting operation of the shake correction unit and at which predictive shake is canceled out, and controls driving of the shake correction unit at the correcting-operation start position to correct shake. Accordingly, this invention can correct shake of the imaging apparatus quickly and accurately, and reduce imaging failures due to hand shake or the like. That is, in this invention, by controlling the driving of the shake correction unit at the correcting-operation start position, a movable range of the shake correction unit for actual hand shake can be made effective use of. Thus, a high degree of correction effect can be obtained, so that imaging failures due to hand shake or the like can be remarkably reduce.

Further, the storage unit updates and stores, on a time basis, shake detection information and information for imaging conditions for a predetermined time interval detected by the shake detection unit. Accordingly, this invention can effectively correct hand shake even if imaging conditions such as an exposure condition vary.

Further, shake can be corrected by detecting a preimaging operation, driving the shake correction unit to a start position of correcting operation, and detecting an imaging starting operation. Accordingly, this invention can further reduce imaging failures due to hand shake.

Further, the shake correction unit can be driven between the time when the pre-imaging operation is detected and the time when the imaging starting operation is detected. Accordingly, this invention can correct the shake more effectively.

Further, when actual imaging is started, processing of calculating predictive shake information or the like can be stopped. Accordingly, this invention can suppress wasteful power consumption due to unnecessary computing operation.

Further, when the control unit is to control driving of the shake correction unit, it is possible to reduce the time required for controlling the driving of the shake correction unit to a correcting-operation start position by treating the correcting-operation start position as an area. That is, the time required for starting imaging can be reduced. In this invention, by treating the correcting-operation start position as area information, the shake can be effectively corrected while suppressing the amount of travel of the shake correction unit. In addition, even if the correcting-operation start position is slightly displaced due to degradation in predictive precision, it is possible to suppress probability of exceeding a range where the shake correction unit performs a correcting operation, and reduce imaging failures due to hand shake as low as possible.

Further, this invention retrieves a correlation between the predictive shake information previously stored in a correlation storage unit and the correcting-operation start positions based on the predictive shake information, and determines a correcting-operation start position of the shake correction unit. Accordingly, it is possible to provide the imaging apparatus that can quickly determine the correcting-operation start position and reduce the time from instruction of an imaging operation until starting of an actual imaging operation, and has a less time lag.

Further, when a shake quantity of the shake detection information is beyond the range previously stored in a correction range storage unit, a warning unit issues a warning. Accordingly, in this invention, even if a blurred image due to hand shake is imaging, more specifically, the blurred image is produced when the shake correction unit can not correct hand shake because the hand shake is larger than its prediction or is inaccurately predicted, the following measures can be taken. That is, it is possible to allow an operator to stop imaging, or to image an object image again. If the imaging apparatus is any device that stores image information in an erasable recording medium, writing of the information into the recording medium can be cancelled before recording it. Thus, this invention can acquire the image information intended by the operator.

Further, it is possible to avoid unnecessary imaging and suppress power consumption due to unnecessary correcting operations.

In the shake correction method according to another aspect of this invention, the shake of the imaging apparatus can be corrected quickly and accurately, so that imaging failures due to hand shake can be reduced. That is, in this invention, by controlling the driving of the shake correction unit at a correcting-operation start position, a movable range of the shake correction unit for actual hand shake can be made effective use of. Thus, a high degree of correction effect can be obtained, so that image failures due to hand shake or the like can be remarkably reduce.

Further, shake detection information and information for imaging conditions for a predetermined time interval detected by the shake detection unit are updated and stored on a time basis. Accordingly, this invention can effectively correct hand shake even if imaging conditions such as an exposure condition vary.

Further, shake can be corrected by detecting a preimaging operation, driving the shake correction unit to a start position of a correcting operation, and detecting an imaging starting operation. Accordingly, this invention can further reduce imaging failures due to hand shake.

The shake correction device according to still another aspect of this invention has a displacement enlarging mechanism that enlarges the displacement of an electromechanical transducer, so that a sufficiently large displacement can be quickly obtained. Accordingly, in this invention, the imaging optical system (which is synonymous with the image pickup optical system, e.g., the image pickup lens) or the image pickup surface (which is synonymous with the image pickup unit, e.g., a film) can be moved sufficiently widely and quickly in a direction substantially perpendicular to the optical axis. Resultantly, it is possible to provide an excellent camera-shake correction mechanism that has achieved a movable range wide enough for and a quick response to camera shake.

In this invention, imaging is performed plural times by moving an incident position of an incident light to the image pickup surface by a specified quantity and in the specific direction between exposures, so that it is possible to facilitate imaging based on pixel shifting such that the plurality of imaged image data is used to increase an apparent number of pixels. Accordingly, this invention can obtain a highresolution image even if the image pickup unit itself has only a small number of pixels.

In this invention, it becomes easy to slightly change an incident position of an incident light to the image pickup surface by moving the imaging optical system or the image pickup surface by a specified slight amount during the exposing time. Accordingly, in this invention, even if an image pickup signal has a high frequency component higher than one half of a sampling frequency of the image pickup unit, the high frequency component of the image pickup signal is removed, so that occurrence of pseudo colors or moiré caused by foldover distortion of the high frequency component can be prevented. In addition, in this invention, it has been known that the same effect can be obtained by slightly shifting the object image during the exposing time without using the birefringent plate like the crystal plate.

In this invention, the width between opposed surfaces curving inwardly of the two elastic plates is enlarged or reduced according to the displacement of the electromechanical transducer. These two elastic plates are fixed to both sides of the electromechanical transducer so as to be opposite to each other in a direction perpendicular to its displacement direction. Accordingly, in this invention, the displacement of the electromechanical transducer is enlarged by the displacement enlarging mechanism in a direction perpendicular to its displacement direction, so that the imaging optical system or the image pickup surface is moved in this direction. Thus, this invention is excellent in space efficiency when the actuator composed of the electromechanical transducer and the displacement enlarging mechanism is used.

In this invention, the two elastic plates fixed to both sides of the electromechanical transducer opposite to each other are curved so as to be recessed inwardly. Accordingly, this invention can avoid a risk that the two elastic plates are curved inwardly when a large force is applied and will not recover to their original state, and realize stable enlargement.

This invention has the displacement enlarging mechanism that enlarges the displacement of the electromechanical transducer. Accordingly, in this invention, a sufficiently large quantity of displacement can be obtained even if low power is supplied to the electromechanical transducer, thus being advantageous for designing a power source.

In this invention, the imaging optical system or the image pickup surface is fixed to the elastic plates of the displacement enlarging mechanism. Accordingly, in this invention, any particular mechanism for holding the imaging optical system or the image pickup surface is not required even if camera shake is not corrected (when the imaging optical system or the image pickup surface is not moved). Therefore, the apparatus can be minimized and simplified.

In this invention, the displacement enlarging mechanism that enlarges the displacement of the electromechanical transducer can be used commonly as the function of camera-shake correction, the imaging function based on pixel shifting, and the function of removing a high frequency component of an image pickup signal. Accordingly, in this invention, the plural functions can be achieved at once, thus largely improving the image quality. In addition, in this invention, there is no need to provide plural displacement enlarging mechanisms discretely for each function, thus minimizing the camera and reducing its cost.

The shake correction device according to still another aspect of this invention has the displacement enlarging mechanism that enlarges displacement of the electromechanical transducer. Accordingly, higher space efficiency can be obtained as compared to the case where the moving coil is used, and the device can be driven more quickly as compared to a case where a motor is used. Thus, in this invention, the apex angle of the variable apex angle prism required for camera-shake correction can be varied sufficiently largely and quickly by arranging the enlargement direction due to the displacement enlarging mechanism so as to be parallel to the optical axis of the variable apex angle prism. Resultantly, in this invention, the degree of flexibility in designing can be enlarged, and a movable range wide enough for and a quick response to camera shake can be achieved. Thus, it is possible to provide such an excellent camera-shake correction mechanism.

In this invention, imaging based on pixel shifting can be facilitated. Accordingly, it is possible to obtain a high-resolution image even if the image pickup unit itself has only a small number of pixels.

In this invention, it becomes easy to slightly change an incident position of an incident light to the image pickup surface by moving the apex angle of the variable apex angle prism by a specified slight amount during the exposing time. Accordingly, in this invention, a high frequency component higher than one half of a sampling frequency of the image pickup unit is removed, so that occurrence of pseudo colors or moiré caused by foldover distortion of the high frequency component can be prevented.

In this invention, excellent space efficiency can be realized, therefore, it is advantageous for designing a power source. In addition, any particular mechanism for holding the variable apex angle prism is not required. Therefore, the apparatus can be minimized and simplified. In this invention, the displacement enlarging mechanism that enlarges the displacement of the electromechanical transducer can be used commonly as the function of camera-shake correction, the imaging function based on pixel shifting, and the function of removing a high frequency component of an image pickup signal. Accordingly, this invention can largely improve the image quality, minimize the camera, and reduce its cost.

Further, the biasing unit provides a biasing force, in a reverse direction to the enlargement due to the displacement enlarging mechanism, to the image pickup optical system, the image pickup surface, or the variable apex angle prism. Accordingly, in this invention, the image pickup optical system, the image pickup surface, or the variable apex angle prism each fixed to the elastic plates of the displacement enlarging mechanism can be maintained stably in a specific direction. Resultantly, in this invention, the image pickup optical system or the image pickup surface can be moved easily, reliably and accurately according to enlargement due to the displacement enlarging mechanism while keeping its surface perpendicular to the optical axis. In this invention, the apex angle of the variable apex angle prism can also be varied easily, reliably and accurately.

Further, the image pickup optical system or the image pickup surface can be smoothly moved by a substantially cylindrical member in the horizontal direction and the vertical direction respectively by using a plurality of actuators each composed of the electromechanical transducer and the displacement enlarging mechanism. In this invention, the image pickup optical system or the image pickup surface can be moved in a specific direction, the horizontal direction and the vertical direction, in its stable state.

Further, the pressing unit, as the biasing unit, which presses the imaging optical system or the image pickup surface in a specific direction is disposed fixedly and independently from the imaging optical system or the image pickup surface. In this invention, there is a case that the image pickup optical system or the image pickup surface is two-dimensionally moved in the horizontal direction and the vertical direction using a plurality of actuators. In this case, when the image pickup optical system or the image pickup surface is moved in a vertical direction, the pressing unit presses the image pickup optical system or the image pickup surface against the elastic plate in the horizontal direction. Accordingly, in this invention, friction produces at a contact part between the image pickup optical system or the image pickup surface and the pressing unit, so that the balance can be achieved between this friction and friction at a contact part between the image pickup optical system or the image pickup surface and the elastic plate or the substantially cylindrical member. Resultantly, this invention can move the image pickup optical system or the image pickup surface in a specific direction, the horizontal direction and the vertical direction, in its stable state.

Further, even if enlargement due to the displacement enlarging mechanism increases in association with increase in displacement of the electromechanical transducer and a biasing force against the enlargement increases, the increase in this biasing force is suppressed to the predetermined range. Accordingly, in this invention, the elastic plates of the displacement enlarging mechanism can be prevented from being crushed due to increase in the biasing force, and the loss of enlargement by the displacement enlarging mechanism can be suppressed to the predetermined range, so that a desired displacement can be obtained.

In the shake correction device according to still another aspect of this invention, vibration of the imaging apparatus can be cancelled out, that is, the shake can be corrected by vibrating the image pickup unit by the shake-correction use driving unit through the shake-correction use supporting unit. Pixel shifting is performed by moving the image pickup unit integral with the shake-correction use supporting unit and the shake-correction use driving unit by the pixel-shifting use driving unit. More specifically, this movement is performed in a pixel shifting direction by a specified quantity by the pixel-shifting use driving unit through the pixel-shifting use supporting unit. As explained above, the shake correcting function and the pixel shifting function can be acted reliably and inexpensively as a parallel function by the supporting unit and driving unit for shake correction and the supporting unit and driving unit for pixel shifting each as a discrete unit.

Further, the multilayer piezoelectric element is used as the driving unit. Accordingly, this invention can minimize the imaging apparatus, obtain a large driving force with low power, improve responsivity, and deal with a heavy load.

Further, the multilayer piezoelectric elements are disposed in the positions on the substantially same plane opposite to the imaging optical system of the image pickup unit (opposite to the image forming surface of the image pickup unit). This invention can minimize the space surrounding the image pickup unit, and also minimize the space on the opposite side to the imaging optical system of the image pickup unit (the rear side of the image pickup unit) can be minimized as well.

Further, the pixel-shifting use support unit is disposed in the shake-correction use supporting unit on the opposite side to the imaging optical system of the image pickup unit in the direction of the optical axis. Accordingly, this invention can minimize the space surrounding the image pickup unit, and also minimize the space on the opposite side to the imaging optical system of the image pickup unit.

Further, the multilayer piezoelectric elements are used as the driving units, and these multilayer piezoelectric elements and the shake-correction use driving unit are disposed in the positions on the substantially same plane of the fixed base opposite to the imaging optical system of the image pickup unit. Accordingly, this invention can minimize the space surrounding the image pickup unit can be minimized, and also minimize the space on the opposite side to the imaging optical system of the image pickup unit.

In the shake correction device according to still another aspect of this invention, the image pickup unit is disposed in the shake-correction use supporting unit composed of the first flat spring body, the second flat spring body, the first support plate, the second support plate, and the third support plate. Accordingly, this invention can minimize the shake-correction use supporting unit and also minimize the shake correction device in the image pickup apparatus.

Further, the link is formed with the four flat springs and the first support plate, the second support plate and the third support plate, which makes it possible to reduce the load applied to one of the flat springs.

Further, the two flat springs are formed with a piece of flat spring, thus reducing the number of components.

Further, the folded ends of both ends of the first flat spring body and the second flat spring body are used as the positioning and fixing parts for fixing the bodies to the first support plate, the second support plate, and the third support plate. Accordingly, it is possible to reduce the number of components. In this invention, the folded ends of both ends of the first flat spring body and the second flat spring body are folded into the side of the optical axis, that is, inwardly, so that the shake correction device in the imaging apparatus can be minimized.

In the shake correction device according to still another aspect of this invention, an enlargement direction of the displacement part which vibrates the image pickup unit and a displacement direction of the multilayer piezoelectric element are orthogonal to each other. Therefore, in this invention, the multilayer piezoelectric elements each with the enlarging mechanism can be disposed in a state where the displacement directions of the multilayer piezoelectric elements, that is, each longitudinal direction of the multilayer piezoelectric elements is orthogonal to a vibrating direction of the image pickup unit. Accordingly, this invention can minimize the shake-correction use driving unit and also minimize the shake correction device in the imaging apparatus as compared to the shake correction device in which the multilayer piezoelectric elements are disposed in a state where each longitudinal direction of the multilayer piezoelectric elements coincides with a vibrating direction of the image pickup unit.

Further, the multilayer piezoelectric element with the X-direction enlarging mechanism and the multilayer piezoelectric element with the Y-direction enlarging mechanism are disposed in positions on the substantially same plane opposite to the imaging optical system of the image pickup unit. Accordingly, this invention can minimize the space surrounding the image pickup unit and also minimize the space on the opposite side to the imaging optical system of the image pickup unit.

Further, the X-direction biasing spring and the Y-direction biasing spring are disposed between the movable-side support part and the fixed-side support part. Accordingly, in this invention, the movable-side support part and the fixed-side support part are in contact with the displacement parts of the multilayer piezoelectric element with the X-direction enlarging mechanism and the multilayer piezoelectric element with the Y-direction enlarging mechanism. The movable-side support part vibrates in the X direction and the Y direction with respect to the fixed-side support part in their contact state. Therefore, in this invention, loss of the biasing force of the biasing springs is reduced, and hysteresis of the biasing springs may be hard to occur. As a result, the biasing force of the biasing springs is stabilized, and positional precision is also stabilized.

In this invention, the X-direction biasing spring and the Y-direction biasing spring are formed with the single biasing spring. Therefore, it is possible to reduce the number of components and minimize the apparatus. In addition, in this invention, the movable-side support part and the fixed-side support part are in contact with the displacement parts of the multilayer piezoelectric element with the X-direction enlarging mechanism and the multilayer piezoelectric element with the Y-direction enlarging mechanism without any component therebetween. Accordingly, there is a merit such that the positional precision does not depend on the precision of the components.

Further, the X-direction roller and the Y-direction roller can reduce frictional resistance produced when the movable-side support part vibrates in the X direction and the Y direction with respect to the fixed-side support part. Accordingly, this invention can improve the precision of the shake correction device in the imaging apparatus and reduce the load to the driving force.

Further, it is possible to adjust initial positions of the image pickup unit in the X direction and the Y direction through the movable-side support part by the X-direction adjustment screw and the Y-direction adjustment screw.

Further, it is possible to reduce the rigidity of the flexible wiring part by slits without any influence to the wiring. Accordingly, this invention can reduce operational errors due to its rigidity during driving, improve positional precision, and reduce the load to the driving force. In this invention, the flexible wiring part has the band-like shape, so that it is possible to slim the wiring member and minimize the apparatus.

In the imaging apparatus according to still another aspect of this invention, the shake correction control unit and the pixel shifting control unit can automatically control shake correction and pixel shifting, respectively.

In the imaging apparatus according to still another aspect of this invention, the shake correction control unit can automatically control shake correction.

Further, it is possible to reduce the rigidity of the flexible wiring part by slits without any influence to the wiring. Accordingly, this invention can reduce operational errors due to its rigidity during driving, improve positional precision, and reduce the load to the driving force. In this invention, the flexible wiring part has the band-like shape, so that it is possible to slim the wiring member and minimize the apparatus.

The present document incorporates by reference the entire contents of Japanese priority documents, 2000-208663 filed in Japan on Jul. 10, 2000, 2000-240411 filed in Japan on Aug. 8, 2000, 2000-212194 filed in Japan on Jul. 13, 2000, 2000-277525 filed in Japan on Sep. 13, 2000 and 2001-152958 filed in Japan on May 22, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An imaging apparatus comprising:
   an imaging optical system;
   an image pickup unit which receives an object image passing through said imaging optical system and converts it to image information;
   a shake detection unit which detects shake detection information of said imaging apparatus;
   a prediction arithmetic unit which calculates predictive shake information based on the detected shake detection information, and then calculates a predictive shake vector based on the predictive shake information and, determines a position as a start position of a correcting operation of a shake correction unit based on said predicted shake vector and at which said predictive shake vector is canceled out;
   a said shake correction unit correcting image blurring on said image pickup unit based on the shake detection information detected by said shake detection unit from the correcting-operation start position; and
   a control unit which controls driving of said shake correction unit at the correcting-operation start position and corrects the image blurring,
   wherein a range of shake to be detected during an exposure time is predicted before exposure and said shake correction unit is moved to the correcting-operation start position, and subsequently the correcting operation and an exposure operation are performed.

2. The imaging apparatus according to claim 1 further comprising:
   a storage unit which updates and stores shake detection information, together with information for imaging conditions, for a predetermined time interval detected by said shake detection unit, wherein
   said prediction arithmetic unit calculates the predictive shake information based on the shake detection information and the information for imaging conditions stored in said storage unit, and determines the correcting-operation start position of said shake correction unit based on the predictive shake information.

3. The imaging apparatus according to claim 1 further comprising:
   a pre-imaging operation unit which detects a pre-imaging operation of said imaging apparatus to output a signal indicating the pre-imaging operation; and
   an imaging starting operation unit which detects an imaging starting operation of said imaging apparatus after the signal indicating the pre-imaging operation is output from said pre-imaging operation unit, and outputs a signal indicating the imaging starting operation, wherein
   said control unit controls driving of said shake correction unit to the correcting-operation start position through output of the pre-imaging operation signal, and then controls driving of said shake correction unit through output of the imaging starting operation signal from said imaging starting operation unit, and corrects the image blurring.

4. The imaging apparatus according to claim 3, wherein said control unit controls driving of said shake correction unit to said correcting-operation start position between the time when the pre-imaging operation signal is output and the time when the imaging starting operation signal is output, and controls driving of said shake correction unit through output of the imaging starting operation signal to correct the image blurring.

5. The imaging apparatus according to claim 3, wherein said prediction arithmetic unit calculates the predictive shake information after the pre-imaging operation signal is output and determines the correcting-operation start position, and stops processing of calculating the predictive shake information and processing of determining the correcting-operation start position after the imaging starting operation signal is output.

6. The imaging apparatus according to claim 1, wherein said control unit imparts the correcting-operation start position as area information having a range.

7. The imaging apparatus according to claim 1, wherein said control unit comprises:
   a correlation storage unit which previously stores a correlation between the predictive shake information and the correcting-operation start positions; and
   a correcting-operation start position determination unit which determines the correcting-operation start position through retrieval of the correlation stored in said correlation storage unit based on the predictive shake information.

8. The imaging apparatus according to claim 1 further comprising:
   a correction range storage unit which previously stores a range in which the driving of said shake correction unit can be controlled;
   a detection unit which detects whether a shake quantity of the shake detection information is beyond the range previously stored in said correction range storage unit; and a warning unit which issues a warning when said detection unit detects the shake quantity that is beyond the range in the middle of controlling the driving of the shake correction unit.

9. The imaging apparatus according to claim 3 further comprising:

a correction range storage unit which previously stores a range in which the driving of said shake correction unit can be controlled;

a prediction unit which computes a predictive shake quantity from the predictive shake information, computes the predictive correction quantity to the predictive shake quantity, and predicts whether the predictive correction quantity is beyond the range previously stored in said correction range storage unit; and when said prediction unit predicts that the predictive correction quantity will exceed the range, at least one out of a treating unit which displays a warning; a treating unit which stops the operation of controlling the driving of said shake correction unit to the correcting-operation start position and invalidates the imaging starting operation; and a treating unit which stops the operation of controlling the driving of said shake correction unit to correct the image blurring and validates the imaging starting operation.

10. A shake correction method in an imaging apparatus including an imaging optical system; an image pickup unit which receives an object image passing through said imaging optical system and converts it to image information; a shake detection unit which detects a shake of said imaging apparatus; and a shake correction unit which corrects image blurring on said image pickup unit based on the shake detection information detected by said shake detection unit, said shake correction method comprising:

calculating predictive shake information based on the shake detection information;

calculating a predictive shake vector based on the predictive shake information;

determining a position as a start position of correcting operation of said shake correction unit and at which predictive shake vector will be canceled out;

driving the shake correction unit to the correcting-operation start position based on said predictive shake vector; and correcting the image blurring by controlling driving of said shake correction unit at the correcting-operation start position, wherein a range of shake to be detected during an exposure time is predicted before exposure and said shake correction unit is moved to the correcting-operation start position, and subsequently the correcting operation and an exposure operation are performed.

11. The shake correction method in the imaging apparatus according to claim 10 further comprising:

updating and storing shake detection information, together with information for imaging conditions, for a predetermined time interval detected by said shake detection unit;

calculating predictive shake information based on the stored shake detection information and the information for imaging conditions; and determining a correcting-operation start position of said shake correction unit based on the predictive shake information.

12. The shake correction method in the imaging apparatus according to claim 10 further comprising:

detecting a pre-imaging operation of said imaging apparatus;

controlling driving of said shake correction unit to the correcting-operation start position;

detecting an imaging starting operation of said imaging apparatus; and correcting the image blurring by controlling the driving of said shake correction unit.

13. The imaging apparatus according to claim 1, wherein the prediction arithmetic unit calculates the predictive shake vector further based on focal length information of the imaging optical system.

14. The shake correction method in an imaging apparatus according to claim 10, wherein the calculating a predictive shake vector further includes calculating the predictive shake vector based on focal length information of the imaging optical system.

* * * * *